(12) United States Patent
Chaptini et al.

(10) Patent No.: US 11,593,096 B1
(45) Date of Patent: Feb. 28, 2023

(54) SYSTEMS AND METHODS FOR MEASURING COMPLEXITY OF APPLICATIONS AND COMPONENTS IN SOFTWARE DEVELOPMENT AND DEPLOYMENT PLATFORMS

(71) Applicant: UNQORK, INC., New York, NY (US)

(72) Inventors: Bassam Henri Chaptini, Tampa, FL (US); Vaibhav Rathi, Jersey City, NJ (US); Gary Hoberman, Syosset, NY (US)

(73) Assignee: Unqork, Inc., New York, NY (US)

( * ) Notice: Subject to any disclaimer, the term of this patent is extended or adjusted under 35 U.S.C. 154(b) by 5 days.

(21) Appl. No.: 17/192,431

(22) Filed: Mar. 4, 2021

Related U.S. Application Data

(60) Provisional application No. 62/985,770, filed on Mar. 5, 2020.

(51) Int. Cl.
*G06F 9/44* (2018.01)
*G06F 8/71* (2018.01)

(52) U.S. Cl.
CPC ..................................... *G06F 8/71* (2013.01)

(58) Field of Classification Search
None
See application file for complete search history.

(56) References Cited

U.S. PATENT DOCUMENTS

| | | | |
|---|---|---|---|
| 2016/0048390 A1* | 2/2016 | Thiel | G06F 8/36 717/122 |
| 2016/0132771 A1* | 5/2016 | Shetty | H04L 67/32 706/46 |
| 2017/0300318 A1* | 10/2017 | Goniwada | G06F 16/285 |
| 2020/0065227 A1* | 2/2020 | Gao | G06F 11/36 |

OTHER PUBLICATIONS

Umesh Tiwari et al., "Cyclomatic Complexity Metric for Component Based Software", Jan. 2014 (Year: 2014).*
Steve D. Suh et al., "Studying Software Evolution for Taming Software Complexity", 2010 (Year: 2010).*
Jesper Hakansson et al., "Evaluating cyclomatic complexity on functional JavaScript", 2016 (Year: 2016).*
T.R. Hopkins, "Restructuring Software A Case Study", 1996 (Year: 1996).*

* cited by examiner

*Primary Examiner* — Wei Y Zhen
*Assistant Examiner* — Lanny N Ung
(74) *Attorney, Agent, or Firm* — Occhiuti & Rohlicek LLP

(57) ABSTRACT

Disclosed are methods, systems, devices, apparatus, media, design structures, platforms, and other implementations, including a method that includes receiving, by a processor-based device, configuration data representative of an initial arrangement of interlinked components forming a data application, and determining based on the configuration data, by the processor-based device, one or more complexity scores indicative of levels of complexities for one or more portions of the initial arrangement of interlinked components forming the data application. The method further includes automatically reconfiguring, by the processor-based device, the initial arrangement of interlinked components based on the computed one or more complexity scores to produce a resultant arrangement of interlinked components forming the data application.

17 Claims, 35 Drawing Sheets

Short Answer Component

400

_Display_  Error Messages

Label ⓘ
Full Name

Property Name ⓘ
fullName

Placeholder ⓘ
PlaceholderText

Input Mask ⓘ
Input Mask

Regular Expression Pattern ⓘ
Regular Expression Pattern

Minimum Length ⓘ
Minimum Length

Maximum Length ⓘ
Maximum Length

Prefix ⓘ
example '$', '@'

Suffix ⓘ
example '$', '@'

Custom CCS Class ⓘ
Custom CCS Class

Description ⓘ
Description for this field.

Trigger ⓘ

On Keypress ⓘ

☐ Hide Label ⓘ
☐ Multiple Values ⓘ
☑ Clear Value When Hidden ⓘ
☐ Protected ⓘ
☑ Persistent ⓘ

☐ Hidden ⓘ
☐ Disabled ⓘ
☑ Table View ⓘ
☐ Required ⓘ

Field Tags ⓘ
Add a tag

[SAVE]  [SAVE AS TEMPLATE]

FIG. 4

Single Checkbox Component 500

Display  Error Messages

Label ⓘ
Field Label

Property Name ⓘ
checkeboxField

Input Type ⓘ
Checkbox ▼

Custom CCS Class ⓘ
Custom CCS Class

Description ⓘ
Description for this field.

☐ Multiple Values ⓘ
☑ Clear Value When Hidden ⓘ
☐ Protected ⓘ
☑ Persistent ⓘ
☑ Datagrid Label ⓘ

☐ Hidden ⓘ
☐ Disabled ⓘ
☑ Table View ⓘ
☐ Required ⓘ

Field Tags ⓘ
Add a tag

SAVE                              SAVE AS TEMPLATE

FIG. 5

Signature Component 600

Display   Error Messages

Footer Label ⓘ
Sign above

Property Name ⓘ
signature

Width ⓘ
100%

Height ⓘ
150px

Background Color ⓘ
rgb(245,245,235)

Pen Color ⓘ
black

Custom CCS Class ⓘ
Custom CCS Class

Description ⓘ
Description for this field.

☐ Multiple Values ⓘ
☑ Clear Value When Hidden ⓘ
☐ Protected ⓘ
☑ Persistent ⓘ

☐ Hidden ⓘ
☐ Disabled ⓘ
☑ Table View ⓘ
☐ Required ⓘ

Field Tags ⓘ

Add a tag

| SAVE | CANCEL |    SAVE AS TEMPLATE

FIG. 6

Date Input Component     700   ✕

Display   Error Messages

Label ⓘ

Field Label

Property Name ⓘ dateinput2

Placeholder ⓘ

Placeholder

Format ⓘ m for month, d for day, y or Y for year

☐ Disable user input ⓘ

Restrict Date To Past/Future

None ▾

☐ Disable date picker ⓘ

Number of years (+/-) from the current date to show in year dropdown ⓘ

Defaults to 10 (+-10 years)

Trigger ⓘ

Delimiter ⓘ

Defaults to /

Field Tags ⓘ

Add a tag

☐ Disabled ⓘ
☐ Required ⓘ

SAVE      SAVE AS TEMPLATE

FIG. 7

Decisions Component 800 ✕
Micro Decision

| Label ⓘ | Property Name ⓘ | Property Type ⓘ |
|---|---|---|
| Decision Name | decisionField | First |

| Trigger Type ⓘ | Debounce Setting ⓘ |
|---|---|
| Watch ▾ | m for month, d for day, y or Y for year |

Inputs

| 810 id | type | requ | silen |
|---|---|---|---|
| type | exact | ☐ | ☐ |
| isUnique | exact | ☐ | ☐ |
|  |  | ☐ | ☐ |
|  |  | ☐ | ☐ |

Outputs

| 820 id | type |
|---|---|
| canPatent | value |
| canPatent | requiredAndVisible |

Micro Decisions 830

|   | type | isUnique | marketSize_min | marketSize_max | canPatent_value | canPatent_requiredAndVisible |
|---|---|---|---|---|---|---|
| 1 | Technology | yes | 0 | 1000 | no | yes |
| 2 | Technology | yes | 1001 |  | yes | yes |
| 3 | Biotech | yes |  |  | yes | yes |
| 4 |  |  |  |  | no | no |
| 5 |  |  |  |  |  |  |
| 6 |  |  |  |  |  |  |
| 7 |  |  |  |  |  |  |

Test Harness 840                                                     [EXECUTE]

|   | type | isUnique | marketSize | canPatent_value | canPatent_value_result | canPatent_requireAndVisible | canPatent_requireAndVisible_result |
|---|---|---|---|---|---|---|---|
| 1 | Technology | yes | 500 | no | no | yes | yes |
| 2 | Technology | yes | 5000 | yes | yes | yes | yes |
| 3 |  |  |  |  |  |  |  |
| 4 |  |  |  |  |  |  |  |
| 5 |  |  |  |  |  |  |  |

☐ Disabled ⓘ         ☐ Prevent execution while loading data ⓘ
☐ Persistent ⓘ       ☐ Prevent navigation until complete ⓘ
Field Tags ⓘ         ☐ Allow dot notation in names ⓘ
[Add a tag]

[SAVE] [CANCEL]                                   [SAVE AS TEMPLATE]

FIG. 8

Data Workflow Component
Data Workflow Options
Label ⓘ
Data Workflow Name

900A

Property Name ⓘ
workflowField

Go to Help Page

Info

930

I/O
Input
Output
Console
910
Frequently Used
Table
Object
Value

☐ Disabled ⓘ  ☐ Debug ⓘ  [SHOW TABLE]

Trigger Type ⓘ
watch manual
Field Tags ⓘ
Add a tag

[SAVE]  [SAVE AS TEMPLATE]

Initializer Component

Initializer | Permissions

Permission Types:
- Inherit: Inherit permissions from components that contain this component (e.g. panels, columns), then inherit from the form, then inherit from the role defaults
- No Access: No access to this field
- Obfuscate: Field will be delivered when requested, but it will be replaced with asterisks, and it cannot be written
- Read-Only: Field will be delivered when requested, but it cannot be written
- Write: Full access to this field

| Role | Permission | Effective Permission | Inherited From |
|---|---|---|---|
| Administrator | | Write | Role Defaults |
| ↳ Authenticated | Inherit ▼ | Write | Role Defaults |
| ↳ testRbacDecisionRole | Inherit ▼ | No Access | Role Defaults |
| ↳ Operations | Inherit ▼ From: "Read-Only" CHANGED — 1520 | Write | Role Defaults |
| ↳ Compliance | Inherit ▼ | Write | Role Defaults |
| Manager | | Write | Role Defaults |
| ↳ Underwriter | Inherit ▼ | Read-Only | Form Defaults |
| ↳ Broker | Inherit ▼ | Read-Only | Role Defaults |
| underwriter | Inherit ▼ | No Access | Role Defaults |
| pauls-test | Inherit ▼ | Write | Role Defaults |
| NoAccess | Inherit ▼ | No Access | Role Defaults |
| my-role | Inherit ▼ | Read-Only | Role Defaults |
| read-only | Inherit ▼ | Read-Only | Role Defaults |

Cancel

Close

↺ Restore this save and make it your current version?

This is about to become your current version. You won't lose any work by restoring and your notes will transfer over unless you edit them below.

Restoring

● Changes approved for UAT
  Saved by mike@sample.com on May 24, 11:55 AM — 1820

Edit Restore Details (Optional)

✎ Edit Name    (Restored) Changes approved for UAT

▭ Edit Name    Add some notes...

You will be restoring changes to:

✓ Components
✓ Form Title and Path
✓ Form Settings

Some things won't change.

✗ Transforms
✗ Reference Data

1810

No, Don't Restore    Yes, Restore — 1830

FIG. 18

Structure A: Data Capture and Logic on the same module

| Module 1: Main Module | | | |
|---|---|---|---|
| First Name | Description | | Score |
| Last Name | Entry | | 1 |
| DOB | Calculator - Age | - Inputs - Required: DOB (+0)<br>- Statements: If(age <0, 0, age) (+1) | 1 |
| Age | Plugin - Credit | - Inputs - Required: SSN (+0) | 0 |
| SSN | Decision - Risk | - Inputs - Required: Age & Credit Score (+0)<br>- Decision: 2 rows & 4 columns (+7) | 7 |
| creditScore | Total | Complexity of all Modules | 9 |
| Risk Rating | Average | Average Complexity of Modules | 9 |

— 2510

Structure B: Data Capture and Logic on separate modules

| Module 1: Main Module | | | |
|---|---|---|---|
| First Name | Description | | Score |
| Last Name | Entry | | 1 |
| DOB | Plugin - Risk | - Inputs - Required: DOB & SSN (+0) | 0 |
| SSN | | | |
| Risk Rating | Sub-Total | Complexity for Module 1 | 1 |

— 2522

2520

| Module 2: Risk (Server Side) | | | |
|---|---|---|---|
| DOB | Calculator - Age | - Inputs SS: DOB (+0)<br>- Statements: If(age <0, 0, age) (+1) | 1 |
| SSN | Plugin - Credit | - Inputs SS: SSN (+0) | 0 |
| Age | Decision - Risk | - Inputs SS: Age & Credit Score (+0)<br>- Decision: 2 rows & 4 columns (+7) | 7 |
| Credit Score | Sub-Total | Complexity of Module 2 | 8 |
| Risk Rating | Total | Complexity of Modules | 9 |
| | Average | Average Complexity of Modules | 4.5 |

SYSTEMS AND METHODS FOR MEASURING COMPLEXITY OF APPLICATIONS AND COMPONENTS IN SOFTWARE DEVELOPMENT AND DEPLOYMENT PLATFORMS

CROSS-REFERENCE TO RELATED APPLICATIONS

This application claims priority to, and the benefit of, U.S. Provisional Application No. 62/985,770, entitled "Systems and Methods for Measuring Complexity of Applications and Components in Software Development and Deployment Platforms" and filed Mar. 5, 2020, the content of which is incorporated herein by reference in its entirety.

BACKGROUND

Overly complex software applications have a high risk of failure. This is especially true in scenarios in which an application is continuously updated over its lifetime and/or multiple variations of the application are desired for integration into separate platforms, each of which may demand its own unique configurations or settings. Attempting to incorporate or revise even a minor feature of a complex application can result in the breakdown or failure of multiple components of the application. These failures or breakdowns are often exacerbated when multiple individuals or entities are collaborating to create or revise the application.

Various techniques exist for measuring the complexity of an application. In some cases, these techniques analyze source code to measure a number of independent paths through the code. This may involve computing the complexity of an application by analyzing conditional statements, looping structures, and/or entry points in the source code. However, these traditional techniques for measuring complexity are not suitable for measuring complexities of applications developed using "no-code" or "low-code" software development platforms or other platforms that enable developers or users to create applications in a graphical user interface (GUI) environment.

SUMMARY

The present disclosure relates to systems, methods, apparatuses, computer program products, platforms, and other implementation that assess, measure and analyze complexities of applications and components developed using a software development and deployment platform. In certain embodiments, the development and deployment platform provides specialized graphical user interfaces (GUIs) that allow the generation of the advanced electronic forms. For example, the GUI-based environment can include a form generation interface that enables users to drag-and-drop components into development windows to define the content, functionality, workflow, background processes, and other criteria for the electronic forms. However, the approaches and implementations described herein can be applied to any no-code development platform. The development and deployment platform can include a complexity measurement component/unit that is configured to analyze the complexity of the applications, workflows, and modules developed using the platform, and to generate complexity analysis information related to the applications and components.

The complexity information derived by the implementations described herein can then be used to automatically reconfigure the initial arrangement prepared by a developer into a resultant arrangement of components with a substantially equivalent functionality but with a reduced complexity (e.g., reduced average complexity of the modules constituting the application). The automatic reconfiguration of the initial arrangement of components can be done by substituting groups/sets of application components (developed by the developer) with previously tested templates (available in a template library) that have known behavior and have been previously tested, and thus, due to their known/predictable behaviors, are deemed to have reduced or no complexity (in that their risk of failure, which is a primary issue when assigning a module or a component a complexity score, is effectively zero). Another procedure for reducing the complexity of an application being developed is by separating clusters of components into separate modules by grouping components according to various rules and algorithms (or using a trained learning engine) that identify suitable component grouping candidates. For example, when an application can be represented as a tree, a hub-spoke configuration, or some other hierarchical structure, parts of one or more branches or spokes of the application representation can be placed in modules whose complexity can be capped.

The complexity measurement component can be configured to analyze complexities of applications at an application level, workflow level, and module level, and to generate complexity analysis information at each level. The complexity analysis information generated at each level may vary, and can include various data, metrics and/or scores related to measuring complexity of the applications.

The complexity analysis information generated at a module level can include complexity measures or scores for each node that is incorporated into an application and/or a workflow associated with the application. For example, the nodes of an application and/or a workflow may include various components (e.g., decision components, calculator components, data mapping components, and/or other components), and the complexity measure or score of each node may be incremented based, at least in part, on the number of downstream workflow paths that originate from the node and the number of inputs that are collected by the node.

The complexity analysis information generated at a workflow level can include complexity measures or scores for workflows that are based, at least in part, on the number of independent paths included in the workflows. In certain embodiments, the number of independent paths included in the workflows can be determined by analyzing node diagrams that define the workflows. For example, the complexity measure or score for a workflow component can be computed by adding the total number of starting points in a node diagram for the workflow and the total number of branches stemming from a gateway or decision node in the node diagram.

The complexity analysis information generated at an application level can include complexity measures or scores for applications that indicate a total application complexity (e.g., a combined module level and workflow level complexity measure or score) and/or an average module complexity (e.g., indicating an average complexity of nodes or modules included in an application). For example, in certain embodiments, the complexity measures or scores for applications can be computed by summing and/or averaging the workflow and module complexity measures or scores.

Other types of complexity analysis information and metrics can also be generated by the complexity measurement component/unit. The complexity analysis information can be displayed to a user (e.g., an application developer) after a version of an application, workflow, module, and/or component has been created and/or while an application, workflow, module, and/or component is being created or updated using a software development and deployment platform.

The complexity analysis information can be utilized in various ways to optimize applications, workflows, and/or components. For example, the complexity analysis information can be utilized to optimize the sizing and designs of applications, workflows, modules, and/or components by identifying portions of applications, workflows, modules, and/or components that lack sufficient modularity, detecting portions of applications, workflows, modules, and/or components that may be difficult to maintain (e.g., due to anticipated future updates), and/or identifying portions of the applications, workflows, modules, and/or components that are too complex. Additionally, in some cases, the complexity analysis information may be utilized to identify portions of applications, workflows, modules, and/or components that can be performed by template components which have been well-designed and/or thoroughly tested, and which can reduce the complexity of the applications, workflows, modules, and/or components.

The optimization approaches described herein provide a powerful platform that can leverage complexity metrics (traditional metrics as well as new metrics as described herein) to increase productivity and reduce risks in applications. As business rules get added to an application being developed, the application development and deployment platforms of the present disclosure allow building of more and more complex applications. By leveraging the optimization techniques described herein, the apps being developed can perform complex tasks, but are themselves automatically configured to not be unduly complicated. The reduced number of defects that can be achieved from such optimization approaches results in huge cost savings as developers need to spend less time fixing defects and bugs.

In some of the embodiments described herein, the complexity metrics used include cyclomatic complexity metrics that help no-code builders and testers to determine the independent paths of executions, and evaluate the risks associated with the application. Three main areas that cyclomatic complexity metrics add to an improved application development process are the design, testing, and sizing areas. Particularly, in the design stage, cyclomatic complexity metrics can be used to identify potential weak portions of the overall design (e.g., by determining whether the average complexity across modules is to high), identify risk points in the application area that are too complex or would be hard to maintain and understand (e.g., by identifying modules and/or components with high complexity), and encourage the use of templates (which causes the complexity, whether of individual components/modules or of the average complexity scores, to drop). In the testing stage, cyclomatic complexity metrics can be used to measure testing coverage compared to the complexity score (e.g., by providing a percentage coverage score computed according to the total tests, divided by complexity). In the sizing stage, cyclomatic complexity metrics can be used to segregate applications according to their complexity, since complexity is a potential indicator of the overall size of the application (e.g., this can be performed by computing an overall total sum of complexity).

Thus, in some variations, a method is provided that includes receiving, by a processor-based device, configuration data representative of an initial arrangement of interlinked components forming a data application, and determining based on the configuration data, by the processor-based device, one or more complexity scores indicative of levels of complexities for one or more portions of the initial arrangement of interlinked components forming the data application. The method further includes automatically reconfiguring, by the processor-based device, the initial arrangement of interlinked components based on the computed one or more complexity scores to produce a resultant arrangement of interlinked components forming the data application.

Embodiments of the method may include at least some of the features described in the present disclosure, including one or more of the following features.

Determining the one or more complexity scores may include computing cyclomatic complexity scores for the one or more portions of the data application.

Determining the one or more complexity scores may include one or more of, for example, computing component complexity scores for one or more of the interlinked components forming the data application, and/or computing a workflow complexity score representative of a workflow complexity defined by the interlinked components.

Computing the component complexity scores for the one or more of the interlinked components may include determining implementation characteristics for a particular component of the one or more interlinked components, and deriving a component complexity score for the particular component based on the implementation characteristics for the particular component.

Deriving the component complexity score for the particular component or the workflow complexity score or workflow complexity score may include one or more of, for example, a) when the particular component is determined to be a decision component, incrementing the component complexity score by one for each cell of a decision table of the decision component, b) when the particular component is determined to be a calculator component to perform a calculation on two or more inputs to the calculator component, incrementing the component complexity score by one for each IF statement identified in the calculator component, c) when the particular component is determined to be a data mapper component to map input data to one or more tables managed through the data mapper component, incrementing the component complexity score by one for each row of the data mapper component, and for each IF statement identified in the data mapper component, and/or d) when the particular component is determined to be within a workflow process defining background processing involving two or more content components in the data application, incrementing the workflow complexity score by one for each start point identified in the workflow process, and incrementing the workflow complexity score by one for each branch out of a gateway identified in the workflow component.

The method may further include presenting the one or more complexity scores in an output diagram comprising a graphical representation of the data application.

Presenting the complexity scores may include presenting a workflow diagram illustrating at least a portion of the data application comprising the interlinked components, and presenting one or more of, for example, individual component complexity scores for the respective interlinked components, and/or a summary of the complexity scores.

Automatically reconfiguring the initial arrangement of interlinked components may include automatically reconfiguring the initial arrangement of interlinked components to produce the resultant arrangement with a resultant plurality of portions comprising interlinked components, with the resultant plurality of portions associated with an average resultant complexity that is lower than an average initial complexity for the one or more portions of the initial arrangement of interlinked components.

Automatically reconfiguring the initial arrangement of interlinked components may include reconfiguring the initial arrangement of interlinked components forming the data application based on a learning engine implementation applied to the configuration data representative of the initial arrangement of the interlinked components forming the data application.

Automatically reconfiguring the initial arrangement of interlinked components may include separating the initial arrangement of interlinked components into multiple modular portions comprising the resultant arrangement of interlinked components.

Separating the initial arrangement of interlinked components into the multiple modular portions may include determining cumulative complexity scores for a hierarchical structure of at least a portion of the initial arrangement, where the cumulative complexity scores for each node of the hierarchical structure are equal to sum of cumulative complexity scores of respective child nodes of the each node, and traversing the hierarchical structure and separating a portion of components comprising a particular node in the traversed hierarchical structure and child nodes of the particular node into a separate component module based, at least in part, on a determination that the cumulative score of the particular node is less than a pre-determined maximum complexity threshold.

The method may further include updating, upon separating the portion of components into the separate component module, a group of cumulative complexity scores that depended on the complexity scores of the components in the component module to decrease the group of cumulative complexity scores by the cumulative score of the particular node, and continuing traversing a remainder of the hierarchical structure using the updated group of cumulative complexity scores.

Automatically reconfiguring the initial arrangement of interlinked components may include identifying for at least one of the one or more portions of the initial arrangement of the interlinked components at least one respective equivalent template of interlinked components from a library of pre-determined templates, and replacing the at least one of the one or more portions of the initial arrangement with the identified at least one respective equivalent template of interlinked components.

In some variations, a system is provided that includes one or more computing devices comprising one or more processors, and one or more non-transitory storage devices for storing instructions. When executed by the one or more processors, the instructions cause the one or more computing devices to receive configuration data representative of an initial arrangement of interlinked components forming a data application, and determine based on the configuration data one or more complexity scores indicative of levels of complexities for one or more portions of the initial arrangement of interlinked components forming the data application. The instructions further cause the one or more computing devices to automatically reconfigure the initial arrangement of interlinked components based on the computed one or more complexity scores to produce a resultant arrangement of interlinked components forming the data application.

In some variations, a non-transitory computer readable media is provided, that is programmed with instructions, executable on one or more processors of a computing system, to receive configuration data representative of an initial arrangement of interlinked components forming a data application, determine based on the configuration data one or more complexity scores indicative of levels of complexities for one or more portions of the initial arrangement of interlinked components forming the data application, and automatically reconfigure the initial arrangement of interlinked components based on the computed one or more complexity scores to produce a resultant arrangement of interlinked components forming the data application.

Embodiments of the system and non-transitory computer readable media may include at least some of the features described in the present disclosure, including at least some of the features described above in relation to the method.

Other features and advantages of the invention are apparent from the following description, and from the claims.

BRIEF DESCRIPTION OF THE DRAWINGS

These and other aspects will now be described in detail with reference to the following drawings.

FIG. 4 is an example customization interface for a text field component.

FIG. 5 is an example customization interface for a checkbox component.

FIG. 6 is an example customization interface for an e-signature component.

FIG. 7 is an example customization interface for a date selector component.

FIG. 8 is an example customization interface for a decision component.

FIG. 9A is an example customization interface for a workflow component.

FIG. 13 is an example interface that includes a version history timeline.

FIG. 16B is another example customization interface that is configured in a comparison mode.

FIG. 18 is an exemplary interface that may be displayed in connection with performing a restore operation.

FIG. 25 are diagrams of an initial application structure and a corresponding resultant application structure with reduced complexity.

Like reference symbols in the various drawings indicate like elements.

DESCRIPTION

Figure 1:
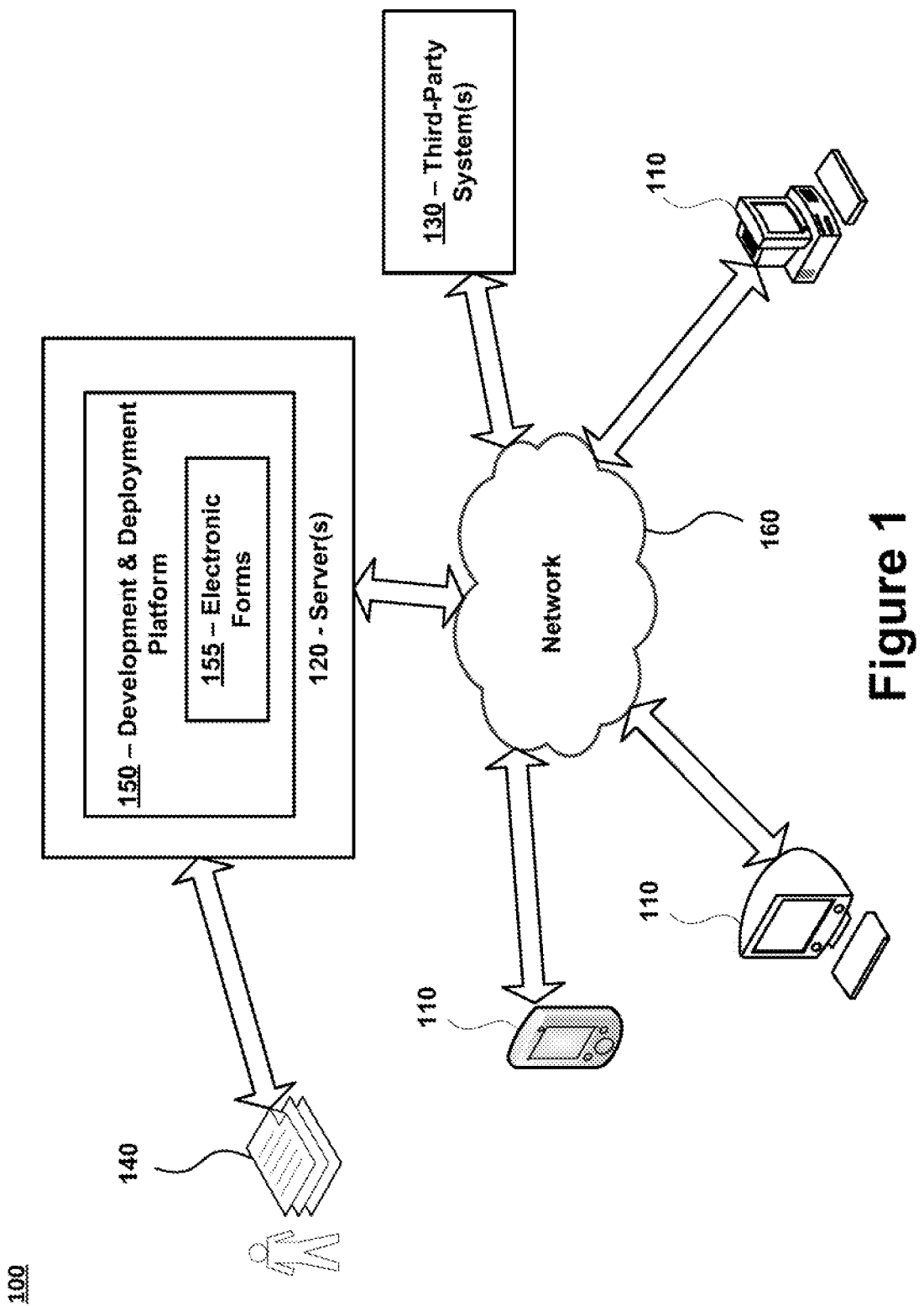
FIG. 1 is a diagram of an example system for developing and deploying electronic forms.

The present disclosure is directed to implementations to determine complexity measures for an application (e.g., to implement an electronic form and related processing) and/or for individual components (or groups of components) comprising the application, and to reconfigure the initial arrangement of components to a resultant arrangement of components. The reconfiguration can optimize the arrangement of components so that the complexity of the re-configured application (e.g., as measured by average complexity of component modules constituting the application) is lower than the complexity of the initial component arrangement developed by the user (e.g., also measured as average complexity of the modules constituting the initial arrangement).

Applications, such as those developed in the Unqork application development environment, comprise modules and workflows, where modules include one or more components. Components are the basic building blocks to the application's functionalities. The complexity of these components is proportional to the overall complexity. As an application is being developed, components, modules, and workflows are added to build new functionalities to create a more complex application. Having a quantifiable metric to measure application complexity and design helps identify the high-risk applications and develop approaches for decreasing maintenance time, productivity issues, and technical debt.

Applications are based on business rules, so the essence of application complexity comes from the combination of user paths within the application. Thus, cyclomatic complexity (as will be discussed in greater detail below) can be used to measuring complexity in no-code applications (e.g., applications developed through the drag-and-drop framework, as more particularly described below). Cyclomatic complexity is a software metric used to indicate the complexity of a program. It measures the number of "linearly independent paths" or branches in a given scope. If there are more decision points, then the complexity of the program is higher. If the program has a high complexity measure, then the probability of error is high, increasing maintenance time and troubleshooting. Cyclomatic complexity measure is important during application development—using the score to limit the complexity of an application. The score also has implications for software testing and risk evaluation. It determines the number of test cases necessary to achieve thorough test coverage (branch coverage<=cyclomatic complexity<=number of paths). The cyclomatic measure also shows a positive correlation to the number of defects and predictability to program size. Using cyclomatic early in the cycle reduces application risk.

The complexity measure(s) computed (whether cyclomatic measures, or some other metric) can be presented on a graphical user interface (that may also be used to present an application development environment) to provide users with information to allow them to make modifications to the application's configuration that reduces the overall complexity (and/or average complexity) of the arrangement of components constituting the application. In some embodiments, the implementations described herein may be adapted to automatically reconfigure an initial arrangement of components (e.g., the initial application design, made by the user/developer) to generate a resultant arrangement of components that implements an equivalent functionality as that implemented by the initial design, but with reduced complexity (be it reduced overall complexity, or average complexity of components modules in the applications' structures). As will be described in greater detail below, the automatic reconfiguration of an arrangement of interlinked components (with a corresponding complexity) can be implemented using, for example, a learning engine, or analytical procedures (e.g., based on rules, or based on computational algorithms). When using a learning engine to automatically reconfigure the initial arrangement prepared by the user, such a learning engine can be adapted (via an initial and on-going training) to receive as input the initial configuration of the component arrangement forming the application to be implemented, and to produce output data representing a resultant configuration of a component arrangement with reduced complexity. The learning engine can be trained, for example, to recognize certain portions of the arrangement of interlinked components as potentially replaceable by pre-determined templates of components that achieve an equivalent functionality as the recognized portion but with a reduced complexity (e.g., because such pre-defined templates may have been sufficiently tested that risk of failure due to bugs is very low, or even non-existent, thus rendering such templates as having little or no complexity impact).

Thus, in some embodiments, a method is provided that includes receiving, by a processor-based device, configuration data representative of an initial arrangement of interlinked components forming a data application, determining based on the configuration data, by the processor-based device, one or more complexity scores indicative of levels of complexities for one or more portions of the initial arrangement of interlinked components forming the data application, and automatically reconfiguring the initial arrangement of interlinked components based on the computed one or more complexity scores to produce a resultant arrangement of interlinked components forming the data application. In some examples, automatically reconfiguring the initial arrangement of interlinked components may include automatically reconfiguring the initial arrangement of interlinked components to produce the resultant arrangement with a resultant plurality of portions comprising interlinked components, with the resultant plurality of portions associated with an average resultant complexity that is lower than an average initial complexity for the one or more portions of the initial arrangement of interlinked components. In some embodiments, automatically reconfiguring the initial arrangement of interlinked components may include identifying for at least one of the one or more portions of the initial arrangement of the interlinked components at least one respective equivalent template of interlinked components from a library of pre-determined templates, and replacing the at least one of the one or more portions of the initial arrangement with the identified at least one respective equivalent template of interlinked components.

The present disclosure will first discuss an example development environment to develop applications, in which the use of complexity measurements can be integrated to achieve more optimized application configurations based on the initial application configuration designed by a developer, and the complexity scores derived for that initial developed application configuration. Following the discussion of the development environment, a discussion about version control implementations will be provided. Lastly, a discussion regarding procedures, techniques, and implementations for computing complexity scores for the developed application, its modules, and components, and for automatically reconfiguring the initial configuration or layout of the application to achieve a resultant more optimized configuration (that has a lower complexity) will be provided.

Application Development Environment

With reference to FIG. 1, an example system 100 implementing an application development framework that includes complexity measurement and application reconfiguration/optimization functionality is shown. The system 100 includes a development and deployment platform 150 implemented one or more servers 120. The development and deployment platform 150 can configured to perform any and all functions described herein with respect to generating and/or creating electronic forms 155, hosting and/or providing access to the electronic forms 155, managing and/or controlling versions of the electronic forms, measuring application complexity, optimizing the applications' configuration (based on the measured complexity), and/or deploying and/or collecting data and information via the electronic forms 155. For example, the development and deployment platform 150 enables users (e.g., non-technical users with no programming knowledge) to generate and/or create advanced electronic forms 155. The development and deployment platform 150 can provide a software development toolkit that allows the electronic forms 155 to be quickly and easily created and customized in a GUI-based environment. After the electronic forms 155 are created, the development and deployment platform 150 can also perform functions associated with the hosting the electronic forms 155 (e.g., to enable end-users to access the forms), optimizing the developed forms, collecting and storing data submitted via the electronic forms 155, and/or providing one or more third-party systems 130 with access to the collected data. The development and deployment platform 150 can be further configured to perform functions associated with archiving, comparing, restoring, and/or managing multiple versions of electronic forms, electronic templates, workflows, transforms, data models, and/or other features associated with the development and deployment platform.

The electronic forms 155 can include web-based forms (e.g., which are accessible via a network 160, which may be a packet-based network such as the public Internet) and/or local application forms 155 (e.g., which are presented by local applications running a computing device 110 and/or server 120). In certain embodiments, the electronic forms 155 can be implemented using Hypertext Markup Language (HTML) and/or one or more web-based programming languages (e.g., such as JavaScript, PHP, CSS, Perl, SQL, Ruby, and/or other web-based languages). The electronic forms 155 can alternatively, or additionally, be implemented in other programming languages such as Java, C++, C, Python, and/or other languages. The electronic forms 155 can represent an application with an interface layer for collecting data, and logic layer for implementing rules associated with the electronic forms 155. The electronic forms 155 can also include, communicate with one or more databases, which provide a storage layer for the electronic forms 155.

One or more computing devices 110 may be configured to access the development and deployment platform 150 over a network 160. The network 160 may represent any type of communication network, e.g., such as one that comprises a local area network (e.g., a Wi-Fi network), a personal area network (e.g., a Bluetooth network), a wide area network (wireless or wired), an intranet, the Internet, a cellular network, and/or other types of networks. Additionally, or alternatively, the development and deployment platform 150 may be accessed directly from the device or devices hosting the platform (e.g., via one or more input devices attached to the servers 120 hosting the development and deployment platform 150).

The computing devices 110 may represent desktop computers, laptop computers, mobile devices (e.g., smart phones, personal digital assistants, tablet devices, and/or any other device that is mobile in nature), and/or other types of computing devices. In certain embodiments, the development and deployment platform 150 is stored on one or more servers 120. The one or more servers 120 may generally represent any type of computing device, including any of the computing devices 110 mentioned above. For example, the one or more servers 120 may include one or more computing devices that execute web servers for communicating with the computing devices 110, third-party systems 130, and other devices communicating over the network 160. The one or more servers 120 may be configured to provide interfaces on the computing devices 110 for performing any and all of the functions offered by the development and deployment platform 150.

The users accessing the development and deployment platform 150 (e.g., either directly from the device hosting the platform and/or indirectly by a computing device 110 over the network 160) may include individuals who are seeking to build, create, and/or deploy the electronic forms 155. For example, the development and deployment platform 150 may enable administrators associated with hosting the platform 150 and/or other individuals (e.g., individuals associated with one or more third-party systems 130) to create and/or deploy the electronic forms 155. The users accessing the development and deployment platform 150 can also include individuals that are seeking to submit data via electronic forms 155 after the electronic forms 155 are created. For example, the users may utilize the computing devices 110 to access electronic forms hosted by the development and deployment platform 150 and to submit information via the electronic forms 155.

The development and deployment platform 150 may be hosted by an entity that provides assistance to one or more third-party systems 130 with collecting data and information. For example, the third-party systems 130 may be associated with entities that provide products and/or services in various industries (e.g., such as in the insurance, healthcare, financial, real estate, travel, marketing, advertising, education, accounting, and/or other industry). The third-party systems 130 may include websites, computing equipment (e.g., such as computing devices 110 and servers 120), and back-end systems that are used to provide customers with various products and/or services, some or all of which may rely on or utilize data that is provided by the customers via electronic forms 155 and/or hardcopy forms 140 (e.g., paper forms). The development and deployment platform 150 can be used to create, design, and deploy electronic forms 150 for the third-party systems 130. The electronic forms 150 created for the third-party systems 130 can be hosted on the development and deployment platform 150 and/or can be hosted by the third-party systems 130. The development and deployment platform 150 can be configured to collect and store any data and information received by the electronic forms 155. The development and deployment platform 150 can also be configured to provide the third-party systems 130 and/or individuals associated with the third-party systems 130 with access to the data and information collected via the electronic forms 155.

In some embodiments, the development and deployment platform 150 can also be configured to receive and process hardcopy forms 140 (e.g., which may include paper forms or the like). For example, upon receiving the hardcopy forms 140, the development and deployment platform 150 may convert the hardcopy forms 140 to electronic forms 155. This conversion process may include scanning into the hardcopy forms 140 (e.g., using optical scanning equipment), analyzing the scanned data to automatically extract the information being provided by the hardcopy forms 140 (e.g., via Optical Character Recognition, or OCR approaches, optionally in conjunction with natural language processing (NPL) systems), and automatically populating fields of corresponding electronic forms 155 (or corresponding APIs associated with the forms) with the information from the hardcopy forms 140. The data associated with the converted forms can then be made available to the third-party systems 130 via the development and deployment platform 150.

The development and deployment platform 150 can provide an end-to-end system for collecting and processing information submitted in any medium (e.g., including both hardcopy forms 140 and electronic forms 155) for the third-party systems 130. The development and deployment platform 150 can also perform functions for validating the information received by the forms to ensure that the information is complete and to eliminate any NIGO ("not in good order") issues. This allows the third-party systems 130 to focus to their core functions and roles associated with providing products and/or services, and to avoid spending time and resources collecting and validating form information. In certain embodiments, the development and deployment platform 150 can be integrated with the third-party systems 130 (e.g., such that the entity or system hosting the development and deployment platform 150 is the same entity or system that is affiliated with the third-party systems 130).

The system 100 of FIG. 1 may include any number of computing devices 110, any number of servers 120, and any number of third-party systems 130. All the system components, including the computing devices 110, servers 120, third-party systems 130, and development and deployment platform 150 can be configured to communicate directly with each other and/or over the network 160 via wired or wireless communication links, or a combination of the two. Each of the computing devices 110, servers 120, third-party systems 130, and development and deployment platform 150 can also be equipped with one or more transceiver devices, one or more computer storage devices (e.g., RAM, ROM, PROM, SRAM, etc.), and one or more processing devices (e.g., a central processing unit) that are capable of executing computer program instructions. The computer storage devices may be physical, non-transitory mediums.

Figure 2:
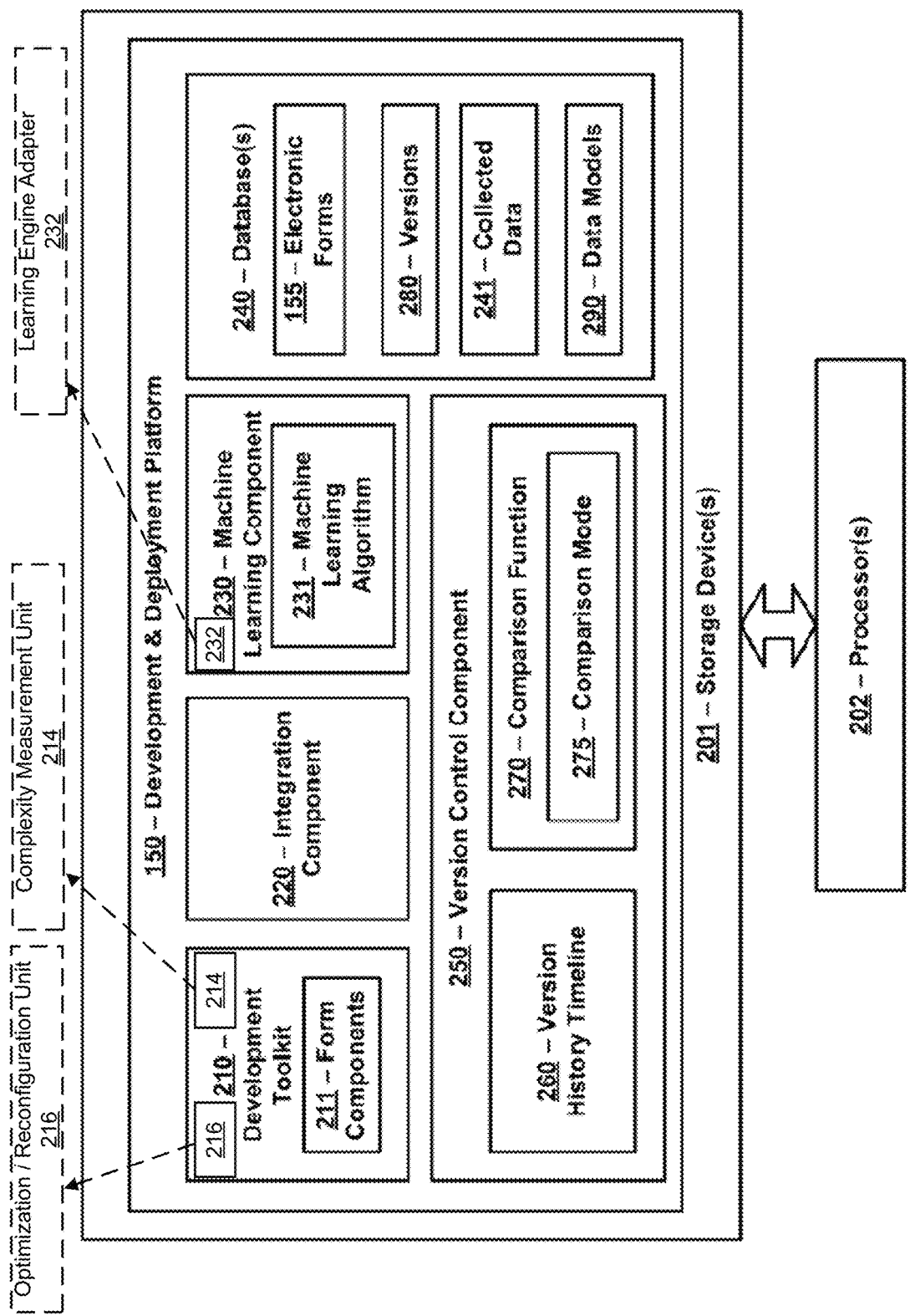
FIG. 2 is a block diagram depicting a detailed view of an example development and deployment platform.

With reference next to FIG. 2, a block diagram providing a detailed view of the example development and deployment platform 150 depicted in FIG. 1 is shown. The development and deployment platform 150 can be stored on one or more storage devices 201 that are in communication with one or more processors 202. The one or more storage devices 201 can include: (i) non-volatile memory, such as, for example, read only memory (ROM) or programmable read only memory (PROM); and/or (ii) volatile memory, such as, for example, random access memory (RAM), dynamic RAM (DRAM), static RAM (SRAM), etc. In these or other embodiments, storage devices 201 can comprise: (i) non-transitory memory and/or (ii) transitory memory. The one or more processors 202 can include one or more central processing units (CPUs), controllers, microprocessors, digital signal processors, and/or computational circuits. The processors 202 may also include, in some embodiments, one or more graphics processing units (GPU's, such as NVIDIA GPU's), special purpose logic circuitry, e.g., an FPGA (field programmable gate array), an ASIC (application-specific integrated circuit), a DSP processor, an accelerated processing unit (APU), an application processor, customized dedicated circuitry, etc., to implement, at least in part, the processes and functionality for the platforms, systems, processes, and methods described herein.

The one or more storage devices 201 store data, code, and instructions associated with implementing a development toolkit 210, an integration component 220, a machine learning component 230, a database 240, and a version control component 250. The one or more processors 202 are configured to execute instructions associated with these components. Each of these components is described in further detail below.

The development toolkit 210 can be configured to perform any/or all functions described herein with respect to generating, creating, and/or updating electronic forms 155. In certain embodiments, the development toolkit 210 is configured to display one or more GUIs that enable non-technical users to create advanced forms. As discussed in further detail with respect to FIG. 3, the GUIs provided by the development toolkit 210 can include a form generation interface that enables users to drag-and-drop form components 211 into a development window. The form components 211 may correspond to pre-defined and/or prepackaged software bundles that are used to define and customize the content, functionality, design layout, workflow, event handling, data models, and other criteria for the electronic forms 155. For example, the form components 211 may correspond to pre-packaged software bundles that can be integrated into the electronic forms being created to define and customize input fields (e.g., which may include text boxes, radio buttons, check boxes, text areas, submit buttons, dropdown menus, file upload fields, etc.), design layouts (e.g., which may include pre-configured tables, columns, window panels, and/or other layout features for organizing and presenting information on the forms), application functions (e.g., pre-configured applications modules that can include date selectors, e-signature fields, calculators, text editors, or the like), templates (e.g., which can include previously created forms or portions of forms that can be reused or recycled), data models, and advanced control features (e.g., which allow for advanced control of background processes for event handling and workflow control). The advanced control components that are made available via the GUI-based development environment permit users to precisely define various event processing and workflow management operations associated with the electronic forms. Examples of advanced control components, such as a decision component and a workflow component, are discussed in further detail below.

Each of the form components 211 may be associated with a customization interface that enables the users creating the electronic forms 155 to customize various aspects of the form components 211 that are added to the electronic form 155. For example, the customization interfaces may permit the users to customize the parameters, content, functionality, and/or other features of the components to be customized. Examples of example customization interfaces are discussed below with respect to FIGS. 4-8 and 9A-9B. After the user creating the form has finished adding and customizing the form components 211 for the electronic forms 155, the user can select an option to save the electronic forms 155 in the database 240. The user can access any saved forms via the development toolkit 210 at a later time in order to update and/or modify the saved forms.

As will also become apparent below, in some implementations, the development toolkit 210 may also include a complexity measurement/derivation unit 214 to compute complexity of the overall application, or of individual modules and components comprising the application being developed (such as the application 155). Also included in some embodiments of the development toolkit is an optimization/reconfiguration unit 216 that is adapted to optimize an initial application configuration for the electronic form 155 being developed by reconfiguring the interlinked arrangement created by a user into a resultant, optimized arrangements that has a reduced complexity. Complexity optimized arrangements can be generated through a number of approaches that seek to mitigate some of the complexity and risk associated with an initially created arrangement of interlinked components. One such approach is by replacing groups of interlinked components with component templates that perform equivalent functionality, but due to those templates having been tested before, the component templates are deemed to have a reduced (or non-existent) failure risk (and thus their complexity is also deemed to be reduced or non-existent). Another optimization approach is to separate clusters of components into modules whose complexity can be controlled or mitigated. The various approaches for reducing complexity through reconfiguration of initial arrangements of interlinked components is achieved, in some of the approaches discussed herein, by using trained learning engines that can identify component snippets as good candidates for replacement by pre-determined component templates, and/or can identify and separate components into one or more components modules with a capped complexity level.

With continued reference to FIG. 2, the development and deployment platform 150 can allow form builders or other users to create, store, and/or update data models 290 for use in creating and/or updating electronic forms 155. The data models 290 can be utilized to define data structures that are used to represent various types of objects. For example, data models 290 can be used to define data structures for objects corresponding to persons, vehicles, contracts, products or services (e.g., products or services associated with insurance, real estate, financial, and/or medical industries), etc. The data models 290 can store information that defines or identifies the form components 211 (e.g., input fields and/or templates) utilized to collect information pertaining to the objects. The data models 290 can also store information for mapping the form components 211 associated with the objects to databases and/or database schemas for storage. The data models 290 can also store various rules that are to be associated with the objects. For examples, the data models 290 can be utilized to enforce rules for collecting data pertaining to the objects (e.g., to enforce business rules, regulatory compliances, and/or government policies on the data) and/or to associate data models 290 with other objects.

In some embodiments, after the user has added (or while the user is adding) the form components 211, the development and deployment platform 150 may analyze the data models 290 associated with the form components 211 and display warnings and/or notifications associated with the form components 211 to the user. In some cases, the warnings and/or notifications may indicate that data expected to be captured via an input field component and/or other form component 211 may include personal identifiable information (e.g., social security number, driver's license number, bank account number, credit card number, etc.) and/or other sensitive information (e.g., salary information, birth date, etc.) that should not be stored in a database 240. For example, warnings and/or notifications may be displayed by analyzing information (e.g., textual descriptions, field names, and/or variable names) in the data models 290 associated with the added form components 211. The warnings and/or notifications can be displayed in various formats (e.g., icons, pop-up windows, highlighting, etc.). Other similar types of warnings and/or notifications can be presented to users who have added, or who are adding, form components 211 to an electronic form 155.

Like the other features that are created and/or updated on the development and deployment platform 150, GUIs can be accessed to easily create and update the data models 290. For example, the GUIs may be accessed that enable a user to specify input fields to be associated with an object, map the input fields of the object to one or more databases or database schemas, specify rules associated with the data model 290, and/or associate the data model 290 with one or more additional objects (e.g., to associate the data model 290 as a subclass or superclass of one or more additional objects).

To illustrate by way of example, one or more interfaces accessible via the development and deployment platform 150 can enable a user to create a data model for a "person" object. The one or more interfaces may enable the user to select input fields to be associated with the person object (e.g., input fields corresponding to an individual's name, age, date of birth, address, etc.), map the input fields to particular database schemas for storage, define rules for the object (e.g., rules indicating that the date of birth should be specified in digits, or rules indicating whether certain input fields are optional and/or required), and/or associate the person object with one or more additional objects (e.g., to associate the person object with an "employee" object or "customer" object, each of which may be associated with a separate data model 290 for defining additional aspects of those objects). The one or more interfaces for creating and/or updating the data models 290 can include and display various options that enable users to perform these and other functions.

In certain embodiments, the data model 290 for an electronic form 155 can be created or generated automatically by the development and deployment platform 150 based on the specified settings and/or configurations of the electronic form 155. For example, after a user has created and customized an electronic form 155 (e.g., using one or more form generation interfaces 301), the development and deployment platform 150 can automatically generate the data model 290, which may include automatically mapping input field components 312 and/or form components 211 to one or more databases or database schemas. After the data model 290 is automatically generated, the user can then access one or more interfaces associated with the data model 290 to enable editing and/or customization of the data model 290.

The development and deployment platform 150 can additionally, or alternatively, permit a user to initially create and customize a data model 290 that can be utilized to automatically generate a corresponding electronic form 155. For example, a user who wishes to create an electronic form 155 may initially specify a data model 290 to be used for the electronic form (e.g., by mapping or correlating desired input field components and/or other form components 211 with one or more databases or database schemas). The development and deployment platform 150 may then analyze the data model 290 and utilize the data model 290 to automatically create a corresponding electronic form 155 (e.g., which includes input field components and/or other form components 211 corresponding to the configurations in the data model 290). After the electronic form 155 is automatically generated, the user can then access one or more interfaces associated with the electronic form 155 to enable editing and/or customization of the electronic form 155.

The integration component 220 can be configured to perform any and/or all functions described herein with respect to deploying completed electronic forms 155 and/or making the electronic forms 155 available to users. For example, after a user creates an electronic form 155 utilizing the development toolkit 210, the integration component 220 enables the user to deploy the electronic form 155. Once the electronic form 155 is deployed, various customers (e.g., individuals seeking insurance or financial products and services) or other users can access the electronic form 155 and submit information via the electronic form 155.

Any information collected via an electronic form 155 that has been deployed may be saved and stored as collected data 241 in the database 240. The collected data 241 may include data and information corresponding to one or more products and/or services being offered by entities associated with the third-party systems 130. For example, the collected data 241 saved in the database may include personal information (e.g., name, age, address, etc. associated with a customer), product information (e.g., selections made by the customer which correspond to options for products and/or services associated with the electronic form), documents (e.g., which may be uploaded via the form), etc.

The integration component 220 can deploy the electronic forms 155 in various ways. In certain embodiments, the integration component 220 deploys the electronic forms 155 by storing the electronic forms 155 on a server(s) 120 and/or in a cloud environment associated with the development and deployment platform 150. In such embodiments, the electronic forms 155 may be managed and/or hosted by the development and deployment platform 150. Customers or other users seeking to submit information via the electronic forms 155 can then access the development and deployment platform 150 (e.g., using the computing devices 110) to provide information via the electronic forms 155. Additionally, or alternatively, the integration component 220 may deploy the electronic forms 155 by integrating the forms into one or more third-party systems 130. In such embodiments, the electronic forms 155 can be stored on a server(s) and/or in a cloud environment associated the third-party systems 130. Customers or other users seeking to submit information via the electronic forms 155 can then access the third-party systems 130 (e.g., using the computing devices 110) to provide information via the electronic forms 155. All data collected via the electronic forms 155 (e.g., such as the collected data 241), whether hosted on the development and deployment platform 150 and/or the third-party systems 130, can be stored in the database 240.

Once deployed, the integration component 220 and/or other components of the development and deployment platform 150 can execute a form passing procedure that enables the forms to be passed among multiple devices (e.g., computing devices 110) while being filled out or during completion. The form passing procedure can be useful for protecting confidential and/or sensitive information that is being submitted via the forms, and for masking such information from certain individuals who are assisting with the completion of the forms. The software development toolkit 211 described above can include components and/or other options for integrating the form passing procedure into the electronic forms 155.

Consider a scenario where an intermediary (e.g., a broker, agent, and/or other individual) is assisting a customer with filling out an electronic form 155. In some cases, the electronic form 155 may request confidential and/or sensitive information (e.g., which may be related to medical records, legal records, governmental records, etc.) and the customer may not want to disclose this information to the intermediary. In this scenario, while the intermediary is filling out the electronic form 155, the intermediary may select an option for passing the electronic form 155 from a computing device 110 associated with the intermediary to a computing device 110 of the customer (e.g., the customer's mobile device). The form can be passed to the device of the customer via the network 160 in various ways (e.g., via a link included in an e-mail or text sent to the customer, an interface presented on by application stored on the customer's device, a webpage or website that the customer can access, and/or in other ways). This enables the customer to provide the confidential and/or sensitive information without disclosing the information to the intermediary. After the customer has completed the portion of the electronic form 155 requesting the confidential and/or sensitive information, the customer can submit the electronic form 155 and/or pass the form back to the intermediary for completion. If the electronic form 155 is passed by back to the intermediary, the rules associated with the electronic form can prevent the intermediary from viewing and/or accessing the confidential and/or sensitive information.

The above example described an application of the form passing procedure among two individuals. However, it should be understood that the form passing procedure can be utilized to share an electronic form 155 among any number of individuals, and that the form passing procedure can be utilized in other contexts to permit sharing of the electronic forms 155.

The machine learning component 230 can include one or more machine learning algorithms 231 that are configured to analyze the data stored in the database 240 (e.g., the collected data 241) and/or other data for a variety of purposes. In certain embodiments, the machine learning algorithms 231 analyze the collected data 241 to optimize the products and/or services being offered by the third-party systems 130. For example, the machine learning algorithms 231 analyze the collected data 241 (e.g., which may be aggregated over time) to identify rules, parameters, and/or other features of the products that can be modified or removed to optimize the products and/or services being offered. The machine learning component 230 may display recommendations to change or modify such data on an interface along with statistics associated with the analysis of the stored data.

To illustrate by way of an example, consider a scenario in which the development and deployment platform 150 is utilized to provide assistance to a third-party system 130 that provides insurance products and/or services. Forms may be provided for onboarding new customers in connection with the products and/or services, and also for processing insurance claims submitted in connection with existing customers. In this scenario, the machine learning component 230 (e.g., using the machine learning algorithms 231) may be configured to analyze contents of the database 240 to identify rules that have a negative impact on the underwriting process for the insurance products and/or services. The rules may be integrated into the electronic forms 155 corresponding to the products and/or services as input fields, parameters, and/or logic that is required for validation of the onboarding form. By analyzing data associated with the products and/or services (e.g., including the collected data 241 associated with previously submitted insurance claims), the machine learning component 230 may identify rules that should be modified or removed to optimize the products and/or services. This may include identifying rules that have a minimal impact on the risks associated with the insurance products and/or services (e.g., risks associated with the underwriting process), but which may be required to validate completion of the electronic forms 155 associated with the products and/or services. The machine learning component 230 may then generate an interface that displays recommendations and statistical data related to the analysis. The interface may also provide options for automatically modifying the portions of the form that correspond to the identified rules and/or accessing the electronic form via the development toolkit 210 to enable editing of the electronic form.

The machine learning component 230 can be configured to perform similar analyses for other types of products and/or services offered by the third-party systems. For example, the machine learning component 230 can be configured to optimize products and/or services offered in connection with the healthcare, finance, real estate, travel, marketing, advertising, education, and/or accounting industry.

The machine learning component 230 can also be configured to make predictions associated with existing and future products and services. For example, the machine learning algorithms 231 may analyze the data aggregated by the platform 150 to predict trends associated with such products and services. This may include predicting a likelihood of success and/or failure of a product or service based on analysis of the aggregated data. Such predictions consider the specific types of products and/or services being offered, the particular geographic areas where the products and/or services being offered, demographic information (e.g., age, sex, race, etc.) of an existing or anticipated customer base, and/or other information that may be discerned from the aggregated data.

In certain embodiments, the machine learning component 230 also executes functions for enriching the data collected by the platform. This may include enriching data collected by the platform automatically via hard copy forms 140. For example, the machine learning algorithms 231 can be configured to convert hard copy forms 140 to electronic forms 155 by automatically mapping data from the hard copy forms 140 to electronic forms 155. The automatic mapping of forms may be performed by training the machine learning component 230 using a set of training data that teaches the machine learning algorithms 231 to determine appropriate mapping information.

The machine learning component 230 can also analyze any information collected via the hardcopy forms 140 and/or electronic forms 155 for potential validation and/or NIGO-related issues, and compute related confidence scores. The confidence scores computed by the machine learning component can indicate confidence measures associated with the accuracies of conversions (e.g., conversions from hardcopy forms 140 to electronic forms 155), confidence measures associated eliminating validation and NIGO-related issues, and/or other similar types of metrics.

The machine learning component 230 may also be used to perform complexity-reducing optimization procedures. For example, a learning model can be realized to identify collections of components (as prepared by a developer) whose combined functionality can be replaced by one of pre-determined templates that have previously been tested and are therefore considered to be of low risk (and thus of low complexity). Another learning model that may be implemented using the machine learning component 230 is one adapted to identify clusters of components that can be grouped into separated modules (whose behavior can be segregated from the rest of the application) with capped complexity. The identified clusters of components can then be severed from the remainder of the application in a way that its complexity (including its testability) can be managed independently of the remainder of the application being developed.

In embodiments in which the machine learning component 230 is utilized as part of the application development process (e.g., to optimize the configuration of the interlinked arrangements of components constituting the application), the development and deployment platform 150 may further includes a learning engine controller/adapter 232 configured to determine and/or adapt the parameters (e.g., neural network weights) of the learning engine that would produce output representative of identified grouping of components whose configuration can be optimized in some sense (e.g., to separate into modules, or to replace with templates of equivalent functionality). To train the specific learning model being implemented by the machine learning component 230, training data comprising data representative of component arrangements (of varying complexities and functionalities) is provided to the controller/adapter 232. The training data may also include label data representative of the classifications of such component arrangements as being replaceable (e.g., by an equivalent template) or separable (to form a stand-alone module of components) from the rest of the overall arrangement of components. The training data thus defines a sample of the ground truth that is used to train the learning model implemented through the machine learning component 230 (with such training occurring offline and/or during runtime). This training data is used to define the parameter values (weights, represented as the vector θ) assigned to links of, for example, a neural network implementation realized on the machine learning component 230. The weight values may be determined, for example, according to a procedure minimizing a loss metric between predictions made by the neural network and labeled instances of the data (e.g., using a stochastic gradient descent procedure to minimize the loss metric). The computed parameter values can then be stored at a memory storage device (e.g., the storage devices 201). After a learning-engine based implementation has become operational (following the training stage) and can process actual runtime data, subsequent run-time training may be intermittently performed (at regular or irregular periods) to dynamically adapt the learning model to new, more recent training data samples in order to maintain or even improve the performance of the learning model.

The machine learning component (to implement one or more application optimization approaches) may be implemented as neural networks. Such neural networks may be realized using different types of neural network architectures, configuration, and/or implementation approaches. Examples neural networks that may be used include convolutional neural network (CNN), feed-forward neural networks, recurrent neural networks (RNN), etc. Feed-forward networks include one or more layers of nodes ("neurons" or "learning elements") with connections to one or more portions of the input data. In a feedforward network, the connectivity of the inputs and layers of nodes is such that input data and intermediate data propagate in a forward direction towards the network's output. There are typically no feedback loops or cycles in the configuration/structure of the feed-forward network. Convolutional layers allow a network to efficiently learn features by applying the same learned transformation(s) to subsections of the data. Other examples of learning engine approaches/architectures that may be used include generating an auto-encoder and using a dense layer of the network to correlate with probability for a future event through a support vector machine, constructing a regression or classification neural network model that indicates a specific output from data (based on training reflective of correlation between similar records and the output that is to be identified), etc.

Implementation described herein, including implementations using neural networks, can be realized on any computing platform, including computing platforms that include one or more microprocessors, microcontrollers, and/or digital signal processors that provide processing functionality, as well as other computation and control functionality (such as those described in relation to the processors 202 of FIG. 2). As noted, the computing platform can include one or more CPU's, one or more graphics processing units (GPU's, such as NVIDIA GPU's), an accelerated processing unit (APU), an application processor, customized dedicated circuitry, etc., to implement, at least in part, the processes and functionality for the neural network, processes, and methods described herein. The various learning processes implemented through use of the neural networks may be configured or programmed using TensorFlow (a software library used for machine learning applications such as neural networks). Other programming platforms that can be employed include keras (an open-source neural network library) building blocks, NumPy (an open-source programming library useful for realizing modules to process arrays) building blocks, etc.

Continuing with FIG. 2, the database 240 can store any and all data associated with the development and deployment platform 150. This may include any data associated with creating electronic forms 155, any data collected via the electronic forms 155, any data associated with settings for the third-party systems 130, any data associated with storing versions 280 of electronic forms 155, and/or any other data. Also, while the database 240 in FIG. 2 is depicted as a single component, it should be understood that the database 240 may represent a plurality of databases 240. In certain embodiments, separate databases 240 can be maintained for each of the third-party systems 130 serviced by the development and deployment platform 150 and/or for each of the electronic forms 155 created by the platform 150.

As mentioned above, the version control component 250 can be configured to perform functions associated with archiving, comparing, restoring, and/or managing multiple versions 280 of electronic forms, electronic templates, workflows, transforms, data models, and/or other form components associated with the development and deployment platform. For each of these components (and/or other components that are made available via the development and deployment platform 150), the version control component 250 can generate a version history timeline 260 that displays a listing of archived versions 280 corresponding to the component. The version history timeline 260 allows access and viewing of each of the versions, and can identify information pertaining to each version (e.g., indicating who created the version and when it was created).

For example, the version control component 250 may generate for each electronic form 155 a version history timeline 260 that displays a plurality of stored versions 280 of the electronic form 155, for each workflow a version history timeline 260 that that displays a plurality of stored versions 280 of the workflow, for each transform a version history timeline 260 that displays a plurality of stored versions 280 of the transform, for each template a version history timeline 260 that displays a plurality of stored versions 280 of the template, for each data model 290 a version history timeline 260 that displays a plurality of stored versions 280 of the data model 290, etc. In certain embodiments, the version history timelines 260 can be displayed directly in the GUI-based environment that enables creation and/or updating of the electronic forms, workflows, transforms, templates, and other components, and the version history timelines 260 can display entries corresponding to the various stored versions 280 of these components. The entries in the version history timelines 260 can be selected to perform various actions (e.g., to view the stored versions 280, compare two or more stored versions 280, restore option a previous version 280 to be a current version, assign designations to versions 280, etc.).

In certain embodiments, the version control component 250 can include a comparison function 270 that enables comparison of two or more stored versions 280 of a component (e.g., an electronic form, form component, template, transform, workflow, data model, and/or another component). The comparison function 270 can compare the two or more stored versions 280 and identify any changes between or among the versions 280. In certain embodiments, the comparison function 270 can display the component associated with the two or more versions in a comparison mode 275 which visually depicts or illustrates the component with annotations or visual indicators that identify the changes between or among the two or more versions 280.

In one example, an individual designing or updating an electronic form 155 may select two (or more) versions 280 of the electronic form 155 listed in a version history timeline 260 for comparison. The comparison function 270 may identify changes or differences between or among the selected versions 280 of the electronic form 155, and display an annotated version of the electronic form 155 in a comparison mode 275 which identifies the changes or differences (e.g., which visually displays and identifies fields, values, text, and/or configuration settings that have been added, deleted, and/or edited).

In another example, an individual designing or updating a workflow may select two (or more) versions 280 of the workflow listed in a version history timeline 260 for comparison. The comparison function 270 may identify changes or differences between or among the selected versions 280 of the workflow, and display an annotated version of the workflow in a comparison mode 275 which identifies the changes or differences (e.g., which visually displays and identifies nodes, connectors, roles, and/or configuration settings that have been added, deleted, and/or edited).

In a further example, an individual designing or updating a transform may select two (or more) versions 280 of the transform listed in a version history timeline 260 for comparison. The comparison function 270 may identify changes or differences between or among the selected versions of the transform, and display an annotated version of the transform in a comparison mode 275 which identifies the changes or differences (e.g., which visually displays and identifies variables, parameters, transform functions, and/or configuration settings that have been added, deleted, and/or edited).

In yet a further example, an individual designing or updating a template may select two (or more) versions 280 of the template listed in a version history timeline 260 for comparison. The comparison function 270 may identify changes or differences between or among the selected versions of the template, and display an annotated version of the template in a comparison mode 275 which identifies the changes or differences (e.g., which visually displays and identifies input field components, application components, layout components, advanced control components, and/or configuration settings that have been added, deleted, and/or edited). In another example, an individual designing or updating a data model 290 may select two (or more) versions 280 of the data model 290 listed in a version history timeline 260 for comparison. The comparison function 270 may identify changes or differences between or among the selected versions of the data model 290, and display an annotated version of the data model 290 in a comparison mode 275 which identifies the changes or differences (e.g., which visually displays and identifies input field components, mappings, data schemas, associations, and/or configuration settings that have been added, deleted, and/or edited).

In another example, an individual designing or updating a system component may select two (or more) versions 280 of the system component listed in a version history timeline 260 for comparison. The comparison function 270 may identify changes or differences between or among the selected versions of the system component, and display an annotated version of the system component in a comparison mode 275 which identifies the changes or differences (e.g., which visually displays and identifies input field components, application components, layout components, advanced control components, and/or configuration settings that have been added, deleted, and/or edited).

The above examples are not intended to be limiting. The version control component 250 can be configured to store multiple versions of other components that are made available through the development and deployment platform 150, and to execute similar functions (e.g., for archiving, comparing, restoring, viewing, promoting, etc.) for these components. Additional details of the version control component 250 are discussed below with reference to FIGS. 12-23.

While the components of the development and deployment platform 150 may be depicted in FIG. 2 as being distinct or separate from one other, it should be recognized that this distinction may be a logical distinction rather than an actual or physical distinction. Any or all of the sub-components can be combined with one another to perform the functions described herein, and any aspect or feature that is described as being performed by one component can be performed by any or all of the other sub-components. Also, while the components of the development and deployment platform 150 may be illustrated as being implemented in software in certain portions of this disclosure, it should be recognized that the sub-components described herein may be implemented in hardware and/or software.

Figure 3:
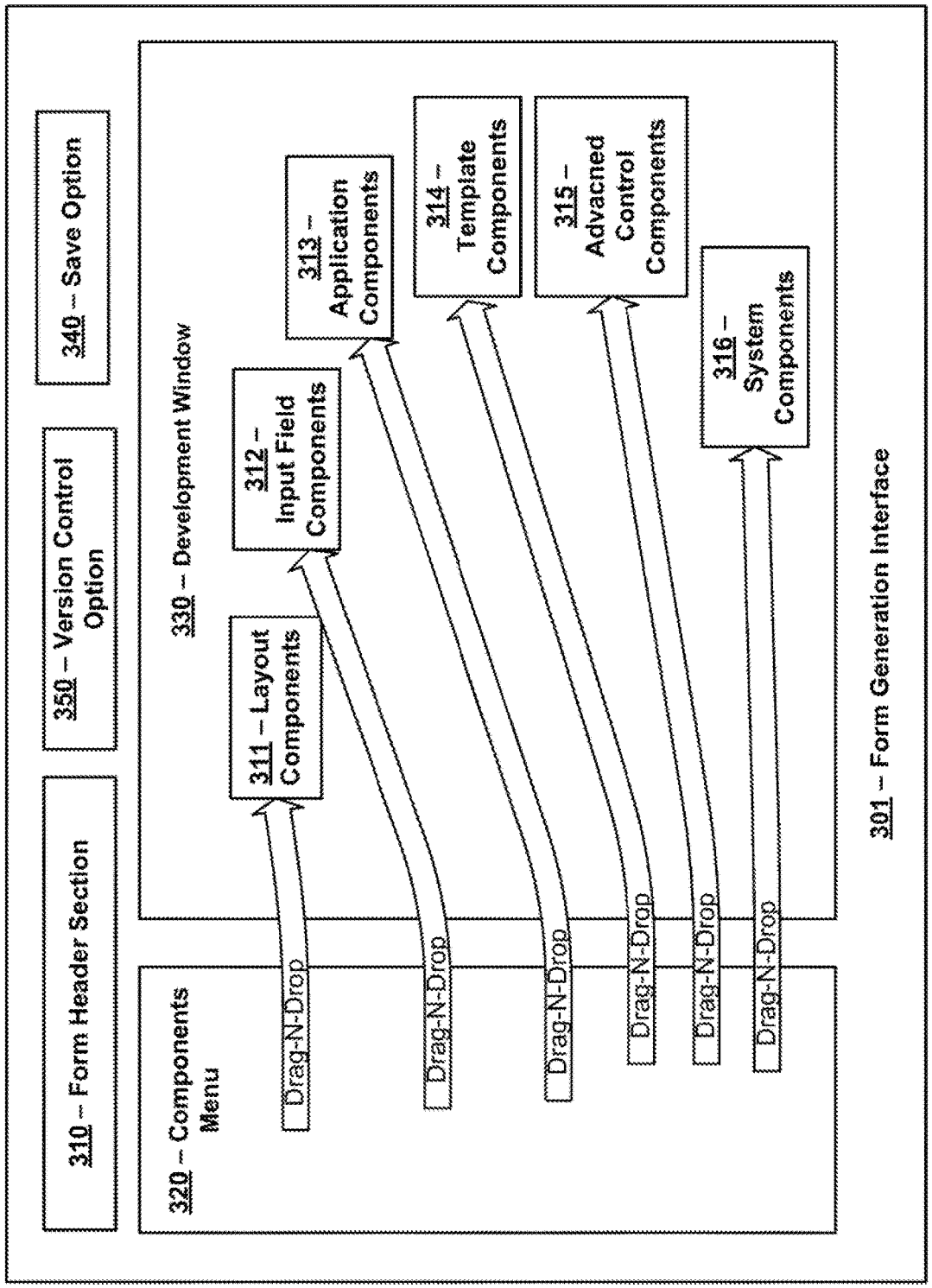
FIG. 3 is an example GUI for creating electronic forms.

FIG. 3 is an example form generation interface 300 in accordance with certain embodiments. The form generation interface 300 may be provided by the development toolkit 210 to assist with creating electronic forms 155 and/or modifying existing electronic forms 155. Users (e.g., individuals associated with the platform 150 and/or third-party systems 130) can utilize the form generation interface 300 to create and/or update advanced electronic forms 155 without any technical knowledge or programming experience.

The example form generation interface 300 includes a form header section 310, a component menu 320, a development window 330, a save option 340, and a version control option 350. To create an electronic form 155 using the interface 300, the users can drag-and-drop various form components 211 from the component menu 320 into the development window 330. The developer window 330 is configured to detect when a form component 211 is dragged-and-dropped into the development window 330, to identify the specific type of form component 211 that is being dragged-and-dropped into the development window 330, and to add the component 211 that is being dragged-and-dropped into the development window 330 into the electronic form 155 being constructed. For each form component 211 added to the development window 330, the user can then access a customization interface (e.g., as shown in FIGS. 4-8 and 9A-9B) to customize aspects of the components. The user can also define header information (e.g., the name of the form, the path of the form, etc.) for the form in the form header section 310. Once the form is complete, the user can select the save option 340 to save the electronic form 155 to a database 240.

An example component menu 320 can include a variety of form components 211 including layout components 311, input field components 312, application components 313, template components 314, advanced control components 315, and/or system components 316. Examples of each of these components are discussed in further detail below.

The layout components 311 enable the design or layout of the electronic form 155 to be customized. The layout components 311 can be used to customize the presentation and organization of the fields, content, and other features included in the electronic form 155. Other components included in the component menu 320 (e.g., input field 312, application components 313, and/or template components 314) can be dragged-and-dropped into layout components 311 that have been added to the development window 330 to arrange the presentation of these components. Example layout components may include:

(1) Panel Components: A panel component can be dragged-and-dropped into the development window 330 to add a panel to the electronic form 155, or section of the electronic form 155, being created. The panels may correspond to windows on the electronic form that include an option for expanding and/or collapsing the panels. Other components from the component menu 320 can be inserted into the panel.

(2) Column Components: A column component can be dragged-and-dropped into the development window 330 to add one or more columns to the electronic form 155, or section of the electronic form 155, being created. The column component can be used to align content vertically in the one or more columns. Other components from the component menu 320 can be inserted into the columns.

(3) Table Components: A table component can be dragged-and-dropped into the development window 330 to add a table to the electronic form 155, or section of the electronic form 155, being created. The user can specify any number of rows and columns to be included in the table. Other components (e.g., input field components 312 and/or application components 313) from the component menu 320 can be inserted into the cells of the table.

(4) PDF Component: The PDF component can be dragged-and-dropped into the development window 330 to enable conversion of a PDF form to an electronic form. The PDF component enables the user to map the fields of a PDF to the fields of an electronic form 155. Thus, when a PDF document is uploaded by a customer or other user after the form is deployed, the PDF component can automatically convert the information in the PDF document to an electronic form. The PDF component can additionally, or alternatively, enable content submitted via the electronic form to be converted to a PDF file.

The input field components 312 enable the users to add and customize input fields to the electronic form 155 being created. The input field components 312 may be inserted into the layout components 311 to customize the presentation of the form. Example input field components 312 may include:

(1) Text Field Components: A text field component can be dragged-and-dropped into the development window 330 to add a text field input to the electronic form 155, or section of the electronic form 155, being created.

(2) Text Area Components: A text area component can be dragged-and-dropped into the development window 330 to add a text area input to the electronic form 155, or section of the electronic form 155, being created.

(3) Checkbox Components: A checkbox component can be dragged-and-dropped into the development window 330 to add a checkbox input to the electronic form 155, or section of the electronic form 155, being created.

(4) Dropdown Menu Components: A dropdown menu component can be dragged-and-dropped into the development window 330 to add a dropdown menu input to the electronic form 155, or section of the electronic form 155, being created.

(5) Radio Button Components: A radio button component can be dragged-and-dropped into the development window 330 to add a radio button input to the electronic form 155, or section of the electronic form 155, being created.

(6) File Upload Components: A file upload component can be dragged-and-dropped into the development window 330 to add a file upload input field to the electronic form 155, or section of the electronic form 155, being created. The file upload input field allows files to be uploaded through the form.

(7) Password Components: A password component can be dragged-and-dropped into the development window 330 to add a password input field to the electronic form 155, or section of the electronic form 155, being created.

(8) Submit Button Components: A submit button component can be dragged-and-dropped into the development window 330 to add a submission button to the electronic form 155, or section of the electronic form 155, being created.

(9) Hidden Value Components: A hidden value component can be dragged-and-dropped into the development window 330 to store a hidden value for the electronic form 155, or section of the electronic form 155, being created. The hidden values are not visible on the electronic form. The hidden values can be updated in the background by other components added to the form.

The application components 313 enable users to add and customize preconfigured applications or widgets into the electronic form 155 being created. The preconfigured applications or widgets can be configured to collect inputs, display data, and/or perform other functions associated with the electronic form 155. Example application components 313 may include:

(1) Date Selector Components: A data selector component corresponds to a preconfigured application or widget that provides functions for selecting a date. For example, if a date picker component is added to a form, the form may display a selectable icon of a calendar. Upon selecting the icon, the user may navigate through a calendar and select a date and/or time. This date selector component may be dragged-and-dropped into the developer window 330 to incorporate this application or widget into the electronic form 155 being created.

(2) E-Signature Components: An e-signature component corresponds to a preconfigured application or widget that enables users to electronically sign the forms. For example, the signature component may display a box on the form that permits the user to draw a signature using a mouse. This e-signature component may be dragged-and-dropped into the developer window 330 to incorporate this application or widget into the electronic form 155 being created.

(3) Text Editor Components: A text editor component corresponds to a preconfigured application or widget that enables users to edit text in various ways (e.g., to adjust the size, fonts, alignment, and other text features). After the form has been deployed, a customer or other user may access the form and use the text editor to edit text being submitted through the form. This may be useful when the electronic form 155 is being deployed in connection with a third-party service that publishes content and/or which otherwise requires customized text. This text editor component may be dragged-and-dropped into the developer window 330 to incorporate this application or widget into the electronic form 155 being created.

(4) Charts and Graphs Components: A charts and graphs component corresponds to a preconfigured application or widget that enables users to create a variety of charts and/or graphs. For example, charts and graphs can be created to display information to customers or other users who are filling out a deployed form. The charts and graphs can also be updated in real-time based on inputs received when the form is being filled out by the users. This charts and graphs component may be dragged-and-dropped into the developer window 330 to incorporate this application or widget into the electronic form being created.

(5) Image Viewer Components: A text editor component corresponds to a preconfigured application or widget that incorporates an image viewer into the electronic form 155. The image viewer may allow a customer or other user accessing a deployed form to scroll through and/or select one or more images displayed in the image viewer. The user may also be permitted to upload additional images to be included in the image viewer. This image viewer component may be dragged-and-dropped into the developer window 330 to incorporate this application or widget into the electronic form being created.

The template components 314 enable users to reuse or recycle previously created electronic forms 155 and/or portions of previously configured electronic forms 155. For example, the template components 314 may include a previously created login form (e.g., for verifying login information to access accounts) that can be reused across multiple systems simply by dragging-and-dropping the template into the developer window 330. As another example, the template components 314 may include portions of previously created forms that are designed to collect specific types of information (e.g., personal information, financial information, and/or or other data) that are commonly used in many types of forms. Thus, rather than repeatedly designing the same input section of form multiple times, a specific input section of the form can be saved as a template component for use across multiple electronic forms 155.

The advanced control components 315 enable users to customize functions of the electronic form 155 relating to controlling workflow, navigation, and event handling. In many cases, the advanced control components may not be visible to customers or users that access completed forms that have been deployed. Rather, the advanced control components 315 can operate as background processes that control aspects of the workflow, navigation, and event handling for the electronic forms 155. Example advanced control components 315 may include:

(1) Decision Components: A decision component can be dragged-and-dropped into the development window 330 to define and customize processes and/or workflows that are executed in the background of the electronic form. For example, a decision component can trigger values and/or parameters associated with certain form components 211 included in the electronic form 155 to be modified based on inputs received via the electronic forms (e.g., to modify aspects of layout components 311, input field components 312, application components 313, template components 314, and/or other advanced control components 315). In certain embodiments, the actions triggered by the decision component can be defined using a customization interface. For example, a customization interface associated with a decision component can include an input section that enables the user to identify one or more form components 211 that should be read and/or monitored. The components 211 can be monitored in real-time as customers or users are accessing a deployed form and/or filling out the form. The decision component can also include an output section that enables the user to identify one or more form components 211 that should be modified and/or updated based on the inputs received via the one or more components that are identified in the input section. The output section further enables the user to specify actions that should be taken for modifying the components identified in the output section. Example actions that may be selected can include actions for changing form field values, turning on/off the visibility of the components, outputting messages on the form interface, transmitting back-end error messages (e.g., for processing by error handlers), navigating to particular pages or sections of the form, and/or other functions. A logic section enables the user to input control logic and/or specify conditions under which the actions are executed and/or under which the components identified in the output section are modified. Examples of such a customization interfaces are discussed in further detail below.

(2) Navigation Components: A navigation component can be dragged-and-dropped into the development window 330 to enable users to control navigation between portions of the electronic form 155. This component may be particularly useful when dealing with large forms that have many sections, and can enable the electronic form to control which portions of the form should be presented to the users and in which order. For example, a form may include multiple panels or tables that include input fields for collecting information. The navigation component can control the order in which the panels or tables are presented to the user and/or to determine whether certain panels or tables can be skipped (e.g., not presented to the user) based on previously entered information.

(3) Calculator Components: A calculator component can be dragged-and-dropped into the development window 330 to enable calculations to be performed on values input to the components. For example, the calculator component can run in the background and perform calculations on values entered into the input field components 312 and/or other components.

(4) Workflow Components: A workflow component can be dragged-and-dropped into the development window 330 to enable users to define advanced workflows. Like the decision component, the workflow component can be used to define and customize processes and/or workflows that are executed in the background of the electronic form. For example, the workflow component can define background processes which allow values and parameters of certain components to be modified dynamically (e.g., in real-time as a customer is filling out the form) based on values received by other components.

In certain embodiments, this may be accomplished by using a customization interface associated with the workflow component to create node diagrams that defines the background processes. For example, the workflow component can enable users to generate a diagram that includes input nodes, processing nodes, and output nodes. The input nodes identify components that are monitored for receiving inputs. Data received via the input nodes can be mapped to one or more processing nodes that can be configured to perform various operations (e.g., such as aggregating the received data, filtering the received data, performing natural language processing operations on the received data, merging the received data, sorting the received data, adding new input fields or components to the form being created, modifying layout or designs or the forms, etc.). The one or more processing nodes can also be mapped to one or more output nodes (e.g., that correspond to components of the electronic form that can be modified and/or which can output the data based on the processing operations) to update the electronic form. Examples of such a customization interfaces are discussed in further detail below.

(5) Transform Components: Transform components can be dragged-and-dropped (or otherwise inserted) into the development window 330 to enable inputs received via an electronic form to be transformed, manipulated, and/or processed in various ways. For example, a transform integrated into an electronic form 155 can execute a background process that performs functions associated with reformatting, recasting, and/or concatenating data that is received via the electronic form 155. In some cases, the transform components can be configured to assist with performing data integration and/or data migration functions by converting the inputs and/or data received from an end-user (e.g., a customer) via the electronic form 155 into an appropriate format for storage in particular databases and/or for use with particular applications (e.g., proprietary third-party system 130 applications). As explained below, in certain embodiments, the transform components can also be integrated into workflows and/or processes that are defined by the workflow components.

The system components 316 can include custom modules and/or components that are created by developers that utilize and access the development and deployment platform 150. For example, a developer can create a module and/or component, and the module and/or component can then appear as an option on the form generation interface 301 (e.g., in the components menu 320) to enable that developer, as well as other developers who access the development and deployment platform 150, to create and/or update electronic forms 155.

In certain embodiments, the system components 316 can be created by adding various form components 211 (e.g., layout components 311, input field components 312, application components 313, etc.) into the development window 330 to define the system components 316. When a user has finished customizing a system component 316, the user can select the save option 340, which may prompt the user to specify whether the current settings of the development window 330 should be saved as an electronic form 155 (e.g., which can then be provided to end-users based on the saved settings) or whether the current settings of the development window 330 should be saved as a system component 316 (e.g., which can then be provided to developers for use in developing electronic forms). In response to selecting the latter option, the settings of the development window 330 will be saved as a system component 316. Once saved, the stored system component 316 can then be accessed by the developer (and other developers) via the form generation interface 301 for use in creating electronic forms 155.

The example components described above are not intended to be an exhaustive listing of all components made available via the development toolkit 210. It should be understood that other types of layout components 311, input field components 312, application components 313, template components 314 and/or advanced control components 315 can be provided by the development toolkit 210 described herein.

The development window 330 can represent a portion of the form generation interface 300 that is used to define and/or visualize the electronic form 155 being generated or modified. In certain embodiments, the development window 330 can be configured to display the electronic form 155 being created and/or modified in a WYSIWYG ("what you see is what you get") editor or format. Generally speaking, a WYSIWYG editor enables the user creating and/or modifying an electronic form 155 to see what the electronic form 155 will look like while the electronic form 155 is being created and/or modified. For example, as layout components 311, input field components 312 and other components are added to the development window 330, the WYSIWYG functionality of the development window 330 enables the user to view how the components will appear when the electronic form 155 is displayed and deployed.

As mentioned above, the components in the components menu 320 can be dragged-and-dropped into the development window 330. The development window 330 can be configured to detect when a component is being dragged-and-dropped into the development window 330. This may include detecting events in real-time (e.g., using HTML and/or JavaScript attributes such as "onmouseover" and/or "onmouseup") as the electronic form 155 is being created. The development window 330 can also be configured to identify the particular type of component (e.g., to detect whether the component is for a text field input or a decision component) that is being added to the electronic form 155 and to insert the component into the electronic form 155 (e.g., to insert the component into the WYSIWYG editor provided by the development window 330). Inserting of the component into the electronic form can include incorporating code and/or programming instructions into the electronic form 155 which enables content and/or functionality associated with the component to be integrated into the electronic form 155. The development window 330 (or other portion of the interface 300) can be configured with instructions that determine how the code corresponding to the components that are dragged-and-dropped into the development window 330 are to be inserted into the electronic form 155 being created. As discussed in further detail below, each component can include a customization interface that enables the users to customize various aspects of the components. After a user has completed an electronic form 155, the user can select the save option 340 to save the electronic form to a database 240.

The example form generation interface 300 also includes a version control option 350 for accessing the features and functionality associated with the version control component 250. In certain embodiments, in response to selecting the version control option 350, the form generation interface 300 may display a version history timeline 260 that includes a listing of versions 280 for an electronic form 155 and/or other form component, and which enables various actions to be executed (e.g., such as restoring a previous version 280, comparing two or more versions 280, viewing any of the stored versions of the electronic form 155, etc.). These functions are described in further detail below.

The example form generation interface 300 described above with reference to FIG. 3 is not intended to be limiting and it should be understood that the interface and associated functionality can be modified in various ways without departing from the principles of this disclosure. For example, in certain embodiments, the components in the components menu 320 can be added to the electronic form 155 being created and/or modified in ways other than dragging-and-dropping the components into the development window 330 (e.g., such as by selecting buttons or hyperlinks to add the components). Likewise, components other than those explicitly described can be used to create and/or modify the electronic forms 155.

FIGS. 4-8 and 9A-9B illustrate example customization interfaces that may be associated with the form components 211. As mentioned above, each of the form components 211 (e.g., including the layout components 311, input field components 312, application components 313, template components 314, and/or advanced control components 315) can be associated with a customization interface that enables the users creating and/or modifying the electronic forms 155 to customize various aspects of the components (e.g., aspects relating to parameters, values, visibility, functionality, etc.). Each of the customization interfaces can include one or more text fields, check boxes, radio buttons, and/or other input options for that enable non-technical users with no programming knowledge to customize the components. The customization interfaces can be accessed via the form generation interface 300. For example, the customization interfaces may be displayed automatically each time a component is added to the development window 330. Also, after the components are added to the development window 330, the components may be displayed in the development window 330 with options or buttons that can be selected to access the customization interfaces. After a user has finished customizing the component using a corresponding customization interface, the user can select a save option or button to save the settings for the component and to incorporate the settings into the electronic form 155 being created and/or modified. The user can additionally select a save template option to create a template that includes the settings for the component.

FIGS. 4 and 5 disclose example interfaces that can be provided in connection with certain input field components 312. More specifically, FIG. 4 is an example customization interface 400 that can enable a user to customize a text field component in accordance with certain embodiments, and FIG. 5 is an example customization interface 500 that can enable a user to customize a checkbox component in accordance with certain embodiments.

FIGS. 6 and 7 disclose example interfaces that can be provided in connection with certain application components 313. More specifically, FIG. 6 is an example customization interface 600 that can enable a user to customize an e-signature component in accordance with certain embodiments, and FIG. 7 is an example customization interface 700 that can enable a user to customize a date selector component in accordance with certain embodiments.

Figure 9B:
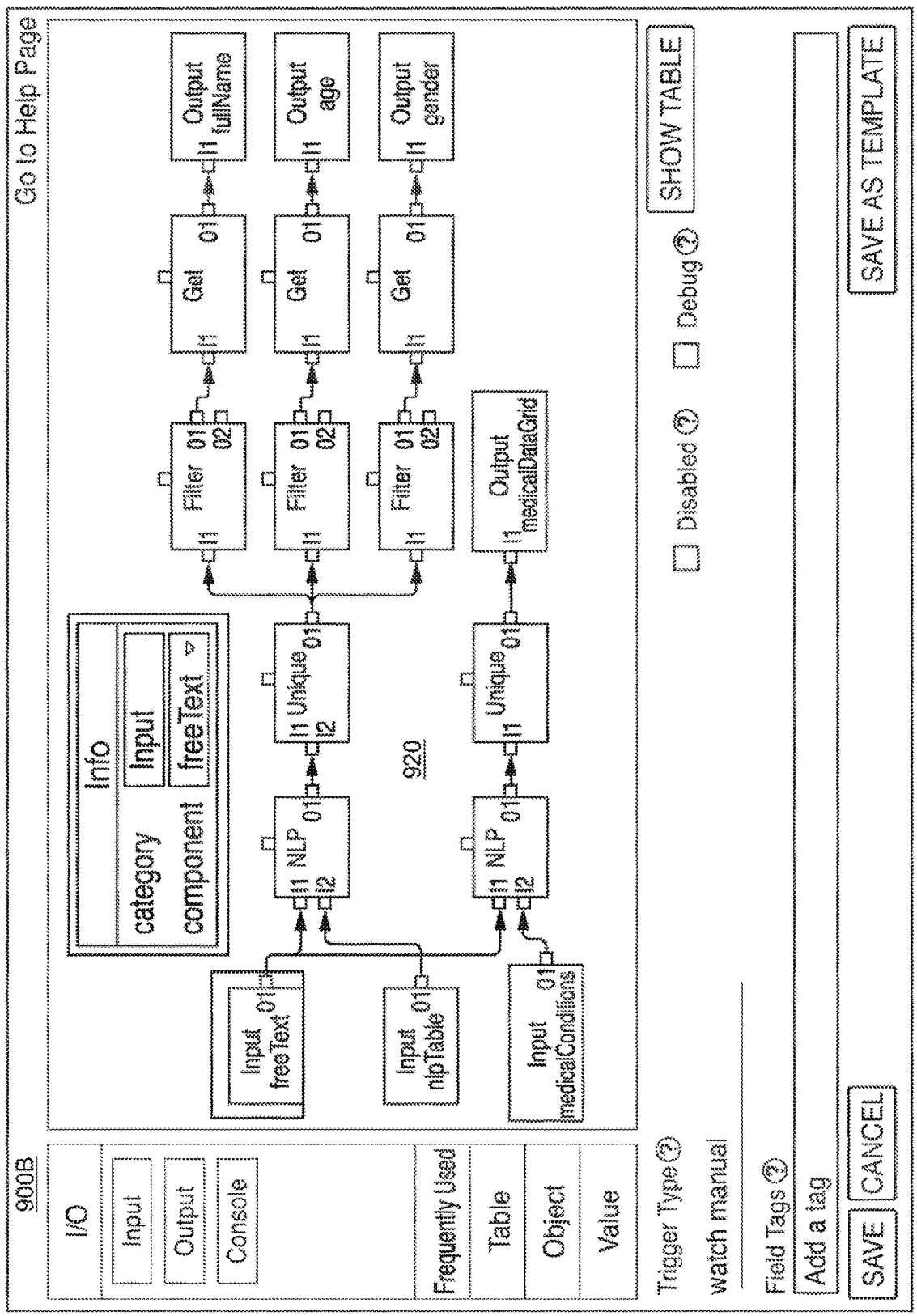
FIG. 9B is another example customization interface for a workflow component.

FIGS. 8 and 9A-9B disclose example interfaces that can be provided in connection with certain control components 315. More specifically, FIG. 8 is an example customization interface 800 that can enable a user to customize a decision component in accordance with certain embodiments, and FIGS. 9A-9B are example customization interfaces 900A and 900B that can enable a user to customize for a workflow component in accordance with certain embodiments.

As can be seen in FIGS. 4-8 and 9A-9B, while the interfaces may include similar parameters for customizing the components, the parameters presented on each of the customization interfaces can also vary. Some common customization parameters presented on the interfaces may include:

(1) Label: This may represent the label (e.g., text string) that appears next to the component in the electronic form 155.

(2) Property name: The name of the component (e.g., such as the "name" parameter used in an HTML input element). This name may be used to reference the component via the electronic form 155 and/or the API created for the electronic form 155.

(3) Input Mask: This allows users to ensure input is received in a specific or pre-defined format. For example, the users may specify that inputs received via a component are to be in numeric form, alphabetical form, and/or alphanumeric form.

(4) Prefix: Text that is displayed before a component (e.g., "$" or "@" that is displayed before an input field).

(5) Suffix: Text that is displayed after a component (e.g., ".com").

(6) Protected: A protected field will not be returned when queried via an API.

(7) Persistent: A persistent filed will be stored in a database (e.g., database 240) when the electronic form 155 is submitted by a customer or other user.

(8) Hidden: Indicates that a component or field should be hidden (e.g., such that it is not visible to a customer or other user filling out the form).

(9) Disabled: Indicates that a field or component should be disabled (e.g., such that input cannot be entered).

(10) Required: Indicates that a field or component must be filled in before the electronic form 155 be submitted by a customer or other user.

(11) CSS Class: Allows the user creating and/or modifying the form to associate a custom cascading style sheet (CSS) class with a field or component.

(12) Description: Text that will appear below or near the component or input field (e.g., which describes the component or input field to a customer or user filling out the form).

(13) Trigger: Identifies a component that should be triggered or executed. For example, this may identify a component that uses the input from a field or component to execute a process or perform an operation.

(14) On Keypress: Identifies a component that should be triggered or executed in response to detecting a key press event.

(15) Clear Value When Hidden: Indicates that a value of a field or component should be cleared when the field or component is hidden.

(16) Tooltip: Allows a tooltip (e.g., a message that appears when a cursor is positioned over the field or component) to be associated with a field or component.

(17) Minimum Length: Indicates a minimum number of characters that must be entered into a field or component.

(18) Maximum Length: Indicates a maximum number of characters that must be entered into a field or component.

(19) Field Tags: Allows users to specify one or more tags (e.g., textual labels or names) to be associated with a field or component.

(20) Width: Indicates the width of the component or field (e.g., in pixels, percentage, and/or inches).

(21) Height: Indicates the height of the component or field (e.g., in pixels, percentage, and/or inches).

(22) Background Color: Indicates the background color of the field or component (e.g., using hex codes).

The customization parameters mentioned in this disclosure are intended to be example and are not intended to be an exhaustive listing. It should be understood that other types of customization parameters can also be utilized.

It should also be understood that the customization parameters associated with the application components 313, advanced control components 315, and other similar types of components that enable more complex functionality to be incorporated into the electronic forms 155 can include customization parameters that are specific to implementing such functionality. For example, as shown in FIG. 6, the customization interface 600 for an e-signature component can include customization parameters that allow for customization of signature color. Likewise, as shown in FIG. 7, the customization interface 700 for a data selector component may include customization parameters for specifying a date format (e.g., which allows users to specify a format for displaying the date) and which allows the dates of a calendar to be restricted to certain ranges. Similar types of customization parameters can be presented for the application components 313.

The interface 800 illustrated in FIG. 8 demonstrates the functionality of an example decision component that can be incorporated into an electronic form 155. An input section 810 (labeled "Inputs") of the interface allows the user to identify one or more components that have been added to the electronic form 155. Any components identified in the input section 810 can be monitored in real-time when the electronic form 155 is deployed. For example, in the event that a customer is filling out the electronic form 155, any inputs (e.g., text inputs, click inputs, etc.) received via a component identified in the input section will be detected immediately. Each component that is monitored is listed on a different row of the table for the input section in the "Id" column. The user can select options in the "type" indicating the types of inputs that will trigger the decision component (e.g., whether an "exact" input will trigger the input component or whether an input falling in a specific "range" will trigger the input component). The user can also select options that indicate whether the input is "required" (e.g., which can indicate whether the input is required for validating the form) and/or "silent" (e.g., indicating that the component identified in the input section 810 is triggered by an execute command rather than being monitored for changes).

The output section 820 on the interface 800 (labeled "Outputs") allows the user to identify the components of the electronic form 155 that can be modified by the decision component. For example, the decision component can be used to modify various parameters or aspects of input fields, hidden values, application components layout components, navigation components, etc. Each row corresponds to a specific component identified in the "Id" column. The "type" column identifies the action or operation that should be performed for modifying the components identified in the output section 820. In certain embodiments, the user can select one or more of the following actions:

(1) Value: allows the value of an identified component to be changed;

(2) Message: allows a pop-up message or window associated with the identified component to be output;

(3) Steps: automatically skips ahead to other pages or interfaces of the electronic form which correspond to the identified component and/or which are identified by a navigation component;

(4) Label: changes the label associated an identified component;

(5) Visible: allows the visibility of an identified component to be turned on/off (e.g., by dynamically adding or removing the identified component from the interface displaying the electronic form);

(6) Pop Error: generates an error message on the back-end that notifies an identified component (e.g., which notifies an error handler to take corrective actions);

(7) Navigation: automatically navigates to a different portion of the electronic form corresponding to an identified component; and (8) Focus: automatically focuses attention on an identified component of the electronic form.

The actions described above are intended to be example and are not intended to provide an exhaustive listing of all actions that can be taken. Other types of actions can also be selected and associated with the components identified in the output section 820.

A logic section 830 (labeled "Micro Decision") of the interface 800 enables logic and/or conditions to be specified by the user indicating if and when the actions identified in the output section should be executed in connection with the components identified in the output section 820. The manner in which the logic and/or conditions are specified may vary. For example, in certain embodiments, as components are added to the input section and the output section 830, the table associated with the logic section may automatically be updated to include columns corresponding to the components. Columns may also be added which concatenate the values of the "id" and "type" columns in the output section. The user can then specify values of the components in the input section that will trigger the actions to be taken by the components identified in the output section. Regardless of how the logic section is configured, the logic section 830 enables non-technical users to correlate inputs received from components in the input section 810 to actions and/or changes that are to be implemented for the components identified in the output section 820.

A testing section 840 enables a user to perform testing on the settings specified in the input section 810, output section 820, and logic section 830. For example, the user can hit the execute button near the testing section 840 to view values that would be returned based on the settings in these sections.

The customization interfaces 900A and 900B in FIGS. 9A and 9B demonstrate the functionality of an example workflow component that can be incorporated into an electronic form 155. FIG. 9A shows a blank customization interface 900A for an example workflow component, and FIG. 9B shows a customization interface 900B for an example workflow component that includes a node diagram 920 that has been created by a user. To design the node diagram 920, users can drag-and-drop input nodes, output nodes, and processing nodes from the diagram menu 910 into a diagram development window 930. The users can then specify options for mapping the nodes to one another.

For example, with reference to FIG. 9B, the user has added three input nodes to the diagram 920. The three input nodes may correspond to input field components and/or other components added to the electronic form being created. By adding the input nodes to the diagram, the components corresponding to the input nodes will be monitored in real time as the electronic forms are being filled out. The user has also added a variety of processing nodes, each of which is configured to perform a specific function. For example, processing nodes have been added which include: NLP nodes (e.g., for performing natural language processing operations on the inputs received form the input nodes), filter nodes (e.g., for filtering data from the input nodes and/or upstream processing nodes), nodes for creating a unique table (e.g., for storing and/or organizing data from the input nodes and/or upstream processing nodes), and nodes for performing get operations (e.g., to retrieve data from tables that were created). The settings for each of the processing nodes can be customized by the users (e.g., to define the NLP, filtering table creation, and get operations being performed). The user has also added four output nodes. The four output nodes may correspond to input field components and/or other components added to the electronic form being created. The output nodes will be configured to output data (e.g., to modify filed values) and/or execute actions based on the operations specified in the diagram 920. The diagram 920 displays how the user mapped the nodes to one another to control the flow of information from the input nodes to the output nodes (after passing through various processing nodes).

In the example diagram 920 shown on the interface 900B in FIG. 9B, the workflow component is utilized to design a transcription tool for use by a medical doctor and/or other type of medical practitioner. The three input nodes can correspond to text area fields or other input fields that receive patient information (e.g., which may be input by keyboard and/or transcribed from voice inputs). The NLP nodes may process the inputs received via the input nodes and insert the data into a unique table created by the unique table nodes (labeled "Unique"). Some of the data may be filtered (e.g., by the filtering nodes) to detect information such as gender, age, and name. Get operations can then retrieve data from the tables and provide this data to the output components. The output components can correspond to fields or other features of the electronic form 155 that are updated with information retrieved using the get information. Thus, in this example, a user is able to configure an electronic form that provides a transcription application without any technical knowledge and simply by designing a diagram 920 on a GUI.

The example diagram 920 shown in FIG. 9B is just one example of how the diagram 920 can be utilized to incorporate advanced functionalities into the electronic forms 155. It should be apparent the nodes can be inserted into the diagram in various ways to allow processing of inputs received by components and mapping of outputs to other components. Various form-related applications can be designed using the workflow component.

Also, the aforementioned processing nodes are mentioned as examples of nodes that can be inserted into the diagram 920. Many other types of processing nodes may also be inserted into the diagram including, but not limited to the processing nodes that can be configured to perform operations such as filtering data, selecting data, sorting data, deleting data, mapping data (e.g., mapping data to tables), merging data, appending data, parsing data, and/or other types of operations.

Figure 10:
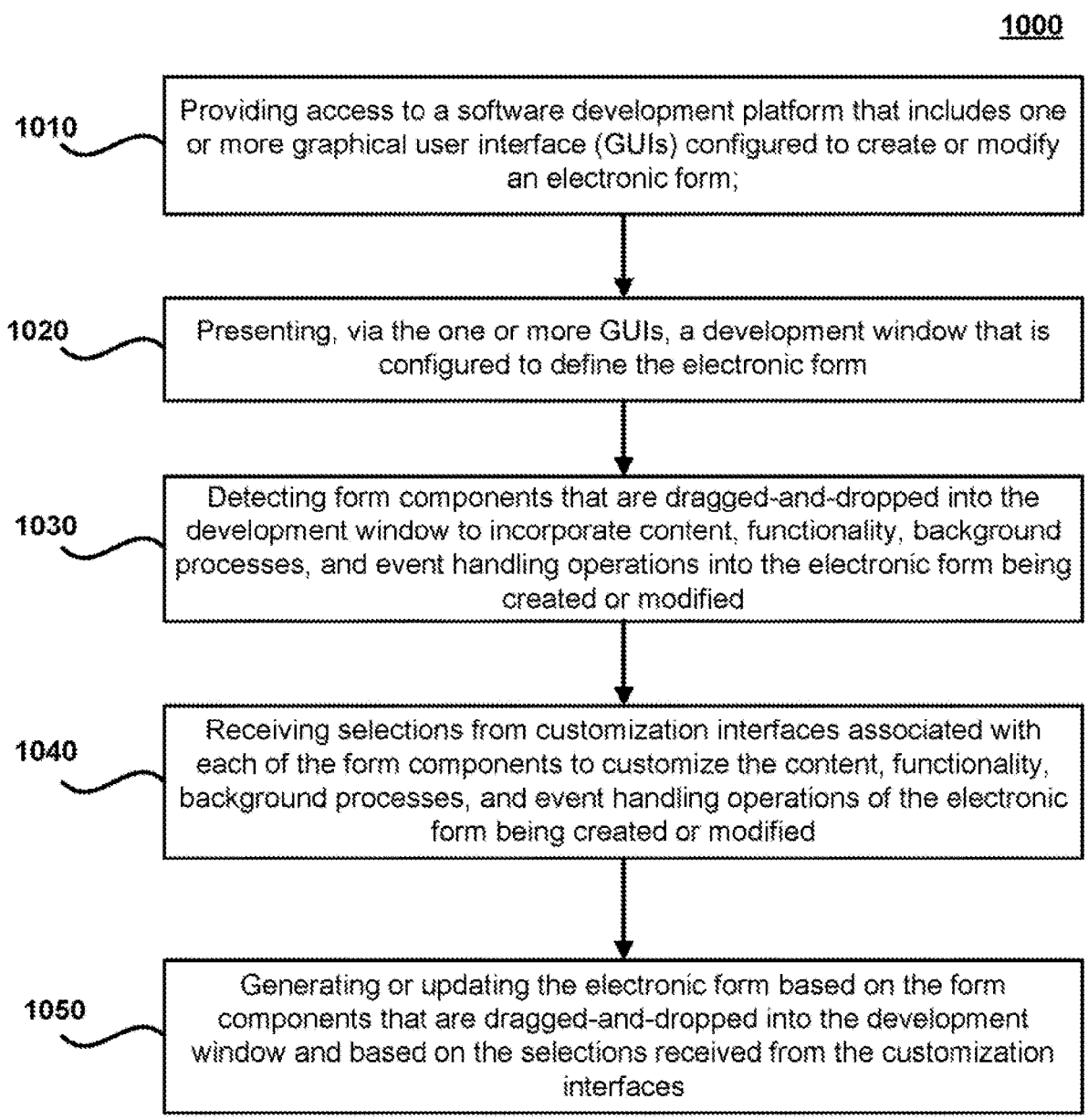
FIG. 10 is a flow chart of an exemplary method for creating an electronic form.

FIG. 10 is a flow chart of an example method 1000 for creating an electronic form 155 in accordance with certain embodiments of the present disclosure. The example method 1000 may be executed in whole or in part by the development and deployment platform 150 (e.g., using the development toolkit 210 and/or form generation interface 300). For example, one or more storage devices 201 can store instructions for performing the steps of method 1000, and one or more processors 202 can be configured to execute performance of the steps of method 1000.

In step 1010, access is provided to a software development platform 150 that includes one or more graphical user interfaces (GUIs) configured to create or modify an electronic form 155. In certain embodiments, a user may access the platform over a network 160 and/or directly via a local device. In certain embodiments, the user may utilize a web browser and/or local application to access the platform. The one or more GUIs may include the form generation interface 300 illustrated in FIG. 3 and/or the customization interfaces illustrated in FIGS. 4-8 and 9A-9B.

In step 1020, a development window 330 that is configured to define the electronic form may be presented via the one or more GUIs. In certain embodiments, the development window 330 may be implemented as a WYSIWYG editor and/or in a WYSIWYG format that enables the user creating and/or modifying an electronic form 155 to see what the electronic form 155 will look like while the electronic form 155 is being created and/or modified.

In step 1030, form components that are dragged-and-dropped into the development window 300 are detected to incorporate content, functionality, background processes, and event handling operations into the electronic form 155 being created or modified. The form components may be displayed on a menu (e.g., component menu 320) and may include layout component 311, input field components 312, application components 313, template components 314, and/or advanced control components 315. The background processes may be defined by the decision component and/or workflow component described above. The background processes may include application and/or sub-routines which run in the background of a browser and/or application when the form is accessed by customers or other users.

In step 1040, selections are received from customization interfaces associated with each of the form components to customize the content, functionality, background processes, and event handling operations of the electronic form being created or modified. As discussed above (e.g., with respect to FIGS. 4-8 and 9A-9B), each of the customization interfaces can present a plurality of customization parameters for customizing the form components.

In step 1050, the electronic form 155 is generated or updated based on the form components that are dragged-and-dropped into the development window and based on the selections received from the customization interfaces.

Figure 11:
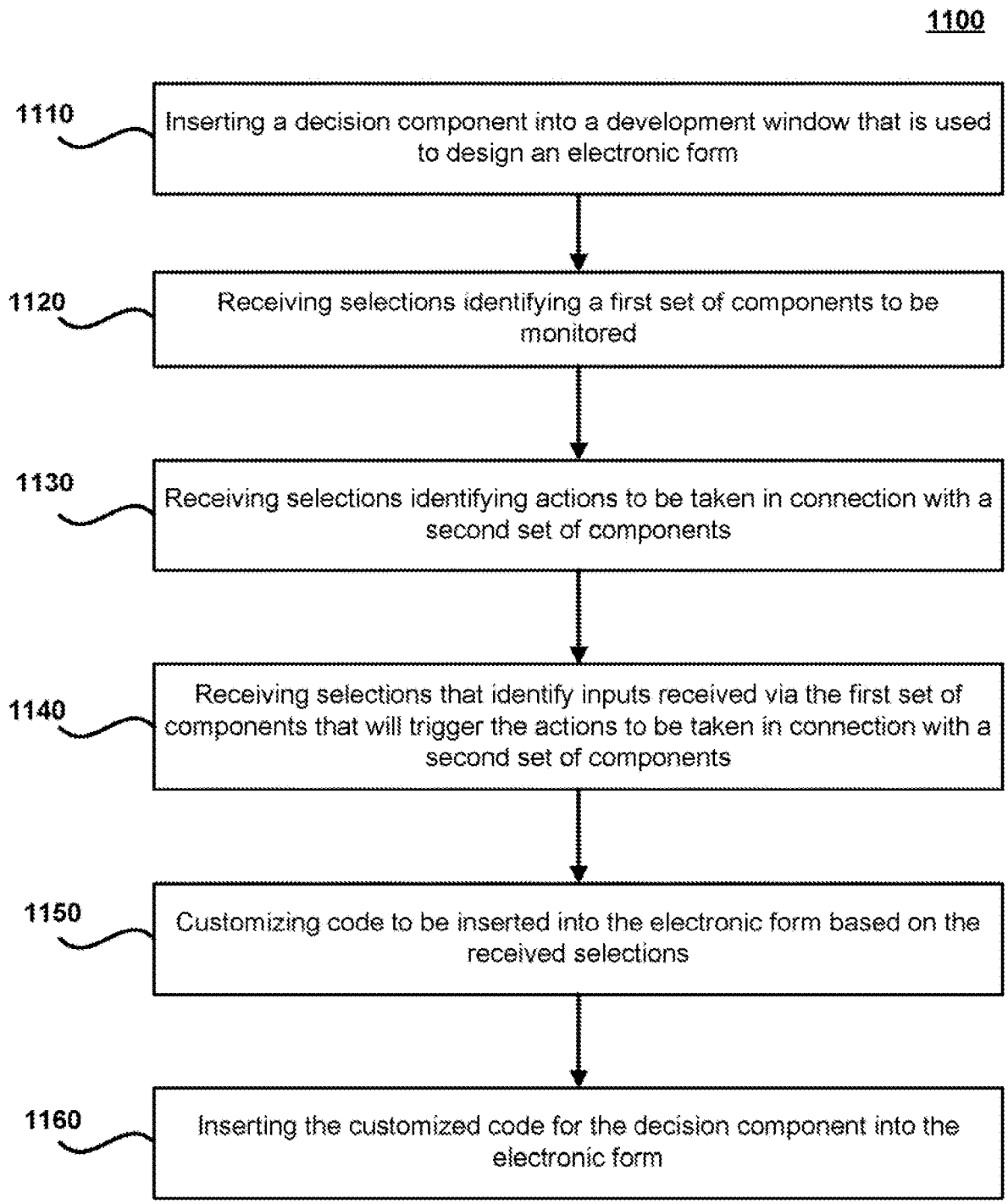
FIG. 11 is a flow chart of an example method for adding a decision component to an electronic form.

FIG. 11 is a flow chart of an example method 1100 for adding a decision component to an electronic form in accordance with certain embodiments of the present invention. The example method 1100 may be executed in whole or in part by the development and deployment platform 150 (e.g., using the development toolkit 210 and/or form generation interface 300). For example, one or more storage devices 201 can store instructions for performing the steps of method 1100, and one or more processors 202 can be configured to execute performance of the steps of method 1100.

In step 1110, a decision component is inserted into a development window 330 that is used to design an electronic form 155. In step 1120, selections are received for identifying a first set of components to be monitored. For example, as mentioned above, a customization interface associated with a decision component may include an input section 810 for identifying form components (e.g., input field components 312, application components 313, etc.) to be monitored. In step 1130, selections are received for identifying actions to be taken in connection with a second set of components. For example, the customization interface associated with a decision component can include an output section 320 that identifies components that should be modified and/or actions to be taken in connection with such components. In step 1140, selections are received that identify inputs received via the first set of components that will trigger the actions to be taken in connection with a second set of components. The selections may be received via the logic section 830 of the customization interface for the decision component. In step 1150, code (e.g., programming code, logic and/or computing instructions) to be inserted into the electronic form 155 is customized based on the received selections (including the selections received in steps 1120, 1130 and 1140). In step 1160, the customized code for the decision component is inserted into the electronic form 155.

Version Control

FIGS. 12-22 disclose example interfaces, processes, functions, and features associated with implementing the version control component 250 in accordance with certain embodiments. Any of the interfaces, processes, functions, and features described in connection with these figures may be provided by the version control component 250.

Figure 12:
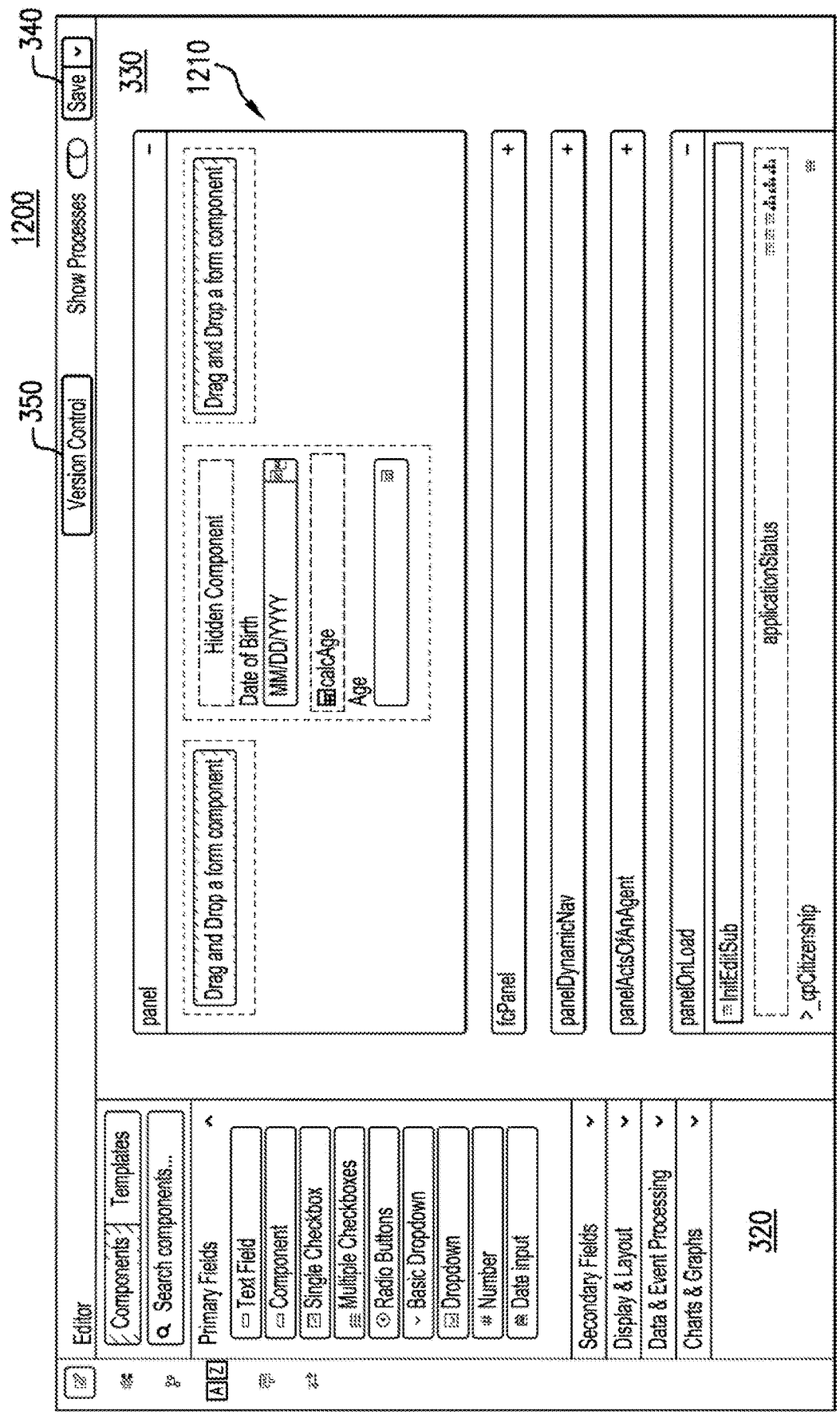
FIG. 12 is another example interface for creating and updating electronic forms.

FIG. 12 is another example form generation interface 1200 for creating and updating electronic forms in accordance with certain embodiments. Similar to FIG. 3, the form generation interface 1200 includes a components menu 320 that enables various form components 211, such as layout components 311, input field components 312, application components 313, template components 314, advanced control components 315, system components 316, and/or other components, to be incorporated into electronic forms 135 via the development window 330. An electronic form 155 can be generated or updated by inserting (e.g., dragging-and-dropping and/or otherwise selecting) the form components 211 from the components menu 320 into the development window 330, and/or by customizing inserted form components 211 within the development window 330 (e.g., using customization interfaces shown in FIGS. 4-8, 9A-9B, and 16A-16C).

When a user is finished creating and/or updating an electronic form 155, the user may select a save option 340 to save a new version of the electronic form 155. Each new version of the electronic form 155 may be saved with information identifying the user who created and/or updated the version 280 of the electronic form 155, as well as a timestamp (e.g., which indicates the date and time the new version was created or updated) and any comments or notes that describe or relate to the version. Any or all of the information and data saved and/or associated with stored versions may be utilized to facilitate searching (e.g., keyword searches) on the stored versions. In certain embodiments, the interface may additionally, or alternatively, be configured to automatically save new versions 280 of electronic forms 155 in response to detecting revisions or updates being made to an electronic form 155. In certain embodiments, each time a new version 280 of the electronic form 155 is saved (e.g., either by selection of save option 340 or automatically), the new version becomes the current version of the electronic form 155. In many cases, a user creating and/or updating an electronic form 155 may desire access to one or more previously stored versions 280 of the electronic form 155. For example, a user may desire access to a previous version 280 of the electronic form 155 that functioned properly before certain updates were made which caused the electronic form 155 to fail or malfunction. In these and other scenarios, the user may access all stored versions of the electronic form 155 by selecting the version control option 350 included on the interface.

Figure 13:
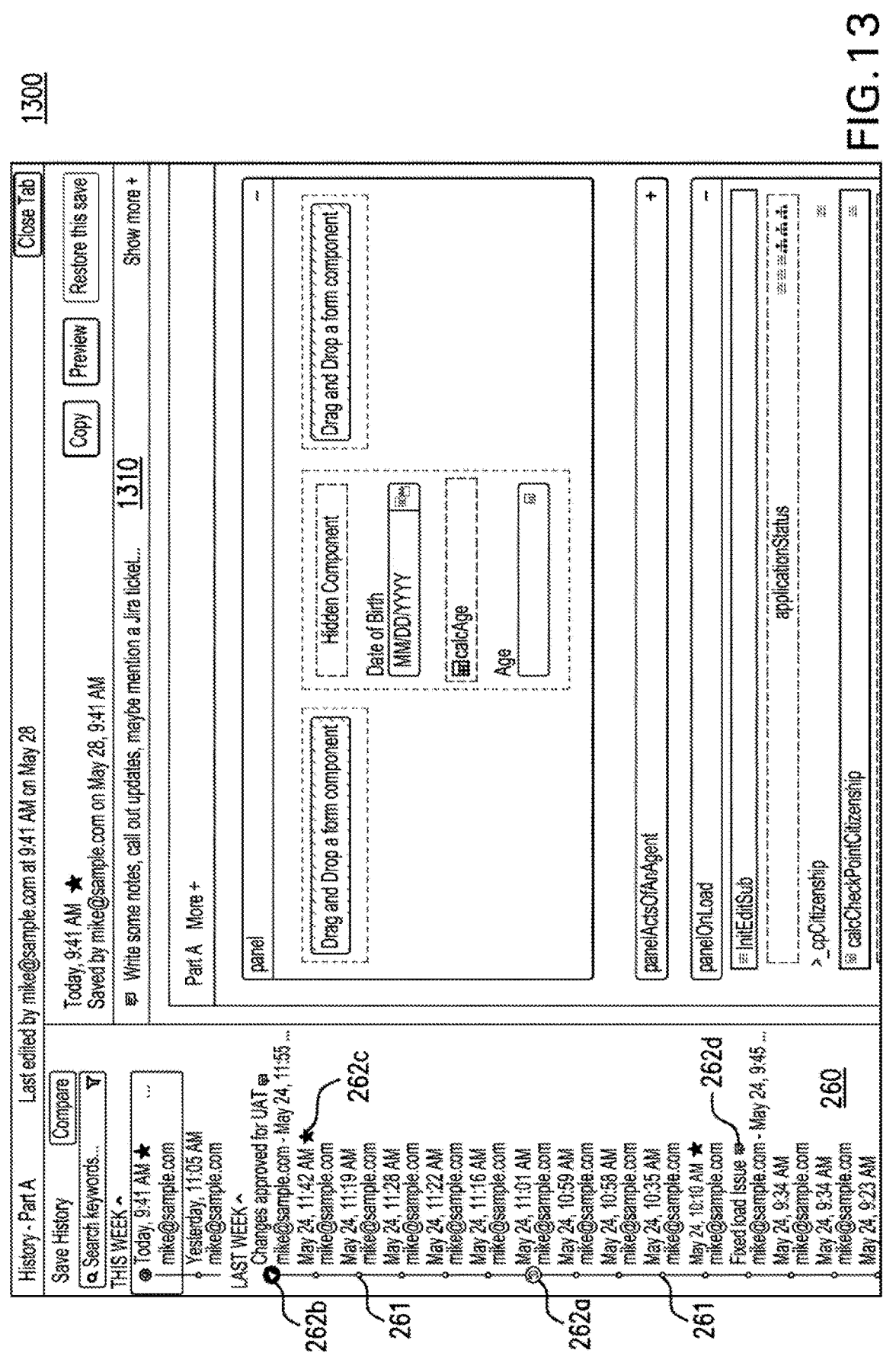

FIG. 13 is an example interface 1300 that enables version control functions to be performed in accordance with certain embodiments. This example interface 1300 may be displayed in response to, or after, selection of the version control option 350. The interface 1300 provides a version history timeline 260 directly in the GUI-based environment that is used to create and update the electronic form 155 (e.g., on the same interface as the development window 330 that is used to create and/or update electronic forms 155). The example version history timeline 260 includes a plurality of entries 261, each of which corresponds to a stored version 280 of the electronic form 155. The version history timeline 260 may display the versions 280 of the electronic form 155 in a chronologically-ordered listing.

In certain embodiments, in response to selecting an entry 261 in the version history timeline 260, the development window 330 is automatically updated to reflect the stored settings associated with the version 280 corresponding to the entry 261. For example, selection of an entry 261 may cause the development window 330 to display layout components 311, input field components 312, application components 313, template components 314, and/or advanced control components 315 in a WYSIWYG format in accordance with the settings associated with the stored version. As explained in further detail below, the selection of entry also enables various functions (e.g., comparing, restoring, editing, etc.) to be performed in connection with the version 280.

Certain entries 261 included in the version history timeline 260 may be annotated with indicators 262 corresponding to the entries 261. For example, a restore indicator 262a may indicate that a version 280 of the electronic form 155 included in the version history timeline 260 corresponds to a previously stored or archived version 280 of the electronic form 155 that was restored as the current version of the electronic form 155 at some point in time. Thus, the restore indicator 262a may identify when the electronic form 155 was rolled back to a previous version 280.

A promotion indicator 262b may indicate that a version was "promoted" by a user creating or updating an electronic form 155. A user may assign a promotion indicator 262b to a version of an electronic form 155 for various reasons (e.g., to flag it for review by another user). A star indicator 262c may indicate that a version was highlighted by a user creating or updating an electronic form 155. A user may assign a star indicator 262c to a version 280 of an electronic form 155 for various reasons (e.g., to identify a version of the electronic form 155 that functions properly and/or which can be used to restore a functional version of the electronic form). A comments indicator 262d may indicate that comments have been provided or input for a version 280 of the electronic form 155. For example, a user creating or updating an electronic form 155 may provide comments in a comments section 1310 and those comments can be made available to any other users who are collaborating to create, update, and/or review the electronic form 155. Example comments may describe revisions that were incorporated into the version 280 and/or further revisions that should be implemented. When comments are provided for a version 280 of the electronic form 155, the comments indicator 262d may appear adjacent to the corresponding entry in the version history timeline 260.

A user can also search for the versions of the electronic form that are stored by the version control component 250. For example, a search option is (located above the version history timeline 26) can be selected to search the stored versions 280 using a variety of filters, including filters that enable searching based on keywords (e.g., words included in the names, titles, and/or actual content of the versions), creator, dates of creation or updates, etc. This search feature can be particularly useful in scenarios in which there are many stored versions 280 of an electronic form 155 and/or in which a user wishes to identify all versions he or she created or updated.

As mentioned above, the version control component 250 may perform functions for managing multiple versions of other components (e.g., such as template components, transform components, workflow components, data models, system components, etc.) that are accessible via the deployment and development platform 150. In performing such version control functions, the version control component 250 may generate version history timelines 260 in the same manner (e.g., by displaying a chronological ordering of versions for these components on an interface) and the same types of indicators 262 (e.g., restore indicators 262a, promotion indicators 262b, star indicators 262c, and/or comment indicators 262d) may be included in such timelines 260.

Figure 14:
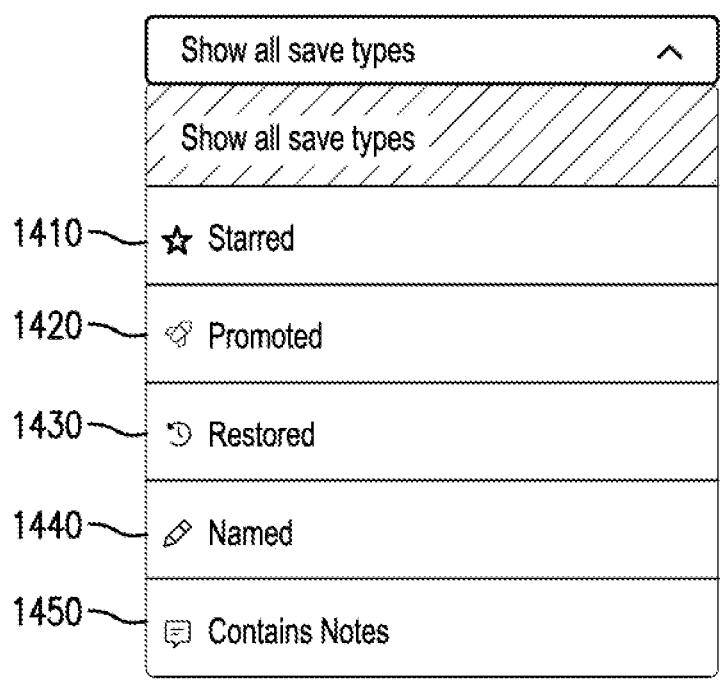
FIG. 14 is an example displayable menu.

FIG. 14 is an example menu 1400 that may be displayed in accordance with certain embodiments. In certain embodiments, the menu 1400 may be displayed in response to a selection of a save option 340. The menu 1400 enables a user to customize the manner in which a version 280 of an electronic form 155 is saved or archived, and presented in the version history timeline 260. The same menu may be displayed to customize the manner in which versions 280 of other form components 211 (e.g., such as template components, transform components, workflow components, data models, system components, etc.) are stored and managed by the version control component 250.

A first option 1410 in the menu 1400 enables a version 280 of the electronic form 155 to be saved as a "starred" version, and may cause a star indicator 262c to appear adjacent to the corresponding entry 261 in the version history timeline 260. A second option 1420 in the menu 1400 enables a version 280 of the electronic form 155 to be saved as a "promoted" version, and may cause a promotion indicator 262b to appear adjacent to the corresponding entry 261 in the version history timeline 260. A third option 1430 in the menu 1400 enables a version 280 of the electronic form 155 to be saved as a "restored" version, and may cause a restore indicator 262a to appear adjacent to the corresponding entry 261 in the version history timeline 260. A fourth option 1440 in the menu 1400 enables a version 280 of the electronic form 155 to be saved as a "named" version, and may enable a user to specify a title or name for a corresponding entry 261 in the version history timeline 260. A fifth option 1450 in the menu 1400 enables a version 280 of the electronic form 155 to be saved with one or more comments, and may cause a comments indicator 262d to appear adjacent to the corresponding entry 261 in the version history timeline 260.

It should be noted that in some embodiments a user maybe allowed to select more than one option in the menu 1400, and each entry 261 in the version history timeline 260 can be appended with appropriate indicators associated with the selected options. For example, as shown in FIG. 13, certain entries 261 are appended with more than one indicator 262.

Figure 17:
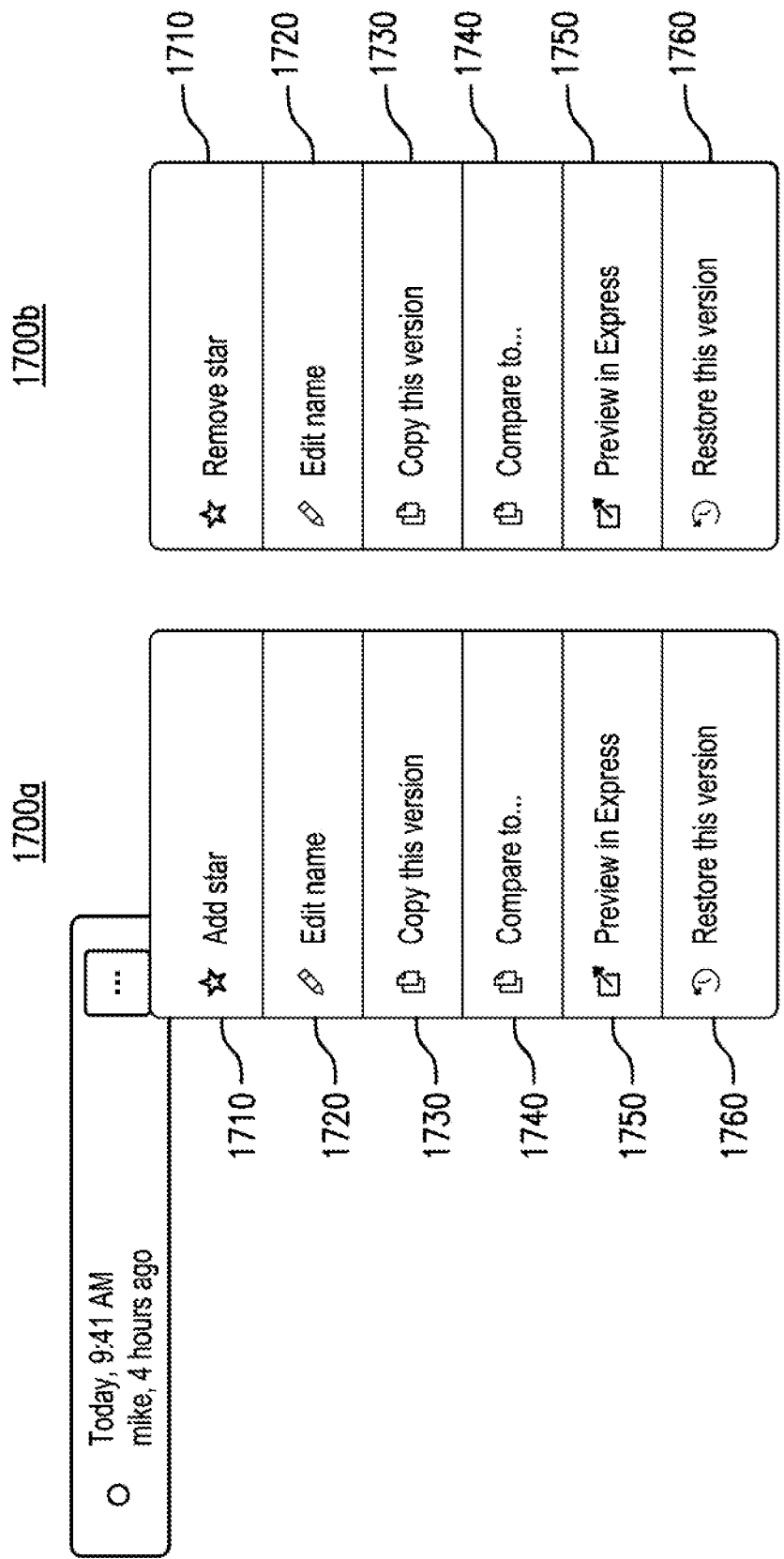
FIG. 17 illustrates example menus that may be displayed in connection with implementing a version control component.

FIG. 17 illustrates example menus 1700a and 1700b that may be displayed in accordance with certain embodiments. In certain embodiments, the menus 1700a and 1700b may be displayed in response to a selection of a menu option 1705 included in each of the entries in the version history timeline 260. The menus 1700a and 1700b include selectable options that can enable a user to perform various actions associated with each of the entries 261 included in the version history timeline 260 for the electronic form 155. The same menu may be displayed to perform various actions associated with each of the entries 261 included in version history timelines 260 for other form components 211 (e.g., such as template components, transform components, workflow components, data models, etc.) that are stored and managed by the version control component 250.

With respect to menu 1700a, a first option 1710 enables a user to add or associate a star indicator 262c to a corresponding entry 261 or version 280 of the electronic form 155. If a star indicator 262c is already assigned to a corresponding entry or version 280, the first option 1710 may enable removal of the star indicator 262c as shown in menu 1700b.

A second option 1720 enables a user to add, edit, and/or delete a name or title of a corresponding entry 261 or version 280 of the electronic form 155. Naming or titling the various entries 261 or versions 280 can be very useful for managing and tracking multiple versions of the electronic form 155.

A third option 1730 enables a user to copy a version 280 of an electronic form 155. For example, a user may wish to copy an archived version 280 to be utilized as a starting point for creating a new updated version 280 of the electronic form 155.

A fourth option 1740 enables a user to compare a version 280 of a corresponding entry 261 to one or more additional versions 280 of the electronic form 280. As explained in further detail below, the changes or revisions between or among the versions 280 selected for comparison may be displayed in a comparison mode 275 which visually depicts the changes or revisions.

A fifth option 1750 enables a version 280 associated with a corresponding entry 261 to be accessed, previewed and/or viewed on an interface. The interface may display the version of the electronic form 155 in a manner that would be provided to an end-user who utilizes the electronic form 155 to enter information in carrying out business activities, and/or may be displayed in a manner that allows a form builder to view, access, and/or edit settings associated with the electronic form 155.

A sixth option 1760 enables a version 280 associated with a corresponding entry 261 to be restored as the current version of the electronic form 155. Selection of the sixth option 1760 may append a new version of the electronic form 155 to the version history timeline 260 with a restore indicator 262a. In some cases, this option 1760 may be selected to restore a previously functional version 280 of an electronic form 155 in the event that updates incorporated in other versions 280 have resulted in failures or malfunctions. In other cases, this option 1760 may be selected to restore a previously functional version 280 of an electronic form 155 as a starting point for creating a revised version of an electronic form 155 for use in a particular third-party system 130.

FIG. 18 is an example interface 1800 that may be displayed in connection with performing a restore operation in accordance with certain embodiments. In certain embodiments, this interface may be displayed in response to selecting the sixth option 1760 on menu 1700a or 1700b illustrated in FIG. 17. The same or similar interfaces may be displayed to customize the manner in which versions 280 of other form components 211 (e.g., such as template components, transform components, workflow components, data models, etc.) are restored by the version control component 250.

Performing a restore operation may cause a selected version 280 of an electronic form 155 (e.g., which may be selected from a version history timeline 260) to be the current version of the electronic form 155. The interface 1800 enables a user to select options 1820 for customizing the name and/or title of the new version 280 that is being created, as well as for adding comments pertaining to the new version 280. Additionally, a menu 1810 includes selectable options that permit the user to customize the components, settings, and features that will be incorporated into the current version 280 from the previously stored version 280. The default settings for performing a restore operation may cause the current version 280 being created to incorporate the form components 211 (e.g., layout components, 311, input field components 312, etc.), configuration settings (e.g., specified by customization interfaces associated with the form components 211), title, and path from the previous version which is selected to be restored, while not incorporating certain features such as changes to associated transforms and reference data. The user may change or alter the default settings (e.g., by selecting/unselecting the checkmarks and/or X's adjacent to these settings) to customize the current version being restored. Once a user is finished editing the settings, a submit option 1830 may be selected to create a new restored version 280 that based on the selected settings.

Similar interfaces may be displayed in connection with performing restore operations on other types of form components (e.g., templates, workflows, transforms, data models, etc.) that are managed by the version control component 250.

Figure 15:
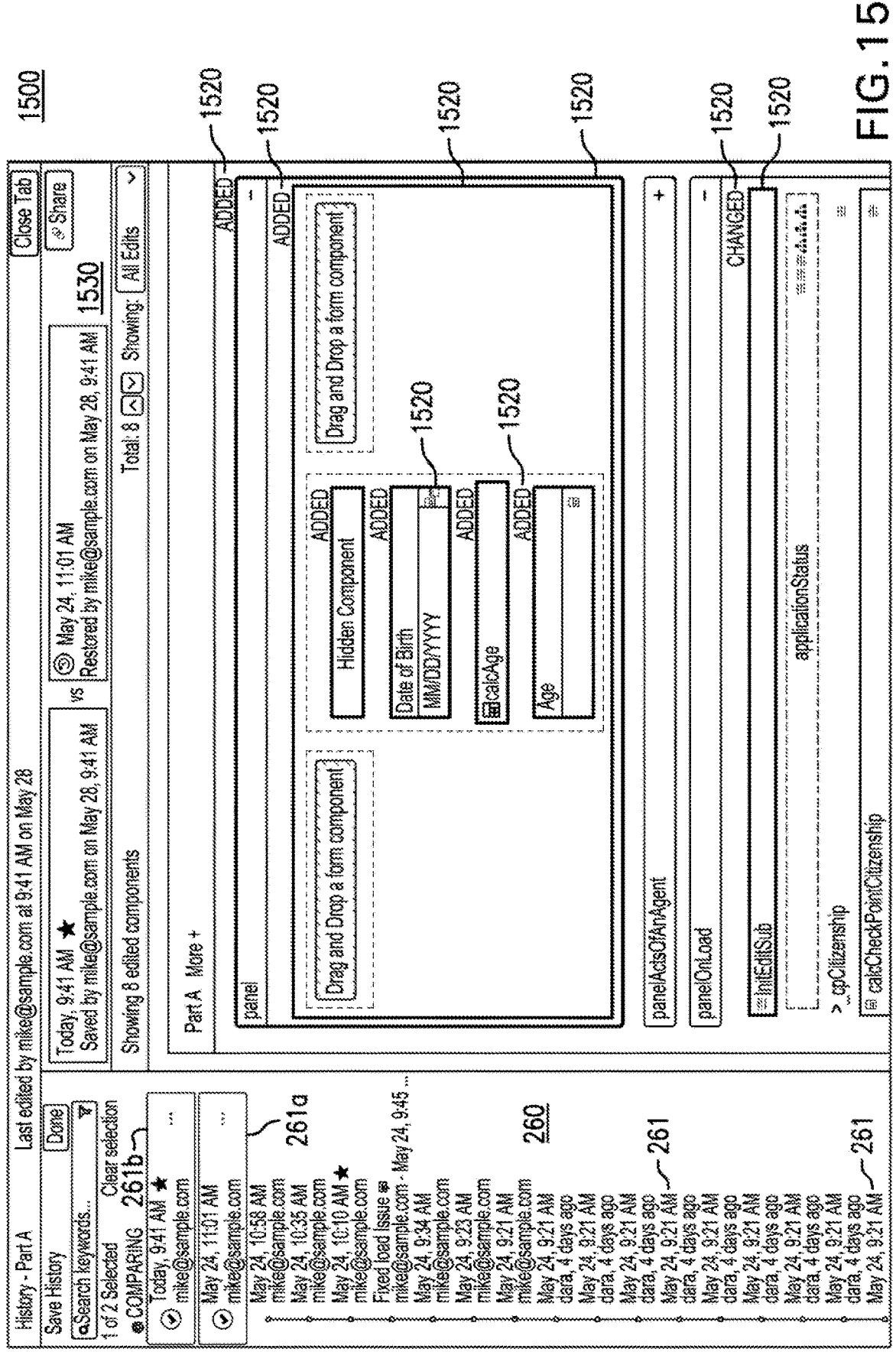
FIG. 15 is an interface that illustrates a development window configured in a comparison mode.

FIG. 15 is an example interface 1500 demonstrating an example comparison function 270 in accordance with certain embodiments. The comparison function 270 may be initiated by selecting a menu option (e.g., option 1740 in FIG. 17) corresponding to an entry 261 included in the version history timeline 260. In this example interface, two entries 261a and 261b in the version history timeline 260 are selected for comparison. A comparison header 1530 displays details of the two versions of the electronic form 155 that are being compared (e.g., including details identifying who created the versions and when they were created). The development window 330 is configured in a comparison mode 275 that identifies the differences between the two versions 280 associated with the corresponding to the selected entries.

The differences or revisions between the two selected versions 280 of the electronic form can be shown relative to one of the selected versions 280. For example, the comparison function 170 may designate one selected version of the electronic form 155 as a "first version" and may designate the later version of the electronic form as a "second version," while the differences between the versions (e.g., which are identified visually in the development window 330) are identified relative to the first version of the electronic form 155. The changes or differences may indicate whether form components 211 (e.g., such as layout components 311, input field components 312, etc.) are added, deleted, and/or edited relative to the first version of the electronic form 155.

In certain embodiments, the first version of the electronic form 155 may refer to the version which was created first in time, while the "second version" of the electronic form may version that was created later in time. Alternatively, or additionally, the user who initiates the comparison function 170 may designate which version should be considered the first and second versions, thus enabling the user to control how changes or revisions are illustrated in the development window 330 relative to the two versions. Thus, the terms "first version" and "second version" are not intended to imply a chronological order in which the versions are created. In some examples, the "first version" may relate to a version of an electronic form that was created after the "second version."

Upon selection of the two versions 280 for comparison, the development window 330 may operate in a comparison mode 275 that displays the electronic form 155 with one or more visual indicators 1520. Each visual indicator 1520 may represent an identifier, graphic, symbol, and/or annotation that identifies, denotes, and/or highlights a change or revision. Example visual indicators 1520 may be implemented using one or more of: a box annotation that surrounds or identifies a form component or setting that has been changed or revised; text that identifies or describes a change or revision to a form component or setting; a bubble or annotation that identifies a form component or setting that has been changed or revised; a change in color of a form component or setting that has been changed or revised; highlighting that identifies a form component or setting that has been changed or revised; and/or any other indicator that can be displayed to visually identify or highlight a change or revision. In certain embodiments, the development window 330 displays the electronic form 155 in a WYSIWYG format which incorporates one or more of the above-identified visual indicators 1520.

In the example interface of FIG. 15, the visual indicators 1520 include bolded lines surrounding components that have been added, deleted, and/or edited. For example, certain input field components 312 and application components 313 (e.g., labeled "Hidden Component," "Date of Birth," "calcAge," and "Age"), as well as advanced control components 315 (e.g., labeled "InitEdSub"), are highlighted in bold lines which surround these components. In certain embodiments, the bolded lines may also be highlighted in a particular color which aids in their identification. The visual indicators 1520 also include text annotations describing the type of change that applies to each revision (see "ADDED" and "CHANGED"). Other types of visual indicators 1520 may be displayed to identify revisions or changes between the two selected versions 280 of the electronic form 155.

As mentioned above, a user may utilize one or more configuration interfaces to customize form components that are inserted into a version 280 of an electronic form 155. When operating in the comparison mode 275, the customization interfaces may be accessed by selecting corresponding form components 211 that are displayed in the development window 330. As discussed below with reference to FIGS. 16A-16C, the customization interfaces also may be annotated with visual indicators 1520 to identify changes to any settings of the customization interfaces across different versions 380 of the electronic form 155.

In certain embodiments, the comparison function 170 can be configured to compare more than two versions 280 of an electronic form 155 and display changes or revisions among the versions in the comparison mode 275. For example, a user may select three or more entries 261 in the version history timeline 260 for comparison, and the development window 330 may display all of the changes relative to one of the selected versions 280. In some cases, the visual indicators 1520 may indicate which version the changes are relative to (e.g., by providing text or other annotations indicating that a component or setting of the electronic form has changed relative to one of or both of the other two selected versions). For example, the visual indicators 1520 may indicate that a form component (e.g. an input field component 312) was added in one version created on a first date, edited in a second version created on a later dated, and deleted in a third version created on an even further date.

Figure 23:
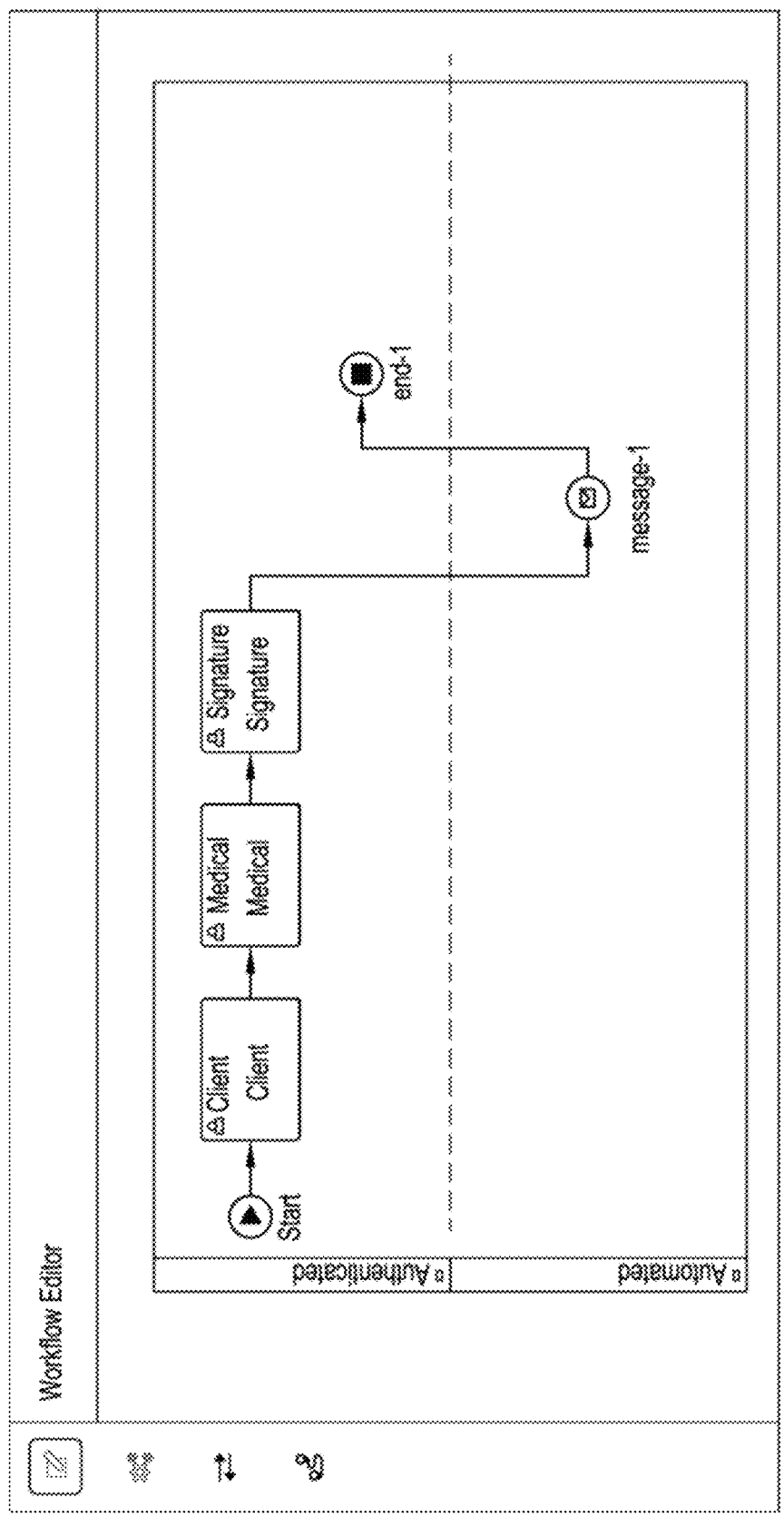
FIG. 23 is an interface that illustrates a development window associated with a workflow component configured in a comparison mode.

The version control component 250 may display comparisons for other types of form components 211 (e.g., such as template components, transform components, workflow components, etc.) in a similar fashion and using similar visual indicators 1520. Corresponding interfaces for these components can be configured to display changes between or among versions in a comparison mode 275 that utilizes visual indicators 1520 to identify changes or revisions between separate versions 280 of these components. FIG. 23, which is discussed in further detail below, provides an example of an interface that is configured in a comparison mode 275 for a workflow component.

Figure 16A:
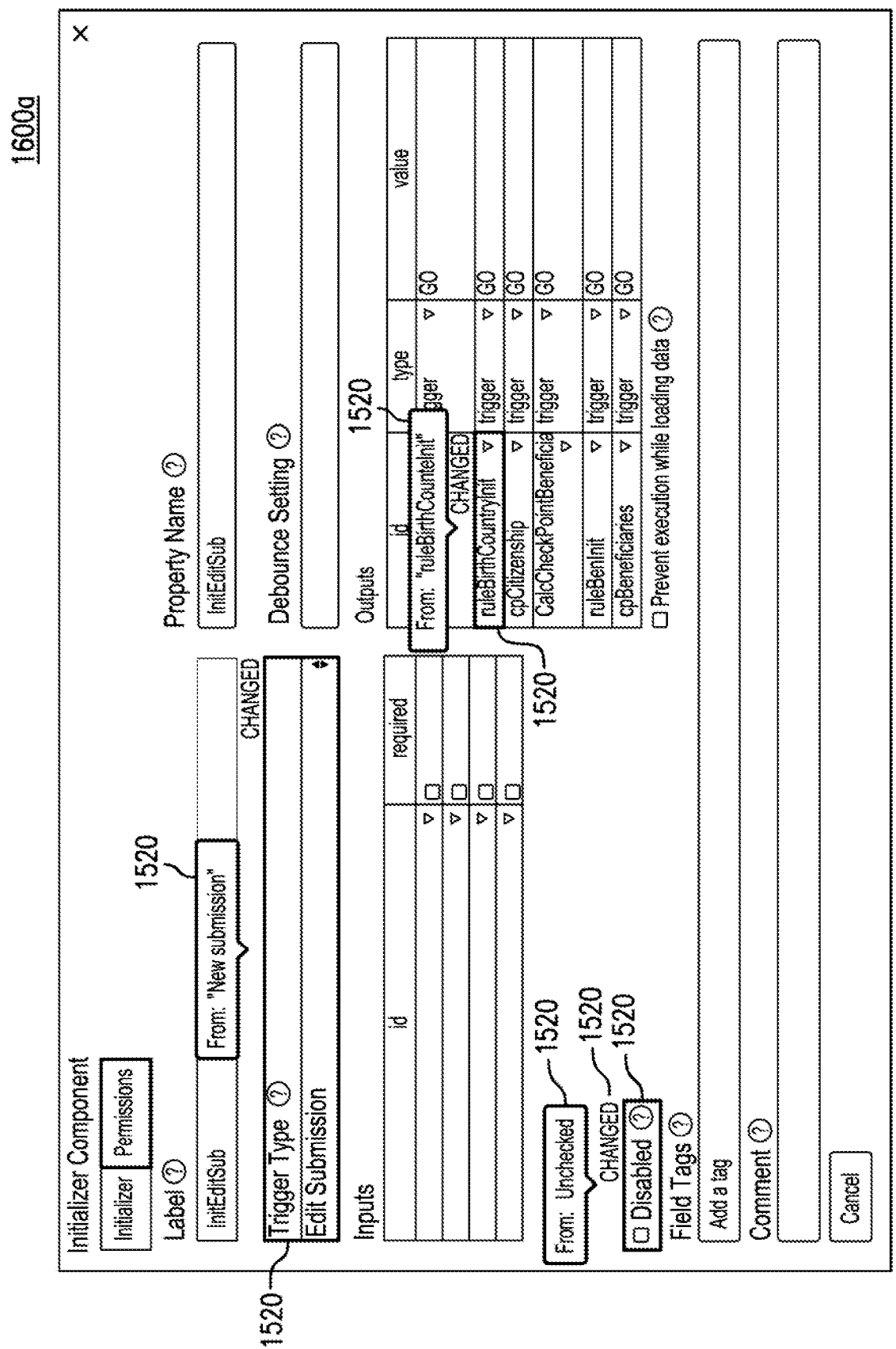
FIG. 16A is an example customization interface configured in a comparison mode.
Figure 16C:
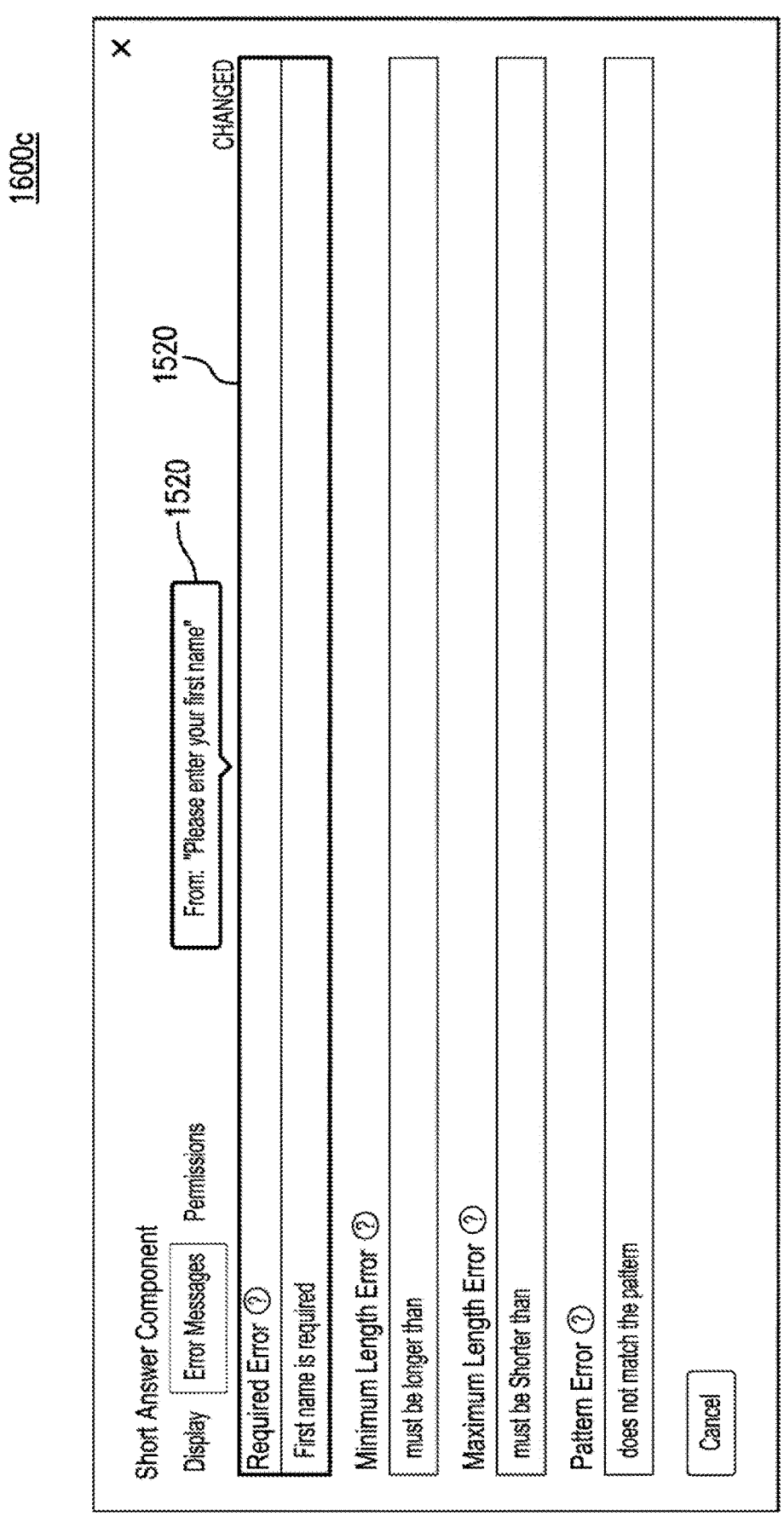
FIG. 16C is another example customization interface that is configured in a comparison mode.

FIGS. 16A-16C are example customization interfaces (1600A, 1600B, 1600C) that identify changes between versions 280 of an electronic form 155 in a comparison mode 275 in accordance with certain embodiments. FIGS. 16A-16B are example customization interfaces that may be displayed in response to a user selecting one of the form components (e.g., the component labeled "InitEdSub" in FIG. 15) from the development window 330 in a comparison mode 275. FIG. 16C is an example customization interface that may be displayed in response to selecting an input field component 312 (e.g., a short answer input field component) from a development window 330 configured in the comparison mode 275. Other configuration interfaces (e.g., such as those illustrated in FIGS. 4-8 and 9A-9B) can be annotated in a similar manner to identify changes between or among versions in a comparison mode 275.

Each of the customization interfaces in FIGS. 16A-C includes visual indicators 1520 that identify changes in configurations or settings across different versions of an electronic form 155. The visual indicators 1520 again include bolded lines and text which allow for easy identification of changes across the versions 280. Here, the visual indicators 1520 also include pop-up annotations or text bubbles that identify the previous settings that were specified for the customization interfaces. For example, in FIG. 16A, the visual indicators 1520 show that an output setting was changed from "ruleBirthCounteInit" to "ruleBirthCountryInit", a checkbox value was changed from "unchecked" to "checked", and a trigger value was changed from "New Submission" to "Edit Submission." Similar visual indicators 1520 are included in FIGS. 16A-B to demonstrate other settings that have been changed on these customization interfaces.

Figure 19:
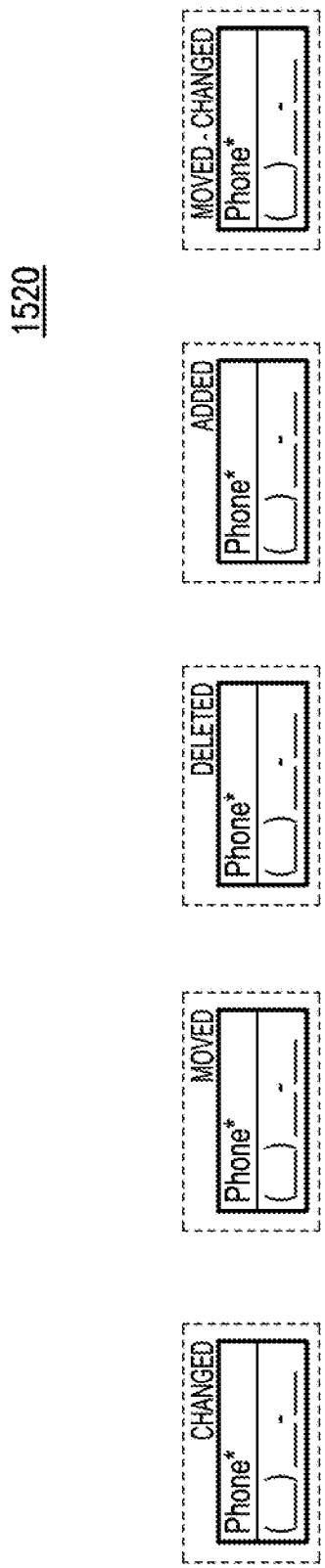
FIG. 19 illustrates example visual indicators associated with implementing a comparison function.

FIG. 19 illustrates example visual indicators 1520 associated with implementing a comparison function 270 in accordance with certain embodiments. As explained above, the visual indicators 1520 may be displayed on an interface (e.g., in development window 330 and/or on one or more customization interfaces) configured in a comparison mode 275 that illustrates changes between or among different versions of electronic forms and/or other form components.

In this figure, the visual indicators 1520 are displayed in connection with an input field component 312 (e.g., an input field for collecting a telephone number). The same or similar visual indicators 1520 can be displayed in connection with any other form components 211 (e.g., such as layout components 311, application components 313, template components 314, advanced control components 315, workflows, transforms, etc.) and/or settings described herein.

In each of the five illustrated examples, the form component is highlighted using visual indicators 1520 that include bolded lines, broken line annotation boxes, and text describing the corresponding changes. In certain embodiments, the bolded lines and/or annotation boxes may also be highlighted in particular colors to draw attention to these components when they are displayed in the comparison mode 275 on an interface to a form builder who is trying to identify the changes among two or more versions 280 of an electronic form 155. As shown, the text describing the change may indicate to a form builder that the component was added, deleted, changed/revised (e.g., the input field and/or configuration settings corresponding to the component were changed or revised), moved (e.g., the location of the component within the form was moved), and/or a combination of thereof.

Figure 20:
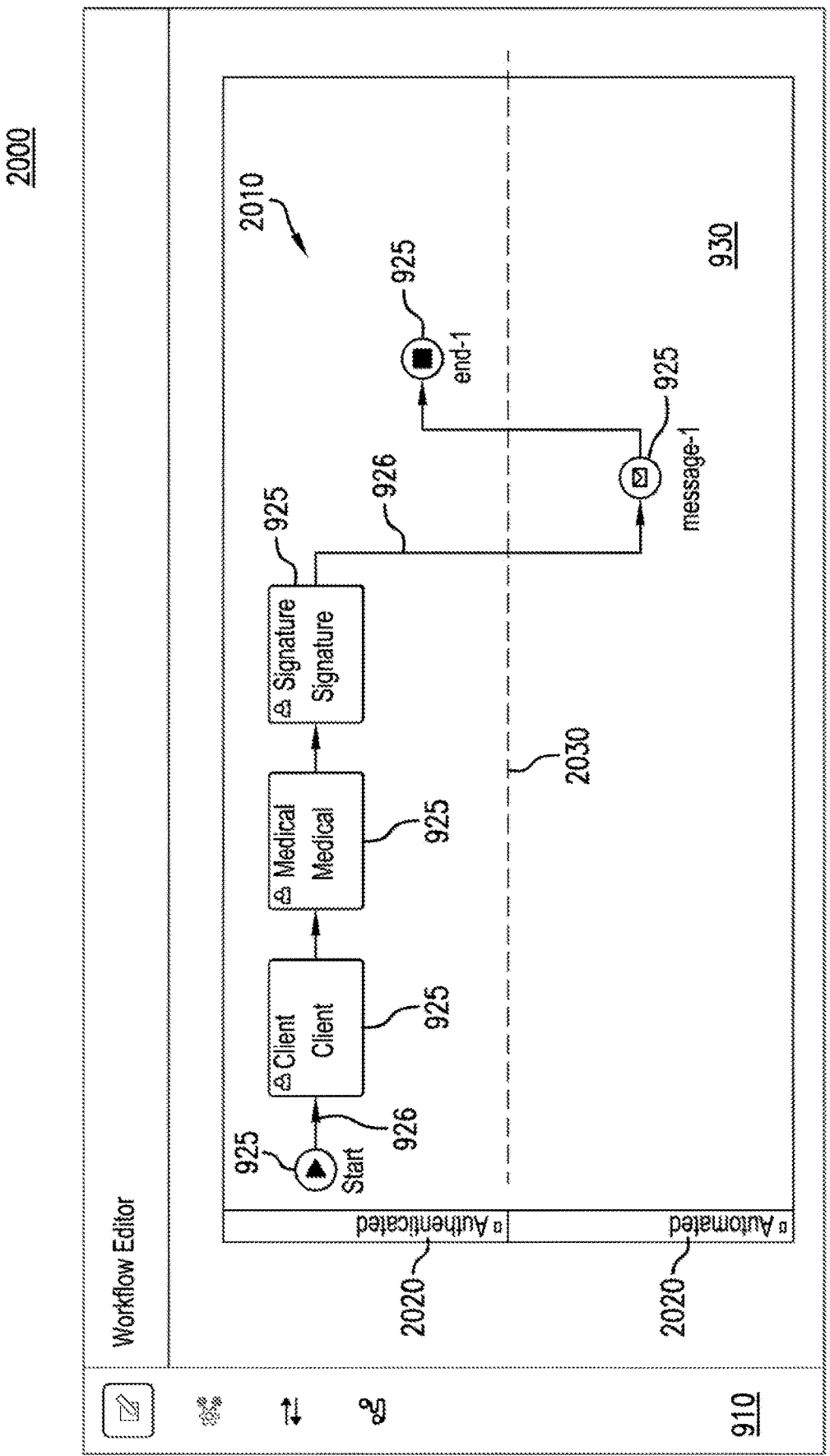
FIG. 20 is an example interface that may be displayed in connection with creating or updating a workflow.
Figure 21:
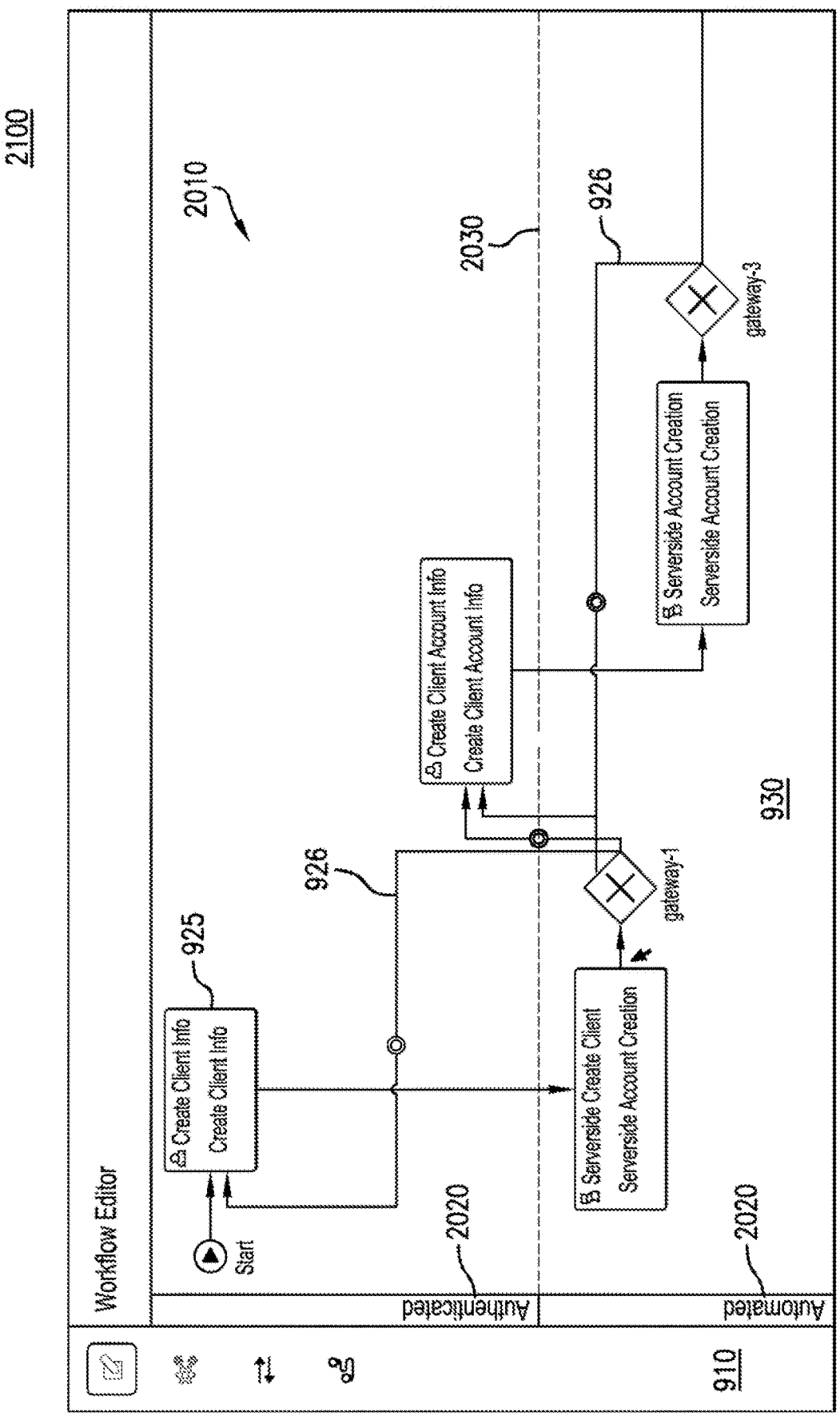
FIG. 21 is an example interface that may be displayed in connection with creating or updating a workflow.

FIGS. 20-21 are example interfaces 2000 and 2100 for creating and/or updating workflows 2010 according to certain embodiments. In these example interfaces, the workflows 2010 can be defined in a manner that allocates portions of the workflows 2010 to be performed by specific individuals, entities, and/or devices based on assigned roles. On each of these interfaces, a diagram development window 930 is used to define a workflow 2010 that is being created or updated. As described above, the workflows 2010 can be defined by selecting, inserting (e.g., dragging-and-dropping), and customizing nodes 925 and connections 926 to create a node diagram 920 in the diagram development window 930, and the workflow 2010 associated with the node diagram 920 can be integrated into one or more electronic forms 155 to provide enhanced control and functionality for the one or more electronic forms 155.

In creating a node diagram 920 for defining a workflow 2010, a user can also provide inputs for defining roles 2020, and assigning functions associated with a workflow 2010 to be performed by individuals, entities, and/or devices associated with the particular roles 2020. For example, a user can create a workflow 2010 that assigns the functions associated with each node 925 to be performed by individuals, entities, and/or devices associated with the particular roles 2020.

Example roles may include:

(1) Customer Role: This role 2020 may be associated with, and performed by, individuals or customers who access deployed electronic forms 155, or portions thereof, in connection with particular products or services. For example, a third-party system 130 may deploy an electronic form 155 in connection with a particular product or service (e.g., an insurance product or service). Customers may access an electronic form 155 that is deployed publicly (e.g., via a website) by the third-party system 130 to provide and/or obtain information associated with the product or service. One or more nodes 925 included in workflows 2010 for these electronic forms 155 may enable or require the customers to provide information and/or perform certain functions by associating a customer role with the one or more nodes 925.

(2) Back-end User Role: This role 2020 may be associated with, and performed by, individuals who execute or perform certain tasks and functions for a third-party system 130 and/or an entity that hosts of the development and deployment platform 150. For example, a third-party system 130 that offers insurance products may designate back end user roles to brokers, underwriters, form builders, and/or other persons. Likewise, a development and deployment platform 150 may designate back-end user roles for form builders, administrators, and/or other persons who assist third-party systems with creating and/or deploying electronic forms 155. One or more nodes 925 included in the workflows 2010 for the electronic forms 155 may enable or require these individuals to provide information and/or perform certain functions in connection with carrying out the workflows 2010.

(3) Automated Role: This role 2020 may be associated with, and performed by, devices (e.g., servers 120 and/or computing devices 110) that execute processes in the background of electronic forms 155. For example, in response to receiving information from customers and/or back-end users, these devices may automatically process the received information and/or perform various functions associated with the electronic forms 155. One or more nodes 925 included in the workflows 2010 for the electronic forms 155 may enable or require these devices to process certain information and/or perform certain functions in connection with carrying out a workflow 2010.

Each of the above roles 2020 may be created or defined using options included on a menu 910 and/or by other functions made available via the development and deployment platform 150. It should be recognized that that additional roles 2020 may be created or defined, and incorporated into workflows 2010 other than those described above.

In certain embodiments, role division lines 2030 may be inserted into the node diagrams 920 that define the workflows 2010. The role division lines 203 can be inserted into the node diagrams 920 by selecting options on a menu 910.

The role division lines 2030 can be utilized to assign the functions associated with each of the nodes 925 to one or more particular roles 2020. For example, the role division lines 2030 can be utilized to specify which roles 2020 are able or required to perform certain functions associated with each of the nodes 925 included in a workflow 2010 and/or to allocate permissions to such roles 202 to perform such functions.

In FIGS. 20 and 21, a role division line 2030 segments workflows 2010 between two different roles 2020. The functions associated with the nodes 925 included in the top section of the diagram development window 930 (located above the role division line 2030) are allocated to be performed by one or more individuals who are capable of performing a first role 2020 (e.g., a customer role and/or back-end user role which is labeled "authenticated"). For example, this may involve one or more particular individuals (e.g., customers, brokers, and/or underwriters) supplying information via a deployed electronic form 155 and/or executing certain functions to complete a particular portion of the electronic form 155. The functions associated with the nodes 925 included in the bottom section of the diagram development window 930 (located below the role division line 2030) are allocated to devices that are capable of performing a second role 2020 (e.g., an automated role which labeled "automated").

In other more complex workflows 2010, multiple role division lines 2030 may be included in each workflow 2010 to allocate functions associated with the workflow nodes 925 among many different roles 2020. For example, functions associated with a workflow 2010 may be divided among four roles 2020 including a customer role, a first back-end user role (e.g., associated with a broker), a second back-end user role (e.g., associated with an underwriter), and an automated role. In this scenario, the diagram development window 930 can be divided into four separate sections using role division lines 2030, and each of the sections can be associated with one of the roles 2020. Inserting or including a node 925 into a particular section indicates that the corresponding function of the node 925 is to be performed by an individual and/or device that is associated with the role 2020.

To illustrate by way of further example, consider an electronic form 155 that is deployed (e.g., by a third party system 130) to collect information for an insurance product. In this scenario, a workflow 2010 for the electronic form 155 may specify that particular subsets of information should be supplied from each of a plurality of individuals. To facilitate such, nodes 925 may be incorporated into the workflow 2010 for collecting the information, and a plurality of role division lines 2030 may be incorporated into the workflow 1020 to designate these functions to particular roles 2020. For example, in connection with executing a workflow 2010, one subset of information may be collected via a form interface from a customer (e.g., a first role 2020) of the insurance product, a second subset of information may collected via a form interface from by a broker (e.g., a second role 2020) of the insurance product, and a third subset of information may be collected via a form interface from by an underwriter (e.g., a third role 2020) of the insurance product. The workflow 2010 can include separate nodes 925 for collecting each subset of information, and the connections 926 between the nodes 925 can control the sequence in which each subsets of information are collected. Additionally, role division lines 2030 can be inserted into the workflow 2010 to identify each individual or role 2020 that is capable of supplying the various subsets of information.

Staying with the above example, the workflow 2010 associated with electronic form 155 may also specify that certain functions are to be performed by a server or computing device in the background during execution of the workflow 2010. For example, during the workflow 2010, the server or computing device may transmit confirmation e-mails, create or edit account information, verify information, execute transform operations on received data, update databases, and/or perform other processing operations. In this scenario, the role division lines 2030 can allocate these functions to the server or computing device as a separate role 2020 to be performed by these devices. Thus, roles 2020 may be assigned to devices to perform certain functions automatically, as well as to specific individuals to perform certain functions and/or supply information.

As mentioned above, the version control component 250 can be configured to perform various functions associated with the managing multiple versions 280 of workflow components (as well as other form components). For example, the version control component 250, inter alia, can perform functions associated with storing or archiving multiple versions 280 of workflows 2010, accessing or viewing to the stored workflows 2010, and/or executing comparison functions 270 for comparing stored versions 280 of the workflows 2010. Any of the functionality of the version control component 250 described above with respect to managing multiple versions of electronic forms 155 can also be applied to manage multiple versions of workflows 2010 and/or other form components 211.

FIG. 23 is an example interface 2300 that demonstrates how the version control component 250 can be applied to workflows 2010 and/or workflow components. Similar to the interfaces illustrated in FIGS. 13 and 15, a version history timeline 260 can include a listing of entries 261, each of which corresponds to a stored version 280 of a workflow 2010 (and/or which corresponds to a stored version 280 of a node diagram 920 that defines the workflow 2010). As explained above, various indicators (e.g., restore indicators 262a, promotion indicators 262b, star indicators 262c, and comment indicators 262d) and labels can be assigned to the entries 261. The entries 261 in the version history timeline 260 can be selected to access or view the stored versions 280. In response to selecting an entry 261, the diagram development window 930 can be updated to display a corresponding workflow 2010 and/or node diagram 920.

Moreover, as discussed above, the diagram development window 930 associated with a workflow component can be configured in a comparison mode 275 and can display visual indicators 1520 showing changes and/or revisions between or among two or more versions 270 of a workflow 2010. The visual indicators 1520 identify nodes 925, connectors 926, and/or other aspects of the workflows 1020 that have been. The nodes, connectors and/or other features associated with the workflows 2010 may be selected to access customization interfaces, and visual indicators 1520 may be included on such interfaces to identify any changes in the settings.

In this example, the visual indicators identify a transform component 2350 and associated connectors have been inserted into a workflow 2010. As described above, the transform components 2350 may perform functions for transforming and/or manipulating inputs that are received via an electronic form. For example, a user may design a transform component 2350 using one or more interfaces that accessible via the development platform 150, and that transform component 2350 may be inserted into electronic forms either directly (e.g., via development window 330) or by including the transform component 2350 in workflows 2010 that are associated with the electronic forms 155. As with any other form component 211 described herein, multiple versions of the transform component 2350 can be saved and/or archived, and the version control component 250 can enable various functions (e.g., viewing, accessing, comparing, restoring, etc.) to be performed in connection with the versions.

Figure 22:
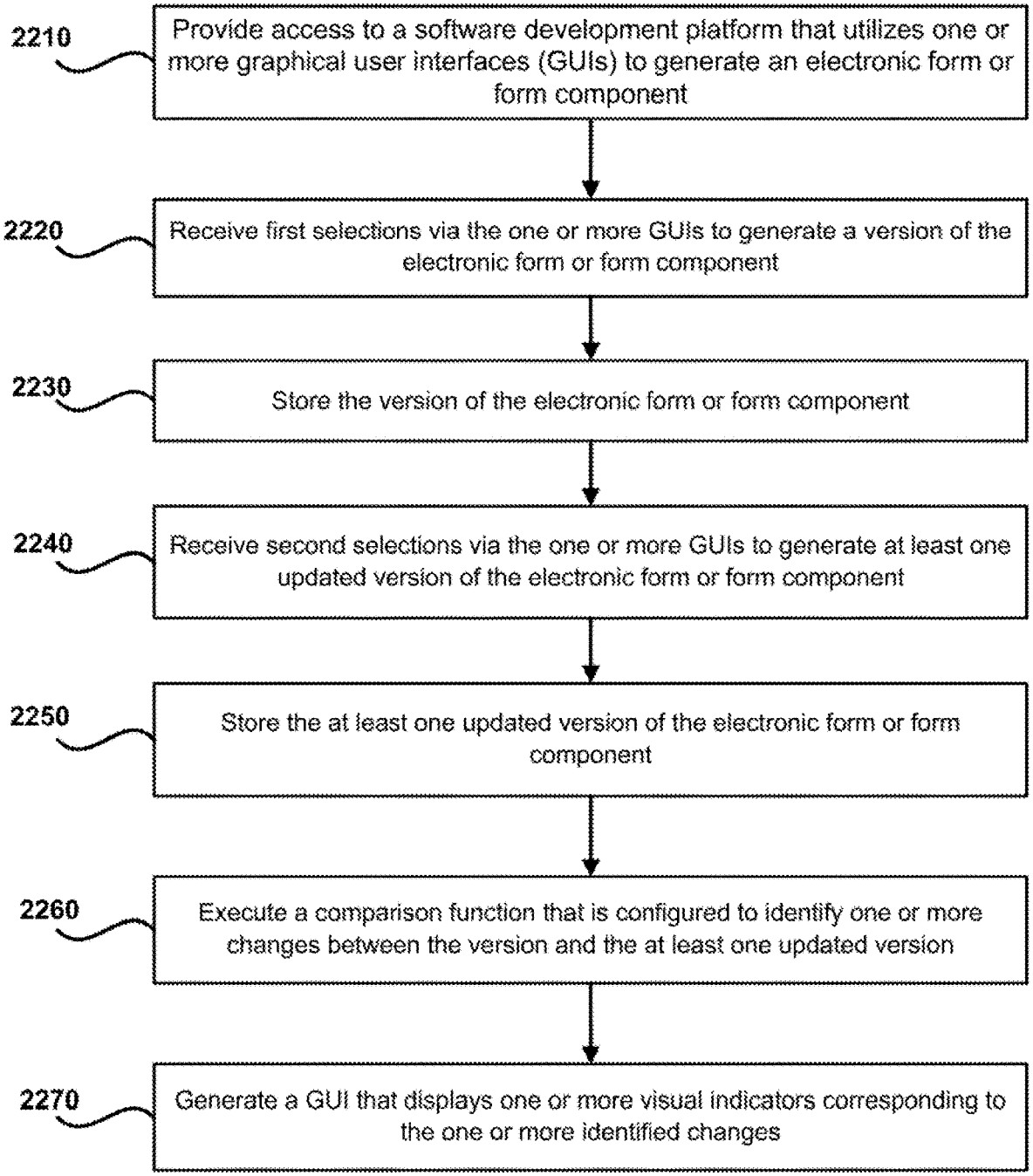
FIG. 22 is a flow chart of an example method for implementing version control of an electronic form.

FIG. 22 is a flow chart of an example method 2200 for implementing version control of an electronic form or associated form component in accordance with certain embodiments. Method 2200 is merely example and is not limited to the embodiments presented herein. Method 2200 can be employed in many different embodiments or examples not specifically depicted or described herein. In some embodiments, the steps of method 2200 can be performed in the order presented. In other embodiments, the steps of method 2200 can be performed in any suitable order. In still other embodiments, one or more of the steps of method 2200 can be combined or skipped. In many embodiments, the development and deployment platform 150 and/or version control component 250 can be suitable to perform method 2200 and/or one or more of the steps of method 2200. In these or other embodiments, one or more of the steps of method 2200 can be implemented as one or more computer instructions configured to run on one or more processing modules (e.g., processor 202) and configured to be stored at one or more non-transitory memory storage modules (e.g., storage device 201). Such non-transitory memory storage modules can be part of a computer system, such as system 100, development and deployment platform 150, computing device 110, server 120, and/or third-party system 130.

In step 2210, access is provided to a software development platform that utilizes one or more graphical user interfaces (GUIs) to generate an electronic form 155 or form component. The software development platform may represent the development and deployment platform 150 described herein. In certain embodiments, a user may access the software development platform over a network 160 and/or directly via a local device. In certain embodiments, the user may utilize a web browser and/or local application to access the platform. The one or more GUIs may include any of the interfaces described in this disclosure. As explained above, the software development platform can be configured to create and/or update various electronic forms 155, as well as various form components 211 that are incorporated and/or utilized by the electronic forms. The form components 211 can include layout components 311, input field components 312, application components 313, templates components 314, advanced control components 315 (e.g., including workflow components, decision components, transform components etc.), data models 290, and/or other related components.

In step 2220, first selections are received via the one or more GUIs to generate a version 280 of the electronic form 155 or form component. The first selections may be received via one or more GUIs (e.g., via a development window included on one or more form generation interfaces 300 and/or 1200) accessible via the development and deployment platform 150 to create and/or update an electronic form 155 (e.g., by specifying and customizing form components to be included in the electronic form). Additionally, or alternatively, the first selections may be received via one or more GUIs (e.g., via a workflow development window 930 included on one or more interfaces) accessible via the development and deployment platform 150 to create and/or update a form component 211 (e.g., by specifying fields, settings, diagrams, and/or other aspects of form components). As explained above, the version control component 250 may permit multiple versions of each electronic form 155 and/or form component to be stored or archived. The first selections can be utilized to create either an initial version 280 for the electronic form 155 or form component, or an updated version 280 of the electronic form 155 or form component.

In step 2230, the version 280 of the electronic form 155 or form component is stored. The version control component 250 can store the version 280 of the electronic form 155 or form component in a database (e.g., database 240) and/or on one more storage devices 201. Thereafter, the version 280 of the electronic form 155 or form component may be made available via a corresponding version history timeline 260.

In step 2240, second selections are received via the one or more GUIs to generate at least one updated version of the electronic form or form component. Again, the second selections may be received via one or more GUIs accessible via the development and deployment platform 150 to create and/or update an electronic form 155. Additionally, or alternatively, the second selections may be received via one or more GUIs accessible via the development and deployment platform 150 to create and/or update a form component. The second selections can generate a new version of the electronic form 155 or form component that is different from the version created previously in step 2220. For example, in some embodiments, the at least one updated version 280 of the electronic form or form component can be created by accessing a previously stored version 280 (e.g., the version created in step 220) of the electronic form 155 or form component via a version history timeline 260 and inputting the second selections to modify the previously stored version.

In step 2250, at least one updated version of the electronic form or form component is stored. Again, the version control component 250 can store the at least one updated version of the electronic form 155 or form component in a database (e.g., database 240) and/or on one more storage devices 201. Thereafter, the at least one updated version of the electronic form 155 or form component may be made available via a corresponding version history timeline 260.

In step 2260, a comparison function 270 is executed that is configured to identify one or more changes between the version 280 and the at least one updated version 280. As mentioned above, a user that desires to compare two or more stored versions 280 of an electronic form or form component can access a version history timeline 260 and select the versions 280 that are to be compared. Upon identifying the versions 280 to be compared, the comparison function 270 may be utilized to identify changes between or among two or more stored versions 280 of an electronic form or form component. Example changes may correspond to additions, deletions, and/or edits to various components and/or settings associated with an electronic form 155 and/or form components.

In step 2270, a GUI is generated that displays one or more visual indicators 1520 corresponding to the one or more identified changes. For example, as explained above, an interface may be generated which displays an electronic form or form component in a comparison mode 275. The one or more visual indicators 1520 can include various annotations and/or text that identify or highlight changes between or among the versions 280 that are being compared. Example visual indicators 1520 may include boxes, highlighting, graphics, and/or other annotations that are inserted to identify the changes, and/or text which identifies the type of change (e.g., indicating whether a feature was added, deleted, edited, and/or moved) and content that was changed (e.g., indicating both previous and updated values associated with parameters, variables, and/or settings).

Application Optimization Based on Complexity Scores

As noted above, another functionality implemented by the development and deployment platform (such as the platform 150 illustrated in FIG. 2) is that of complexity measurement and application optimization based on such measured complexity. Once complexity metrics are computed for the application, its various modules and components, an optimization engine (e.g., the unit 216 depicted in FIG. 2) is applied to the initial configuration information representative of the layout of the application (as initially developed by a user) and to the complexity data computed for that layout, to generate a more optimized (from a reduced complexity perspective) arrangement of components that achieves substantially the same functionality as that of the original design.

In some embodiments, measuring the complexity of an application is performed (e.g., through the complexity measurement unit 214 depicted in FIG. 2) by deriving a cyclomatic complexity for the application. The cyclomatic complexity is a metric used to indicate the complexity of a program by measuring the number of linearly independent paths or branches in a given scope. For example, for a program that has more decision points, the complexity of the program increases. If the program has a high complexity measure, then the probability of error is high, increasing maintenance time and troubleshooting. Accordingly, the approaches described herein seek to reduce or limit the complexity of an application. It should be noted that complexity can be measured through metrics other than cyclomatic complexity, although for the purposes of the present discussion, the examples used will be based on cyclomatic complexity measures.

Figure 24:
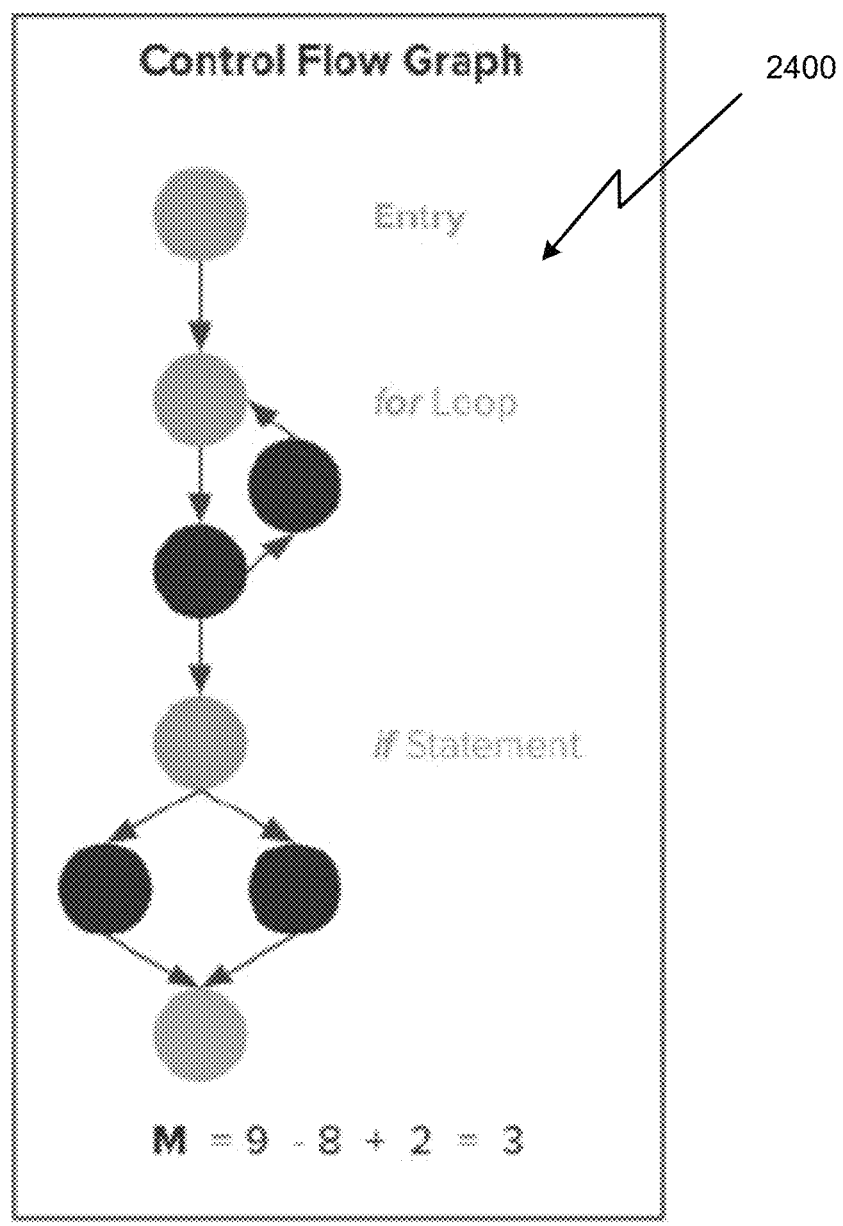
FIG. 24 is a diagram of an example control flow graph for which a cyclomatic complexity measurement is performed.

One way to compute the cyclomatic complexity is based on a formulation that measures the number of linearly independent paths according to, for example:

$$M=E-N+2P,$$

where E represents the number of edges in a control flow graph, N represents the number of nodes on the graph, and P is the number of connected components (1 for a given function or application). Consider, for example, the simple control flow graph 2400 illustrated in FIG. 24 (such a control graph could have been implemented by, for example, the development tool 210 of FIG. 2, using a GUI form generation interface such as the interface 201 of FIG. 2). The program represented by the graph 2400 begins executing at the entry node, and enters a loop. On exiting the loop, there is a conditional statement (If Statement), and finally, the program leaves at the end node. This graph has 9 edges, 8 nodes, and 1 connected component, so the program's cyclomatic complexity is 9−8+2*1=3.

An alternative formulation for measuring complexity is to count every for, while, if, case statements, and entry points for functions and applications. In the example application development framework described herein, components that branch paths can serve to measure complexity. Thus, the following complexity measuring scheme could be used to derive complexity scores:

a) Decision components—score+1 for each cell in a decision table.
b) Calculator components—score+1 for each IF statement.
c) Dataworkflow—score+1 for each Table, Array, or Gateway node.
d) DataMapper component—score+1 for each row, and +1 for each IF statement.
e) Workflow component—score+1 for each Start Point, and +1 for each branch out of a Gateway
f) For All Components—score+1 for inputs that are not required and for triggers.

The above scheme is not exhaustive, and other components or interlinked arrangements (developed using different technologies and platforms) may also be included and scored according to one or more different scoring schemes. Furthermore, other scoring schemes to represent the complexity of components and their particular arrangement may also be realized.

In the implementations described herein, the complexity (cyclomatic or otherwise) can be computed at the component level, module level, workflow level, and/or application level. The calculation can be stratified across two sources: custom and templates. Specifically, module complexity can be computed as the sum of the component complexity for the components encompassed by a particular module, i.e., Module Complexity=SUM(Component Complexity). Application complexity can be computed according to:

Application Complexity=SUM(Module Complexity)+SUM(Workflow Complexity)

As will be discussed in greater detail below, in situations where modules or components that were generated using unmodified templates (e.g., black boxes corresponding to previously defined components, or arrangements of components, with well-established behavior), such unmodified templates (available, for example, in the databases 240 of the development and deployment platform 150) can have their complexity accounted for separately since such templates tend to have well-established and predictable behavior, and generally have been sufficiently tested.

Thus, upon an initial development of an application (or while the application is being developed), the application development and deployment platform (e.g., the platform 150 of FIG. 2) may be configured to receive configuration data representative of an initial (or incomplete/intermediate) arrangement of interlinked components forming a data application, and to determine (e.g., by the complexity measurement unit 214 of FIG. 2), based on the received configuration data, one or more complexity scores indicative of levels of complexities for one or more portions of the initial arrangement of interlinked components forming the data application. The complexity measurement unit configured to determine the one or more complexity scores may be configured to compute cyclomatic complexity scores for the one or more portions of the data application.

The complexity measurement unit configured to determine one or more complexity scores may be configured to compute component complexity scores for one or more of the interlinked components forming the data application, and/or compute a workflow complexity score representative of a workflow complexity defined by the interlinked components. In embodiments in which the complexity measurement unit computes the component complexity scores for the one or more of the interlinked components, the complexity measurement unit may be configured to determine implementation characteristics for a particular component of the one or more interlinked components, and derive a component complexity score for the particular component based on the implementation characteristics for the particular component. For example, in some embodiments, the complexity score for a particular component may be derived according to the following scheme: a) when the particular component is determined to be a decision component, the component complexity score is incremented by one for each cell of a decision table of the decision component, b) when the particular component is determined to be a calculator component to perform a calculation on two or more inputs, the component complexity score is incremented by one for each IF statement identified in the calculator component, c) when the particular component is determined to be a data mapper component to map input data to one or more tables managed through the data mapper component, the component complexity score is incremented by one for each row of the data mapper component, and for each IF statement identified in the data mapper component, and/or d) when the particular component is determined to be a workflow component to define background processing involving two or more content components in the data application, the component complexity score is incremented by one for each start point identified in the workflow component, or for each branch out of a gateway identified in the workflow component.

As noted, the complexity of an application can be reduced by separating interlinked components into modules that can be analyzed and tested separately from the rest of the application. In some embodiments, the complexity can also be reduced by altering the connectivity between groups of components so that new interconnections are created by connecting modules to each other (e.g., from an output of a first module, to an input of a second module) instead of having component-to-component connectivity. By separating component groups into modules and/or altering connectivity, the initial configuration an application layout becomes less cumbersome to analyze, and decreases the chances of application failure.

To illustrate, consider the example data capture and logic application provided in FIG. 25. In this example, an initial application structure (configuration) 2510 is provided, which may have an initial application layout developed by a user. An equivalent structure 2520 is also shown, which may have been automatically generated to provide a more optimal (from a reduced-complexity perspective) configuration than the structure A. As can be seen, both Structure A (2510) and Structure B (2520) have a total complexity of 9 (in this example complexity-measuring procedure). Although Structure A has four fewer components, Structure B is, on average, less complex and is easier to understand. The main module 2522 (marked as module 1) of the structure 2520 is significantly less complicated since most of the complexity is hidden in a server-side module 2524 (marked as module 2).

The example of FIG. 25 shows that one approach for reducing the complexity of an application (thus making the application more manageable and more optimal from a risk, testing, and handling perspectives) is to separate, where possible, groups of components into modules that can more easily be handled than the initial unseparated layout of components. The tradeoff, as FIG. 25 illustrates, is that in some situations the transformed (resultant) modular structure may have in the aggregate more components than the initial configuration. Nevertheless, the modular nature of the resultant configuration of components simplifies the layout by presenting an otherwise cumbersome configuration in a more discretized structure, with easier to follow (and thus easier to debug) connectivity.

Accordingly, the development and deployment platform implementation described herein may include an optimization/reconfiguration unit (such as the unit 216 in FIG. 2) adapted to automatically reconfigure the initial arrangement of interlinked components based on the computed one or more complexity scores to produce a resultant arrangement of interlinked components forming the data application. The resultant arrangement of interlinked components generally has a reduced average complexity. As noted, the layout optimization (achieved through reconfiguration of the initial arrangement of components) can be realized by applying machine learning models to make modularization decisions (as was discussed above in relation to the machine learning component 230 depicted in FIG. 2) thus generating simple and low-risk apps. Complexity measures (e.g., cyclomatic complexity scores, or other types of complexity scores) can be computed as the application is being built. Complexity optimization processes can then be leveraged to automatically reduce the average complexity. Such an approach allows the developer to focus on implementing the requirements of the application (i.e., without necessarily worrying about coding efficiency or aesthetics), while the optimization engine can simplify the apps without the developer's intervention.

In some embodiments, a business rules driven engine can be applied to control the modularization operations. For example, different sets rules can be used to determine whether to separate components in an initial configuration into modules. One such example rule is to require that components directed to input data entry should, if possible (i.e., subject to additional constraints, such as constraints about capping the complexity score allowed in a modularized structure), be grouped together so as not to adversely affect the user-experience (e.g., to have a user's personal information entered through a single interface screen, rather than splitting some required input data fields into separate screens). Another rule may require separating into different modules components that can be handled by different ends of the system (e.g., separating groups of components that can be handled by a back-end server into one set of modules, while separating groups of components that need to be executed at a user's equipment into a different set of modules).

Figure 26:
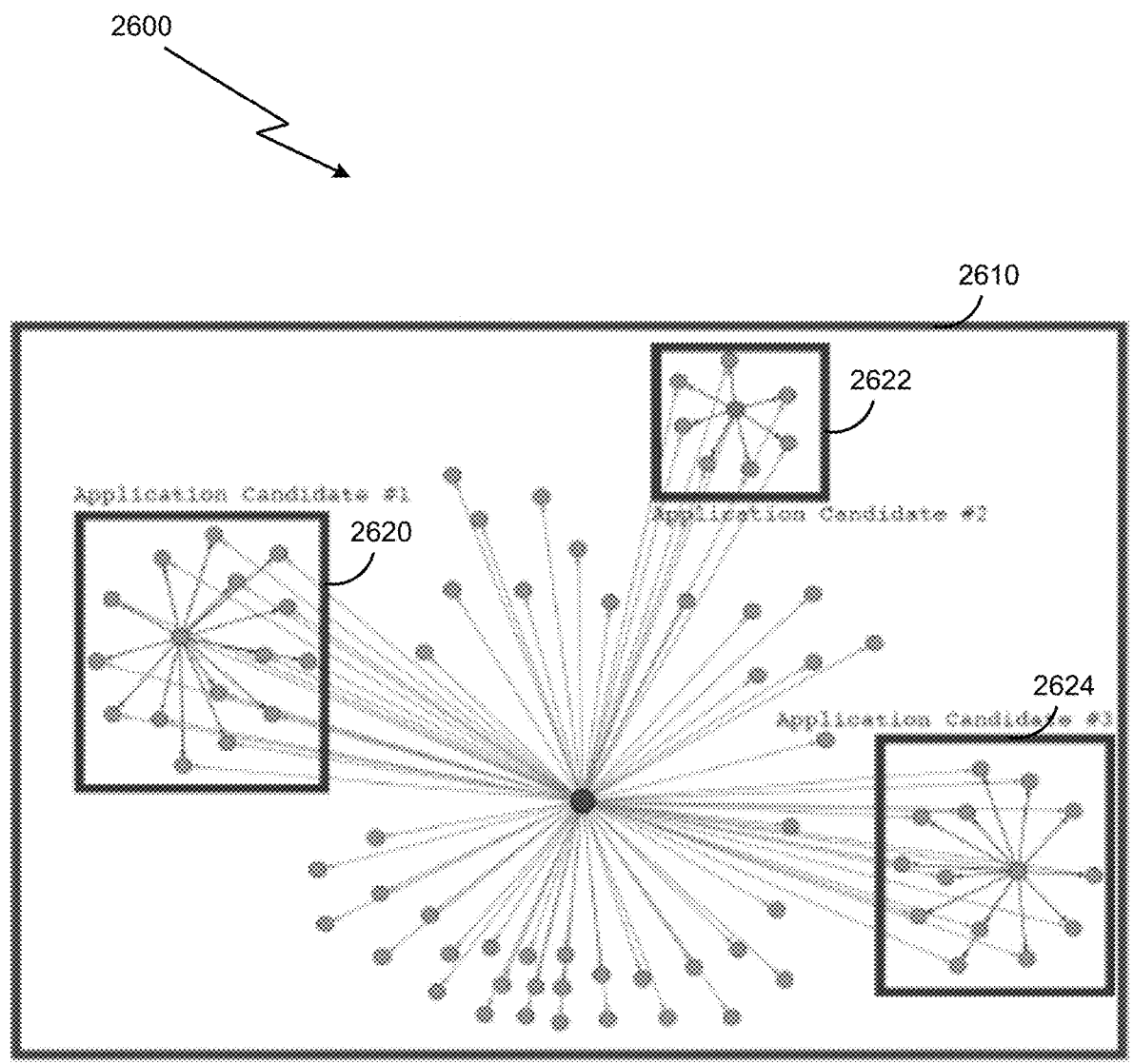
FIG. 26 is a schematic representation of a layout of an application created by a developer, that is split into multiple modules in order to reduce average complexity.

To illustrate, consider the example of FIG. 26 providing a schematic representation 2600 of a layout of an application created by a developer. As seen in FIG. 26, the representation of the app inside the box 2610 is very complex, with much of the complexity being concentrated in the smaller boxes 2620, 2622, and 2624. Under the approach discussed herein, the initial configuration (i.e., the structure insider the box 2610) can be broken into four (4) modules. This keeps the original business requirements intact while the structure is simplified quite a bit.

Figure 27A:
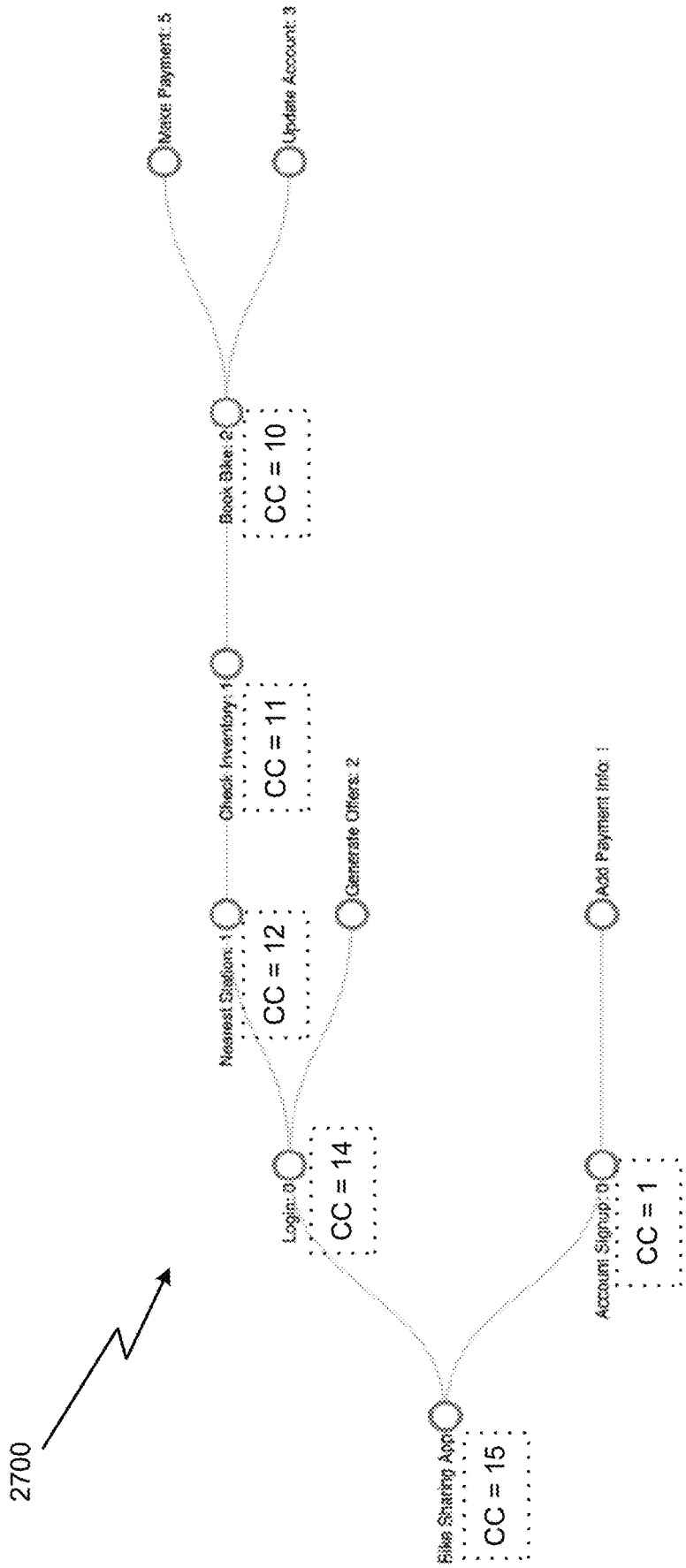
FIGS. 27a-b are example flow diagrams illustrating an example optimization procedure to modularize an initial flow diagram representative of an application layout.
Figure 27B:
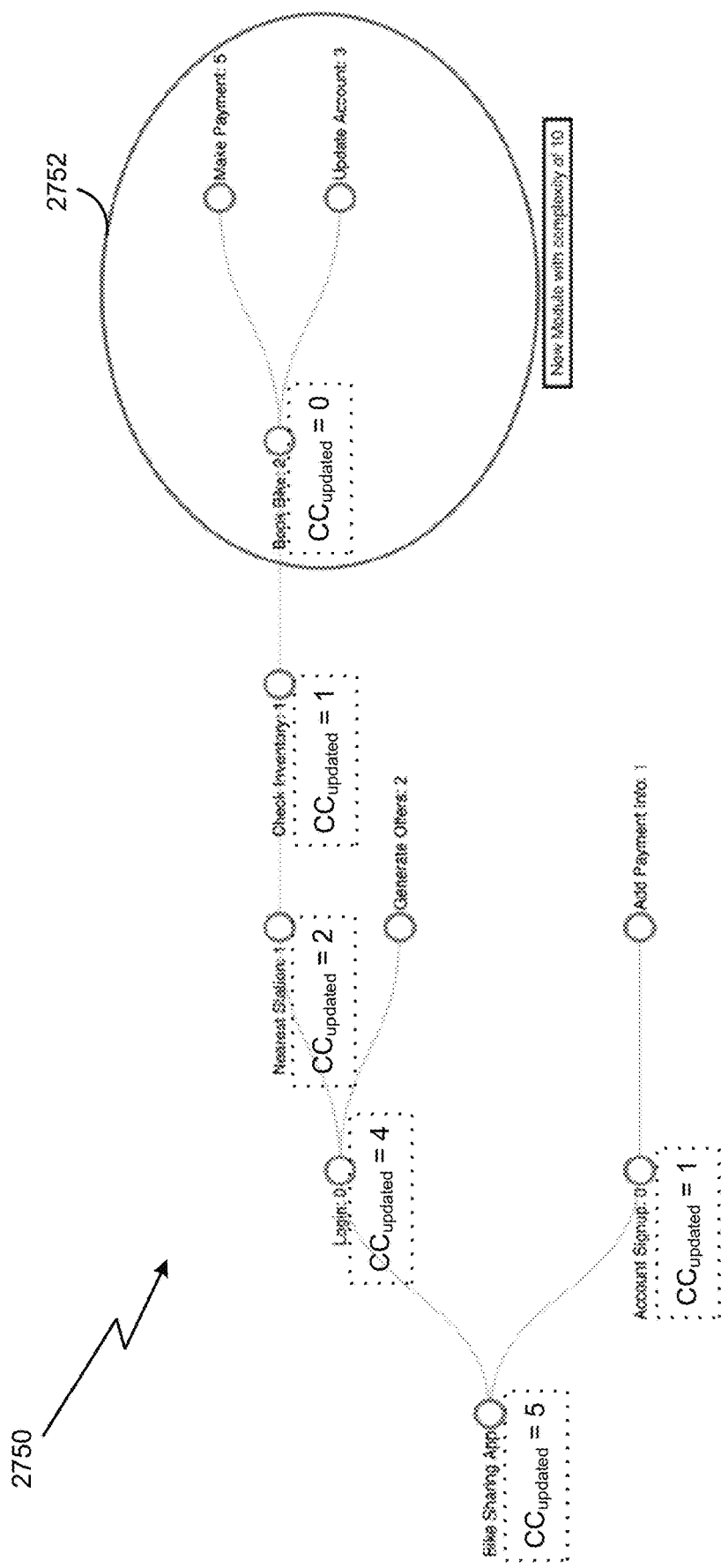

With reference to FIGS. 27a and 27b, another example optimization procedure, based on an analytic/algorithmic procedure is illustrated (in some embodiments, a learning-engine-implemented optimization procedure can be combined with the algorithmic procedure). The examples of FIGS. 27a and 27b pertain to an illustrative bike sharing app, where the numbers next to each component's name represent the complexity scores (which may have been computed according to any of the complexity score derivation approaches described herein). For example, the value '2' indicated for the 'Book Bike' component represent a component complexity score of 2.

The optimization procedure is based on determining points along a tree-based representation of the application being optimized where the end-portions of branches can be pruned and made into modularized groups. In that vein, the optimization procedure seeks to cap or limit the complexity score that can be included within a group of components that is to be separate into a module. Assume, for the purposes of the example of FIGS. 27a and 27b, that groups of components (constituting modules) should have a maximum complexity score of 10 (this score is arbitrary, and other threshold values may be used instead, depending on the design requirements, and on the manner by which the complexity scores are computed).

In addition to computing the individual complexity score for each component, the procedure also computes a cumulative complexity score (indicated as the 'CC' score) which represents the total complexity score summed from a particular component along all the branches extending outwardly (i.e., towards the child leaves). For example, the Book Bike component has a CC score of 10, which is computed as the sum of the Book Bike own complexity score of 2, and the complexity scores of 5 and 3 for the 'Make Payment' and 'Update Account' components, respectively, that depend from the Book Bike component. The CC scores may be computed as the application is being built by the developer, or may be computed post-development, before executing the complexity reduction optimization procedure.

After the complexity and CC scores are determined, the optimization procedure starts traversing the graph at the top (e.g., at the root node, which in this case is the 'Bike Sharing App' node), down one of the branches (the order of branch selection may be determined arbitrarily, or according to one or more criteria, e.g., according to which branch has the highest cumulative complexity, which in the present example would result in the upper branch being selected since it has a CC score, associated with the 'Login' node, of 14). At each point along the traversed path, a determination is made whether the CC score exceeds the maximum complexity threshold (of 10, in this example). If, at a particular node being analyze, the corresponding CC score exceeds the maximum complexity threshold (indicating that the overall complexity of the arrangement of components along the path being traversed is still too high), the procedure moves to the next node down the path.

Upon the optimization procedure reaching a node for which the CC score is equal to or less than the maximum complexity threshold, the group of components from the node just reached and down to the remaining dependent nodes in that path can be pruned from the rest of the structure and be defined as a separate module whose complexity can now be managed separately from the rest of the application layout. Accordingly, and as illustrated in FIG. 27b (showing a resultant arrangement of component 2750), the cluster of components comprising the 'Book Bike', 'Make Payment', and 'Update Account' components are separated into a module 2752.

Having separated the components of module 2752 from the rest of the application structure, the CC score associated with the now pruned module (at the 'Book Bike' component is updated to 0 with all the CC score upstream (in a direction back towards the root node) being updated accordingly (to account for the updated CC score of 0 for the now pruned module 2752). The update CC scores for the resultant structure 2750 are provided in FIG. 2752. With the CC scores updated, the optimization procedure now continues by moving back from the pruned module, and traversing the remaining path in the structure. As shown in FIG. 27b, none of the remaining components in the resultant arrangement 2750 is associated with a CC score higher than 10, and thus, in this example, no additional modularization needs to be performed.

The optimization procedure described in relation to FIGS. 27a and 27b thus includes the following operations:
  Calculate the complexity score of each node and then the total score for each node including its children.
  Start traversing the graph at the top and keep going down a branch.
  As soon the complexity score falls below 10, come back up the branch and prune it there and create a new module out of the pruned branch.
  Update the score to 0 so that the pruned group of components is not processed again, and update the cumulative complexity scores of the non-pruned components.
  Go back up one node and go down another branch to repeat the process.
  Terminate when all branches have been analyzed and processed.

The above example procedure, therefore, allows groups at end-points of traversed branches/paths to be severed. Because those end-point clusters of components would generally not have further downstream components to which their output would need to be delivered, the grouping of such end components into modules can greatly simplify the design by treating those group of component as separated modules that can be easily tested, and whose risk of failure is reduced. This optimization procedure allows upstream groups of components to continue being grouped into modules as the downstream groups of components are put into modules, thus simplifying the overall design, and systematically grouping components into easier-to-handle modules. The optimization procedure can also be implemented so that the grouping of components can be applied to clusters of components at other locations of the initial arrangement (e.g., at higher hierarchical locations of a tree-like structure of components) without necessarily needing components farther down the structure to first be processed and grouped into modules.

The above example procedure can be modified to consider further constraints and criteria that may be applied when determining whether to sever a group of components into a module. For example, a group of components whose collective complexity exceeds the maximum complexity threshold (or cap) may nevertheless be separated into a module if there's requirement that certain neighboring components cannot be separated (e.g., components that if separated into different modules would adversely affect the user's experience, components that need to be executed by the same computing device in a distributed system, etc.) The above example procedure may also need to be iteratively executed in order to improve the optimization performance. In some implementations, the complexity-reducing optimization procedure may be performed by a trained learning model realized on a learning-engine, in which the learning model can identify groups of components that can be separated into their own modules. Such learning models can be optimized (during their training stage) to incorporate the various constrains and rules that govern decisions on whether various grouping of components should be placed into their own modules.

As noted, in some embodiments, connectivity of components separated into modules may also be altered so that original inputs and outputs to the components that have now been separated into modules are reconnected in a way that the inputs are delivered to one or more input ports of the modules, while outputs produced by the modules are provided by the newly separated modules via one or more output ports. As also discussed with respect to FIG. 25, the grouping of components into modules may result in the formation of modules that include more components than were included in the initial group of components.

Figure 28A:
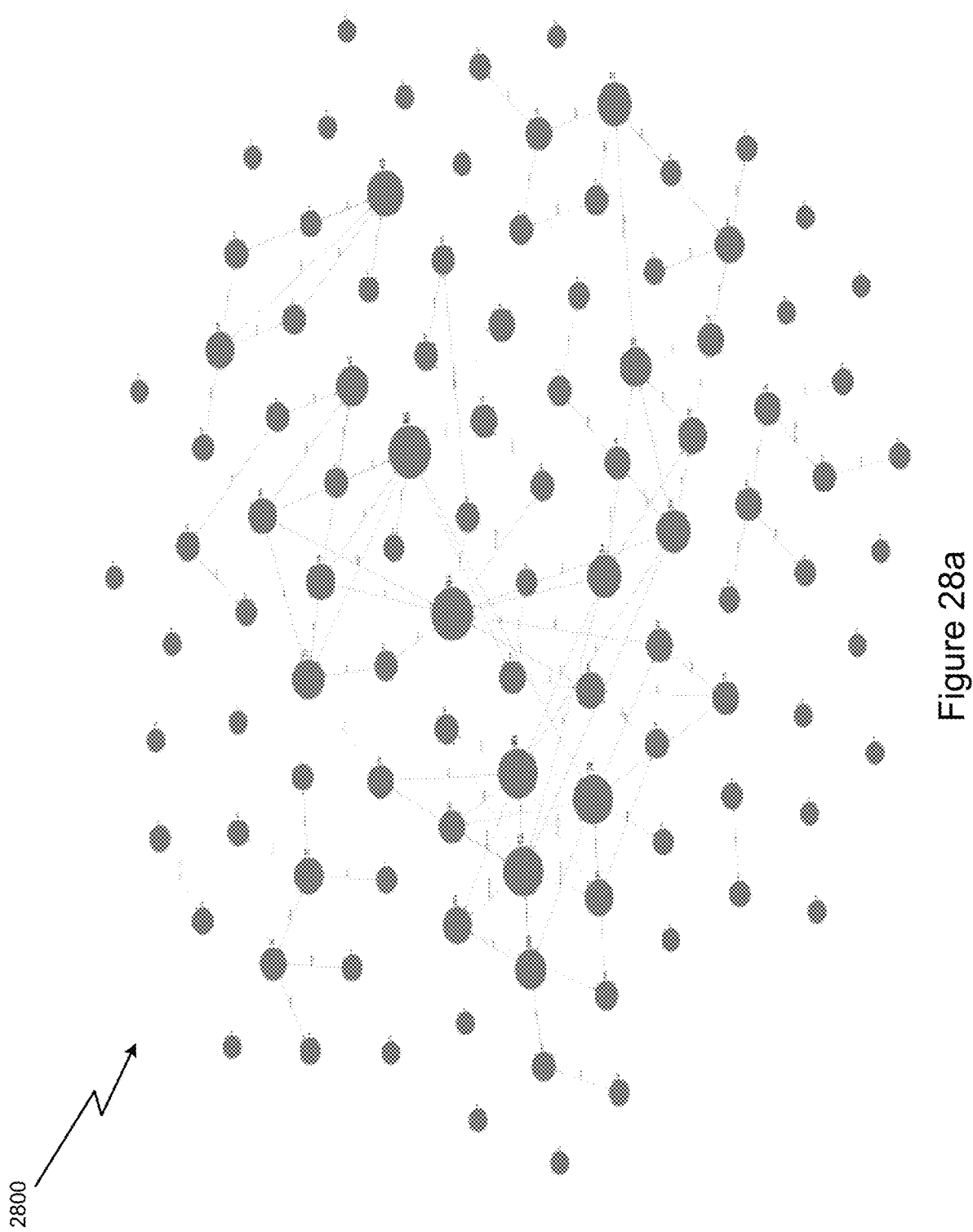
FIGS. 28a-b are schematic representations illustrating outcome of another example complexity-reducing optimization to split an initial complex application layout into a more modular (where separated modules are represented by different shades), but less complex, resultant application layout.
Figure 28B:
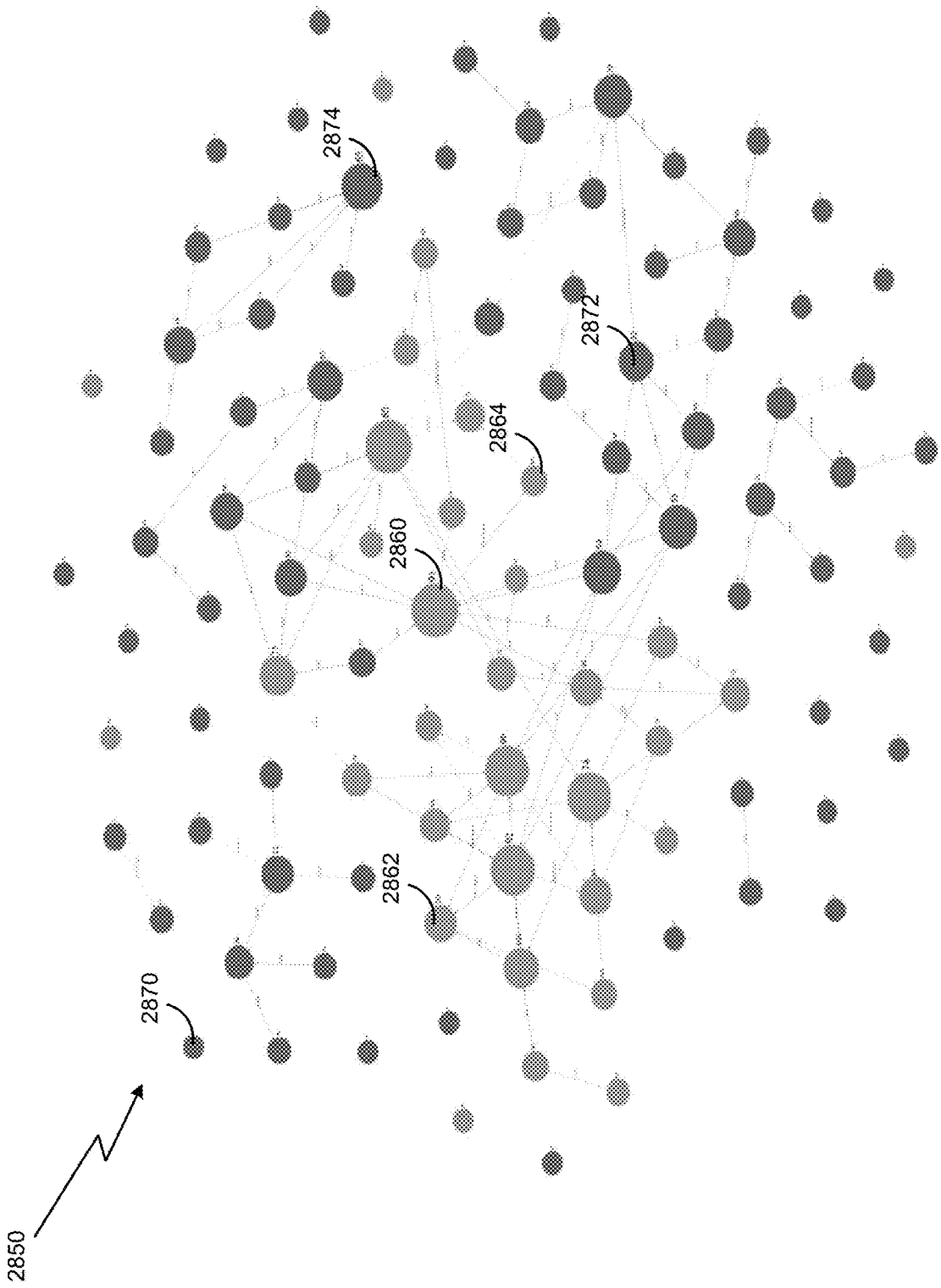

FIGS. 28a and 28b show another example of an initial application layout 2800 and resultant application layout 2850 resulting from application of an optimization procedure (which may be similar to the procedure discussed in relation to FIGS. 27a and 27b, or may be a learning-engine-based implementation, or some other complexity reduction optimization approach). As can be seen from FIGS. 28a and 28b, the high complexity of the initial layout 2800 can be reduced into a more modular, and thus less complex, resultant arrangement (structure) 2850 in which some of the various nodes (e.g., the lighter shaded nodes 2960, 2962, and 2964) represent separated (modularized) nodes whose complexity and behavior can be handled (treated) separately from the remainder of the initial structure 2800 of FIG. 28a. In this example, the remainder of the nodes (including example nodes 2870, 2872, and 2874) form part of a node grouping that can now be handled (e.g., tested or further processed) separately from the nodes that have been severed (separated or modularized) through one or more complexity-reducing optimization procedures such as those described herein.

Accordingly, in some embodiments, the optimization/reconfiguration unit (such as the unit 216 of the development and deployment platform 150 shown in FIG. 2) may be adapted to automatically reconfigure the initial arrangement of interlinked components to produce the resultant arrangement with a resultant plurality of portions comprising interlinked components, with the resultant plurality of portions associated with an average resultant complexity that is lower than an average initial complexity for the one or more portions of the initial arrangement of interlinked components. In some examples, the optimization/reconfiguration unit may be adapted to reconfigure the initial arrangement of interlinked components forming the data application based on a learning engine implementation applied to the configuration data representative of the initial arrangement of the interlinked components forming the data application.

In some example implementations, the optimization/reconfiguration unit may be adapted to separate the initial arrangement of interlinked components into multiple modular portions comprising the resultant arrangement of interlinked components. In such examples, the optimization/reconfiguration unit may be adapted to determine cumulative complexity scores for a hierarchical structure of at least a portion of the initial arrangement, where the cumulative complexity scores for each node of the hierarchical structure are equal to sum of cumulative complexity scores of respective child nodes of the each node. The optimization/reconfiguration unit may also be adapted to traverse the hierarchical structure and separate a portion of components comprising a particular node in the traversed hierarchical structure and child nodes of the particular node into a separate component module based, at least in part, on a determination that the cumulative score of the particular node is less than a pre-determined maximum complexity threshold. Additionally, in some such examples, the optimization/reconfiguration unit may further be configured to update, upon separating the portion of components into the separate component module, a group of cumulative complexity scores that depended on the complexity scores of the components in the component module to decrease the group of cumulative complexity scores by the cumulative score of the particular node, and continue traversing a remainder of the hierarchical structure using the updated group of cumulative complexity scores.

As also discussed above, in addition to the optimization approach of separating groups of components into modules (to thus reduce the average complexity across the modules constituting a resultant arrangement of components), another optimization approach to reduce complexity of an arrangement of components constituting an application is by identifying certain groups of components as being replaceable by pre-determined templates that perform substantially the same functionality as those identified groups of components in the initial arrangement of components. The pre-determined templates are component arrangements that have typically undergone thorough and rigorous testing, and thus have a low associated risk of failure. As a result, such pre-determined templates can be assigned a complexity of 0 (or otherwise have some other low-risk value assigned to them). In some implementations, a learning model can be implemented using learning engines (such as those realized through the machine learning component 230 of FIG. 2) to recognize patterns of components that can be replaced by one (or more) pre-determined templates stored in a library of templates. Such a learning-engine approach can also be configured to cause the identified pattern in the initial configuration to be replaced by one of the templates (and to also appropriately alter any interconnectivity required in the resultant arrangement comprising the templates replacing the initial groups of components). Thus, when templates are used in applications, the average complexity will be significantly reduced, thereby lowering the QA (quality assurance) and maintenance costs.

Accordingly, in some embodiments, an optimization/reconfiguration unit (such as the unit 216 of FIG. 2) may be adapted to identify at least one of the one or more portions of the initial arrangement of the interlinked components at least one respective equivalent template of interlinked components from a library of pre-determined templates, and replace the at least one of the one or more portions of the initial arrangement with the identified at least one respective equivalent template of interlinked components.

Figure 29:
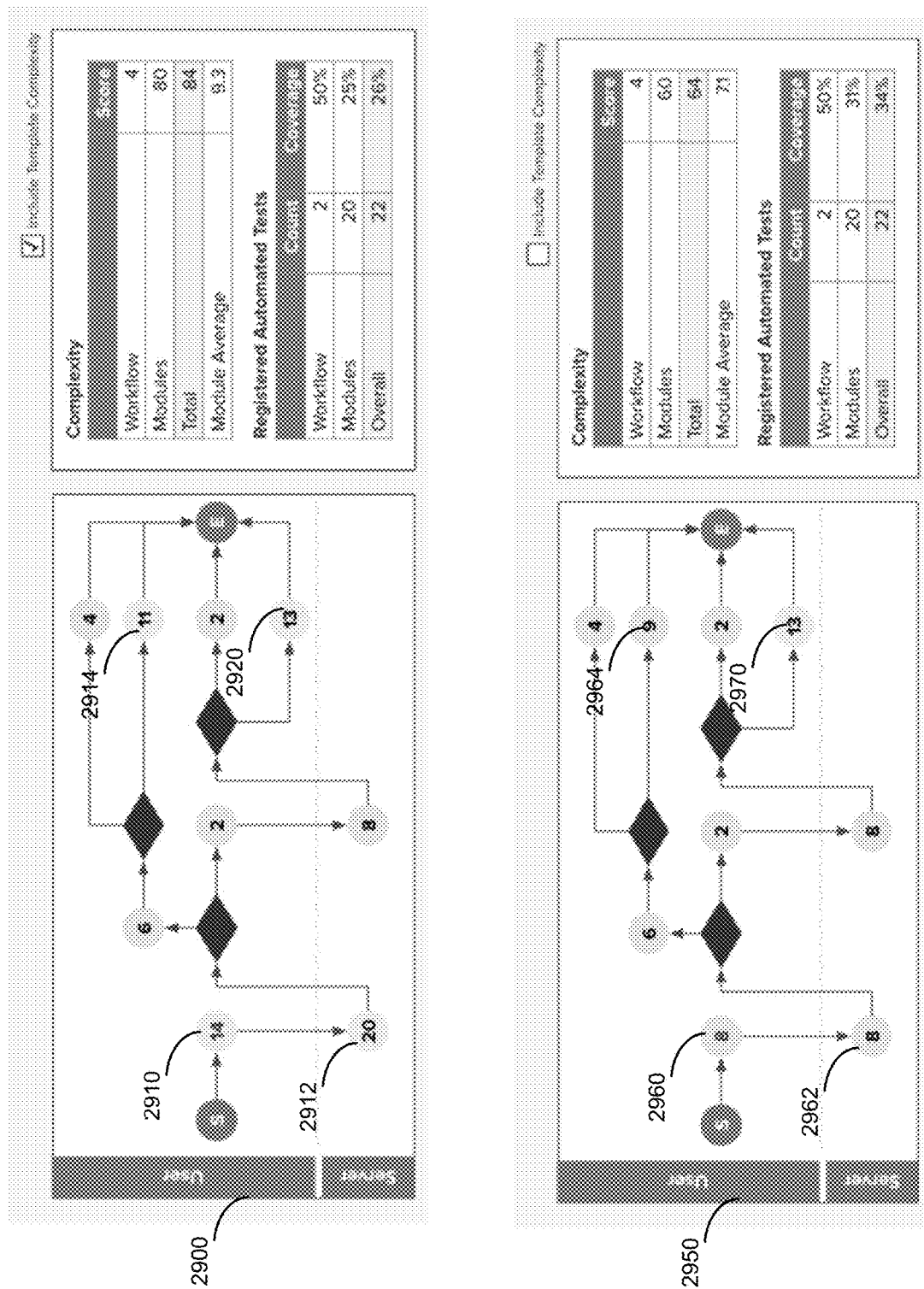
FIG. 29 includes an example initial control flow diagram of an application on which a template-replacement optimization was performed to produce a resultant control flow diagram with reduced average complexity.

To illustrate, consider the example structures 2900 and 2950 shown in FIG. 29. The structure 2900 represents an initial configuration developed by a developer (e.g., on a development and deployment platform such as the platform 150 of FIG. 2), while the structure 2950 is a resultant structure produced, in part, by an optimization procedure (e.g., one implemented using a learning-engine) that identifies suitable component grouping candidates (possibly within component modules) within the initial design structure that can be replaced by pre-determined templates that perform a substantially equivalent functionality to that performed by the identified component groupings. By replacing the identified component groupings with respective templates (and possibly rewiring the connectivity within the affected modules) the complexity of the affected modules is reduced by a level corresponding to the difference between the initial complexity of the component groupings being replaced and the complexity of templates replacing those component groupings. For example, the initial structure 2900 includes a module 2910 with a complexity score of 14 (such a score, in this example, exceeds the permissible complexity cap of 10). Assume that an optimization procedure (e.g., based on a learning model implementation) analyzed the initial configuration and determines that a component grouping within the module 2910, that contributes a complexity score of 8 to the overall complexity of 14, can be replaced by a pre-determined template (performing a substantially equivalent function as the identified component grouping) whose complexity is assigned a value of '0' (e.g., because the template has rigorously been tested, and has a known behavior that reduces the risk and upkeep for the template to 0). As a result of replacing the component grouping within the module 2910 with a template, the resultant structure 2950 includes an optimized module 2960, with a substantially equivalent functionality as that of the module 2910, that comprises the template replacing the original component grouping and any other components that were not replaced. The use of the template in the resultant module 2960 therefore results in a complexity score for the module of 6 (computed according to 14-8). In the example of FIG. 29, similar optimization operations are performed in relation to the modules 2912 and 2914 of the initial structure 2900, that produce resultant modules 2962 and 2964 in the resultant (optimized) structure 2950. On the other hand, in the present example, the module 2920 is found to contain component grouping that cannot be replaced by one of the available pre-determined templates, and therefore, in the resultant, optimized, structure 2950, the corresponding module 2970 remains with the same complexity 13 as that of the initial module 2920. Nevertheless, in some embodiments, the replaceable template optimization procedure may be used in (in parallel or sequentially) with another complexity-reducing optimization procedure (such as the modularization procedure discussed herein with respect to FIGS. 25-28) to thus achieve a reduced complexity score for the module 2920 (and other component groupings). As shown in FIG. 29, the application of the template-replacement optimization procedure causes the average complexity to fall to 7.1 (for the structure 2950) from 9.3 (for the structure 2900).

Figure 30:
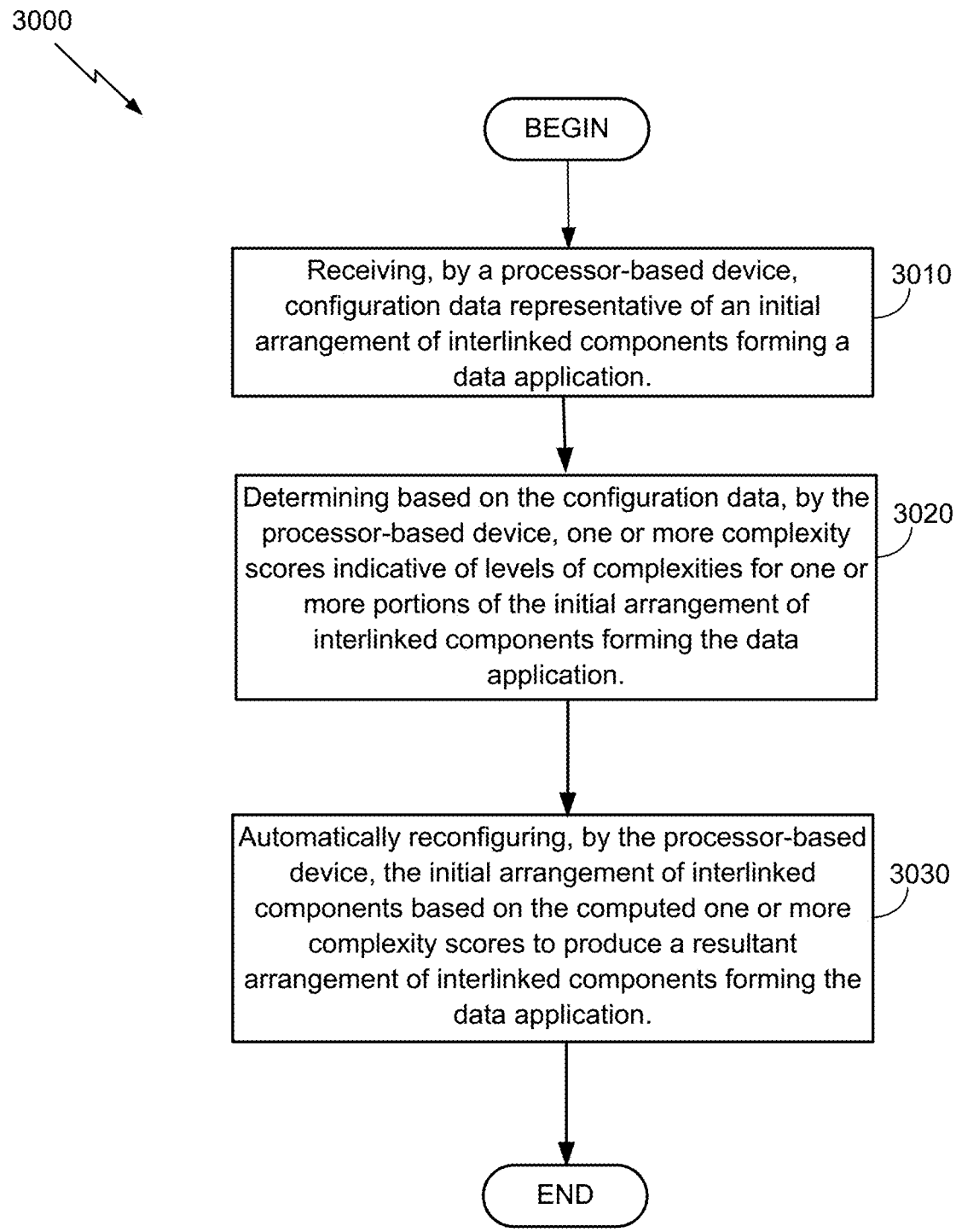
FIG. 30 is a flowchart of an example procedure to optimize configurations of applications.

With reference next to FIG. 30, a flowchart of an example procedure 3000 to optimize configurations of applications is shown. The procedure 3000 includes receiving 3010, by a processor-based device (e.g., implementing a development and deployment platform such as the platform 150 of FIG. 2), configuration data representative of an initial arrangement of interlinked components forming a data application (e.g., an initial arrangement of components prepared by a developer according, possibly, to business requirements, but without necessarily taking into account computational complexity and efficiency). The procedure 3000 further includes determining 3020 based on the configuration data, by the processor-based device, one or more complexity scores indicative of levels of complexities for one or more portions of the initial arrangement of interlinked components forming the data application.

In some examples, determining the one or more complexity scores may include computing cyclomatic complexity scores for the one or more portions of the data application. In some embodiments, determining the one or more complexity scores may include one or more of, for example, computing component complexity scores for one or more of the interlinked components forming the data application, and/or computing a workflow complexity score representative of a workflow complexity defined by the interlinked components. In such embodiments, computing the component complexity scores for the one or more of the interlinked components may include determining implementation characteristics for a particular component of the one or more interlinked components, and deriving a component complexity score for the particular component based on the implementation characteristics for the particular component. Deriving the component complexity score for the particular component or the workflow complexity score may include one or more of, for example:

a) When the particular component is determined to be a decision component, incrementing the component complexity score by one for each cell of a decision table of the decision component, b) When the particular component is determined to be a calculator component to perform a calculation on two or more inputs to the calculator component, incrementing the component complexity score by one for each IF statement identified in the calculator component, c) When the particular component is determined to be a data mapper component to map input data to one or more tables managed through the data mapper component, incrementing the component complexity score by one for each row of the data mapper component, and for each IF statement identified in the data mapper component, and/or d) When the particular component is determined to be within a workflow process defining background processing involving two or more components in the data application, incrementing the workflow complexity score by one for each start point identified in the workflow process, and incrementing the workflow complexity score by one for each branch out of a gateway identified in the workflow process.

The procedure 3000 may also include presenting the one or more complexity scores in an output diagram comprising a graphical representation of the data application. Presenting the complexity scores may include presenting a workflow diagram illustrating at least a portion of the data application comprising the interlinked components, and presenting one or more of: individual component complexity scores for the respective interlinked components, or a summary of the complexity scores.

With continued reference to FIG. 30, the procedure 3000 additionally includes automatically reconfiguring, by the processor-based device, the initial arrangement of interlinked components based on the computed one or more complexity scores to produce a resultant arrangement of interlinked components forming the data application. For example, automatically reconfiguring the initial arrangement of interlinked components may include automatically reconfiguring the initial arrangement of interlinked components to produce the resultant arrangement with a resultant plurality of portions comprising interlinked components, with the resultant plurality of portions associated with an average resultant complexity that is lower than an average initial complexity for the one or more portions of the initial arrangement of interlinked components. In some examples, automatically reconfiguring the initial arrangement of interlinked components may include reconfiguring the initial arrangement of interlinked components forming the data application based on a learning engine implementation applied to the configuration data representative of the initial arrangement of the interlinked components forming the data application.

In some embodiments, automatically reconfiguring the initial arrangement of interlinked components may include separating the initial arrangement of interlinked components into multiple modular portions comprising the resultant arrangement of interlinked components. Separating the initial arrangement of interlinked components into the multiple modular portions may include determining cumulative complexity scores for a hierarchical structure of at least a portion of the initial arrangement, where the cumulative complexity scores for each node of the hierarchical structure are equal to sum of cumulative complexity scores of respective child nodes of the each node, and traversing the hierarchical structure and separating a portion of components comprising a particular node in the traversed hierarchical structure and child nodes of the particular node into a separate component module based, at least in part, on a determination that the cumulative score of the particular node is less than a pre-determined maximum complexity threshold. In such embodiments, the procedure 3000 may further include updating, upon separating the portion of components into the separate component module, a group of cumulative complexity scores that depended on the complexity scores of the components in the component module to decrease the group of cumulative complexity scores by the cumulative score of the particular node, and continuing traversing a remainder of the hierarchical structure using the updated group of cumulative complexity scores.

In some examples, automatically reconfiguring the initial arrangement of interlinked components may include identifying for at least one of the one or more portions of the initial arrangement of the interlinked components at least one respective equivalent template of interlinked components from a library of pre-determined templates, and replacing the at least one of the one or more portions of the initial arrangement with the identified at least one respective equivalent template of interlinked components.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limit the scope of the invention, which is defined by the scope of the appended claims. Any of the features of the disclosed embodiments described herein can be combined with each other, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising: receiving, by a processor-based device, configuration data representative of an initial arrangement of interlinked components forming a data application;
   determining based on the configuration data, by the processor-based device, one or more complexity scores indicative of levels of complexities for one or more portions of the initial arrangement of interlinked components forming the data application;
   and automatically reconfiguring, by the processor-based device, the initial arrangement of interlinked components based on the determined one or more complexity scores to produce a resultant arrangement of interlinked components forming the data application;
   wherein automatically reconfiguring the initial arrangement of interlinked components comprises separating the initial arrangement of interlinked components into multiple modular portions comprising the resultant arrangement of interlinked components, including:
   determining cumulative complexity scores for a hierarchical structure of at least a portion of the initial arrangement, where the cumulative complexity scores for each node of the hierarchical structure are equal to sum of cumulative complexity scores of respective child nodes of the each node;
   and traversing the hierarchical structure and separating a portion of components comprising a particular node in the traversed hierarchical structure and child nodes of the particular node into a separate component module based, at least in part, on a determination that the cumulative score of the particular node is less than a pre-determined maximum complexity threshold.

2. The method of claim 1, wherein determining the one or more complexity scores comprises computing cyclomatic complexity scores for the one or more portions of the data application.

3. The method of claim 1, wherein determining the one or more complexity scores comprises one or more of:
   computing component complexity scores for one or more of the interlinked components forming the data application; or
   computing a workflow complexity score representative of a workflow complexity defined by the interlinked components.

4. The method of claim 3, wherein computing the component complexity scores for the one or more of the interlinked components comprises:
   determining implementation characteristics for a particular component of the one or more interlinked components; and
   deriving a component complexity score for the particular component based on the implementation characteristics for the particular component.

5. The method of claim 4, wherein deriving the component complexity score for the particular component or the workflow complexity score comprises one or more of:
   a) when the particular component is determined to be a decision component, incrementing the component complexity score by one for each cell of a decision table of the decision component,
   b) when the particular component is determined to be a calculator component to perform a calculation on two or more inputs to the calculator component, incrementing the component complexity score by one for each IF statement identified in the calculator component, c) when the particular component is determined to be a data mapper component to map input data to one or more tables managed through the data mapper component, incrementing the component complexity score by one for each row of the data mapper component, and for each IF statement identified in the data mapper component, or d) when the particular component is determined to be within a workflow process defining background processing involving two or more content components in the data application, incrementing the workflow complexity score by one for each start point identified in the workflow process, and incrementing the workflow complexity score by one for each branch out of a gateway identified in the workflow component.

6. The method of claim 1, further comprising:

presenting the one or more complexity scores in an output diagram comprising a graphical representation of the data application.

7. The method of claim 6, wherein presenting the complexity scores comprises:

presenting a workflow diagram illustrating at least a portion of the data application comprising the interlinked components; and presenting one or more of: individual component complexity scores for the respective interlinked components, or a summary of the complexity scores.

8. The method of claim 1, wherein automatically reconfiguring the initial arrangement of interlinked components comprises:

automatically reconfiguring the initial arrangement of interlinked components to produce the resultant arrangement with a resultant plurality of portions comprising interlinked components, with the resultant plurality of portions associated with an average resultant complexity that is lower than an average initial complexity for the one or more portions of the initial arrangement of interlinked components.

9. The method of claim 1, wherein automatically reconfiguring the initial arrangement of interlinked components comprises:

reconfiguring the initial arrangement of interlinked components forming the data application based on a learning engine implementation applied to the configuration data representative of the initial arrangement of the interlinked components forming the data application.

10. The method of claim 1, further comprising:

upon separating the portion of components into the separate component module, updating a group of cumulative complexity scores that depended on the complexity scores of the components in the component module to decrease the group of cumulative complexity scores by the cumulative score of the particular node; and continuing traversing a remainder of the hierarchical structure using the updated group of cumulative complexity scores.

11. The method of claim 1, wherein automatically reconfiguring the initial arrangement of interlinked components comprises:

identifying for at least one of the one or more portions of the initial arrangement of the interlinked components at least one respective equivalent template of interlinked components from a library of pre-determined templates; and replacing the at least one of the one or more portions of the initial arrangement with the identified at least one respective equivalent template of interlinked components.

12. A system comprising: one or more computing devices comprising one or more processors, and one or more non-transitory storage devices for storing instructions that, when executed by the one or more processors cause the one or more computing devices to:

receive configuration data representative of an initial arrangement of interlinked components forming a data application;

determine based on the configuration data one or more complexity scores indicative of levels of complexities for one or more portions of the initial arrangement of interlinked components forming the data application;

and automatically reconfigure the initial arrangement of interlinked components based on the determined one or more complexity scores to produce a resultant arrangement of interlinked components forming the data application;

wherein the one or more computing devices configured to automatically reconfigure the initial arrangement of interlinked components are configured to separate the initial arrangement of interlinked components into multiple modular portions comprising the resultant arrangement of interlinked components, including to:

determine cumulative complexity scores for a hierarchical structure of at least a portion of the initial arrangement, where the cumulative complexity scores for each node of the hierarchical structure are equal to sum of cumulative complexity scores of respective child nodes of the each node; and traverse the hierarchical structure and separating a portion of components comprising a particular node in the traversed hierarchical structure and child nodes of the particular node into a separate component module based, at least in part, on a determination that the cumulative score of the particular node is less than a pre-determined maximum complexity threshold.

13. The system of claim 12, wherein the one or more computing devices configured to determine the one or more complexity scores are configured to compute cyclomatic complexity scores for the one or more portions of the data application.

14. The system of claim 12, wherein the one or more computing devices configured to determine the one or more complexity scores are configured to perform one or more of:

compute component complexity scores for one or more of the interlinked components forming the data application; or compute a workflow complexity score representative of a workflow complexity defined by the interlinked components.

15. The system of claim 12, wherein the one or more computing devices configured to automatically reconfigure the initial arrangement of interlinked components are configured to:

automatically reconfigure the initial arrangement of interlinked components to produce the resultant arrangement with a resultant plurality of portions comprising interlinked components, with the resultant plurality of portions associated with an average resultant complexity that is lower than an average initial complexity for the one or more portions of the initial arrangement of interlinked components.

16. The system of claim 12, wherein the one or more computing devices configured to automatically reconfigure the initial arrangement of interlinked components are configured to:

identify for at least one of the one or more portions of the initial arrangement of the interlinked components at least one respective equivalent template of interlinked components from a library of pre-determined templates; and replace the at least one of the one or more portions of the initial arrangement with the identified at least one respective equivalent template of interlinked components.

17. A non-transitory computer readable media programmed with instructions, executable on one or more processors of a computing system, to:

receive configuration data representative of an initial arrangement of interlinked components forming a data application;

determine based on the configuration data one or more complexity scores indicative of levels of complexities for one or more portions of the initial arrangement of interlinked components forming the data application;

and automatically reconfigure the initial arrangement of interlinked components based on the determined one or more complexity scores to produce a resultant arrangement of interlinked components forming the data application;

wherein the instructions to automatically reconfigure the initial arrangement of interlinked components comprise one or more instructions to separate the initial arrangement of interlinked components into multiple modular portions comprising the resultant arrangement of interlinked components, including to:

determine cumulative complexity scores for a hierarchical structure of at least a portion of the initial arrangement, where the cumulative complexity scores for each node of the hierarchical structure are equal to sum of cumulative complexity scores of respective child nodes of the each node;

and traverse the hierarchical structure and separating a portion of components comprising a particular node in the traversed hierarchical structure and child nodes of the particular node into a separate component module based, at least in part, on a determination that the cumulative score of the particular node is less than a pre-determined maximum complexity threshold.

\* \* \* \* \*